United States Patent
Ohnishi et al.

(10) Patent No.: US 9,508,323 B2
(45) Date of Patent: Nov. 29, 2016

(54) APPLIANCE CONTROL SYSTEM AND METHOD FOR CONTROLLING AN APPLIANCE BASED ON PROCESSING DONE BY ANOTHER APPLIANCE

(71) Applicant: Panasonic Intellectual Property Corporation of America, Torrance, CA (US)

(72) Inventors: Toshiaki Ohnishi, Kyoto (JP); Masaru Yamaoka, Osaka (JP); Mariko Nakaso, Shiga (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 300 days.

(21) Appl. No.: 14/353,864

(22) PCT Filed: Sep. 3, 2013

(86) PCT No.: PCT/JP2013/005206
§ 371 (c)(1),
(2) Date: Apr. 24, 2014

(87) PCT Pub. No.: WO2014/054221
PCT Pub. Date: Apr. 10, 2014

(65) Prior Publication Data
US 2014/0292806 A1   Oct. 2, 2014

(30) Foreign Application Priority Data
Oct. 2, 2012  (JP) ................................. 2012-220799

(51) Int. Cl.
G09G 5/377 (2006.01)
G06F 3/0484 (2013.01)
G06Q 10/06 (2012.01)
G06F 17/30 (2006.01)

(52) U.S. Cl.
CPC ............. *G09G 5/377* (2013.01); *G06F 3/0484* (2013.01); *G06F 17/30047* (2013.01); *G06Q 10/06* (2013.01); *G06F 17/30* (2013.01); *G06F 17/30247* (2013.01)

(58) Field of Classification Search
CPC .................. G06F 17/30268; G06F 17/30047; G06F 3/0484; G06F 17/30; G06F 17/30247; G09G 5/377
See application file for complete search history.

(56) References Cited

U.S. PATENT DOCUMENTS

2002/0161754 A1 * 10/2002 Janssen ............. G06F 17/30569
2008/0252944 A1 * 10/2008 Otsuka ............... H04N 1/00413
358/474

FOREIGN PATENT DOCUMENTS

| JP | 2003-307313 | 10/2003 |
|----|-------------|---------|
| JP | 2005-250734 | 9/2005 |
| JP | 2008-103900 | 5/2008 |
| JP | 2011-103548 | 5/2011 |

OTHER PUBLICATIONS

International Search Report issued Dec. 3, 2013 in International Application No. PCT/JP2013/005206.

* cited by examiner

*Primary Examiner* — Michelle L Sams
(74) *Attorney, Agent, or Firm* — Wenderoth, Lind & Ponack, L.L.P.

(57) ABSTRACT

An image display method including: obtaining (S2301) combined data including (i) image data of an image having an item as a subject and (ii) first setting information indicating processing which a first electric appliance performs on the item; determining whether or not the first setting information is convertible into second setting information, the first setting information being included in the obtained combined data, and the second setting information being information in a format previously designated by a user and executable by a second electric appliance; determining (S2305) a first mark to be added to the image of the image data, if it is determined that the first setting information is convertible into the second setting information; and displaying (S2307) the image of the image data to which the determined first mark is added, the image data being included in the combined data.

14 Claims, 36 Drawing Sheets

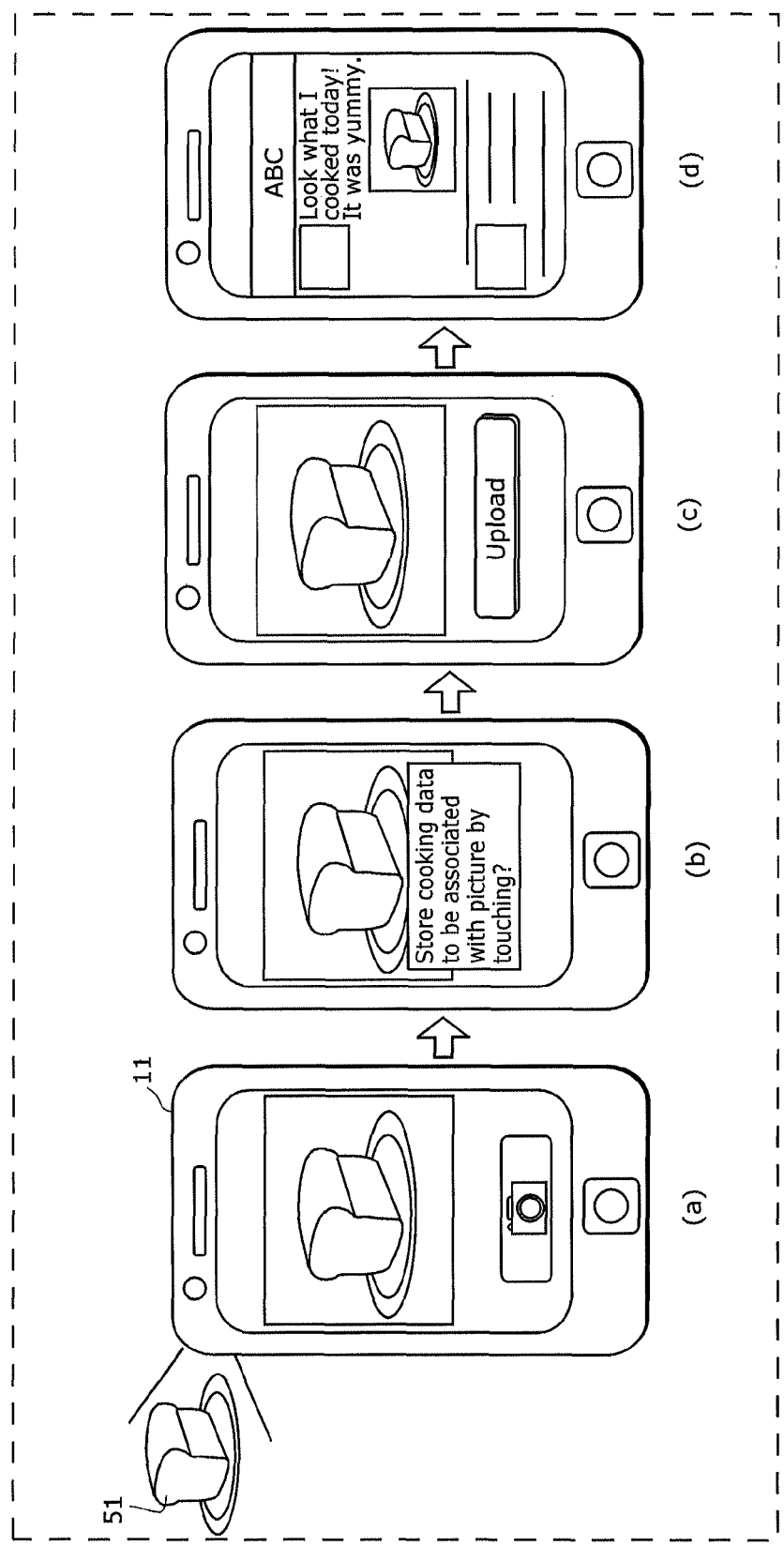

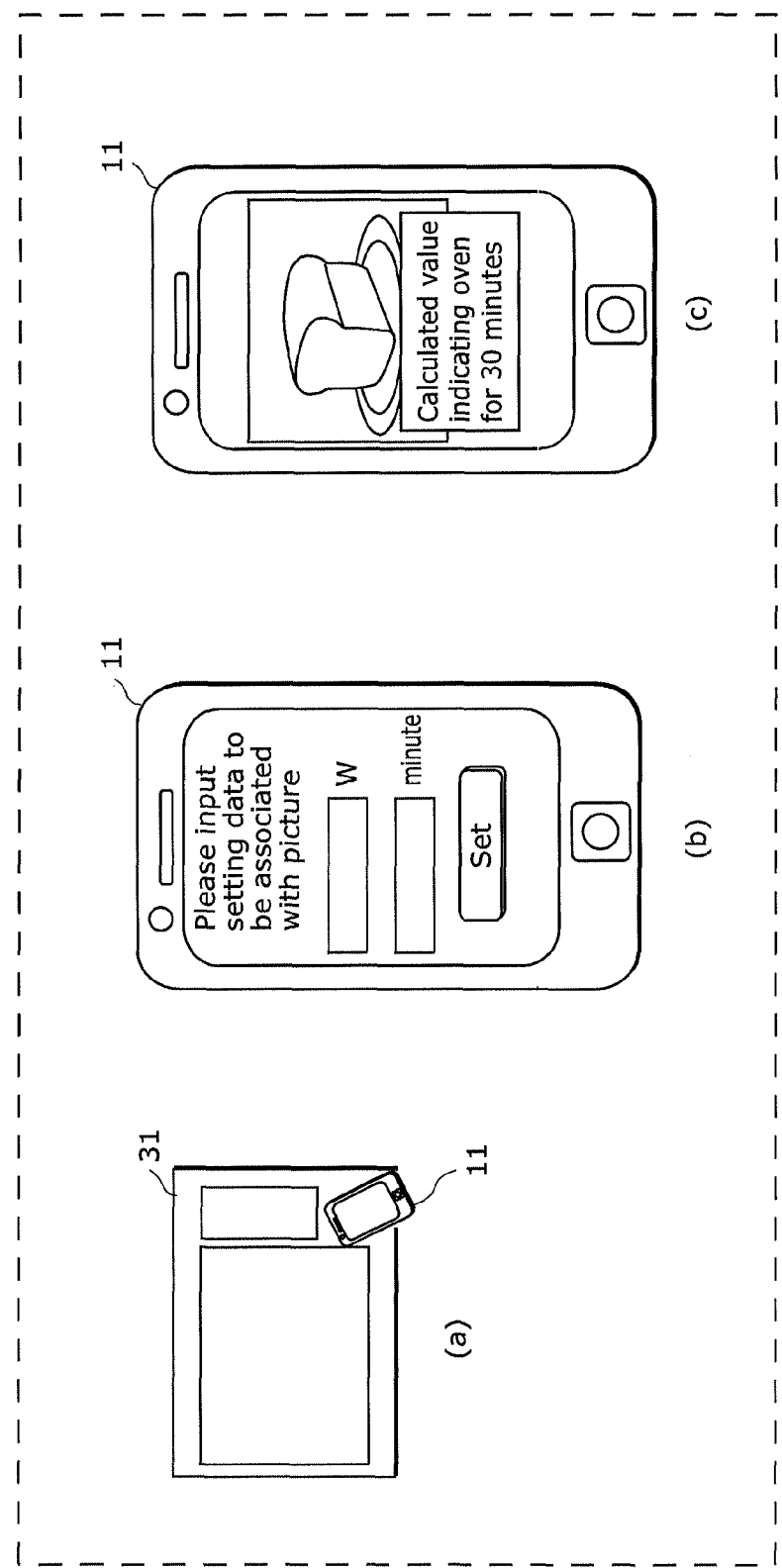

FIG. 6A

| | | 601 |
|---|---|---|
| File information | File name | abc.jpg |
| | Type | JPEG |
| | Size | 1.4 MB |
| | ... | ... |
| Camera information | Manufacturer name | Xyz |
| | Model | Opq1 |
| | ... | ... |
| | Version | 1.1 |
| | ... | ... |
| Manufacturer unique information | Setting command product number | NE-Q10 |
| | Setting command reference value | 0xA1233 |

FIG. 6B

| | | |
|---|---|---|
| (a) | Setting command reference value | 0xA1233 |
| (b) | Setting command reference value 1 | 0xA1244 |
| | Setting command reference value 2 | 0xA1222 |
| (c) | Reference command | 200°C, 10 minutes |
| (d) | Reference command 1 | 240°C, 7 minutes |
| | Reference command 2 | 220°C, 20 minutes |
| (e) | Reference command URL | http://aaa.com/aaa.html |

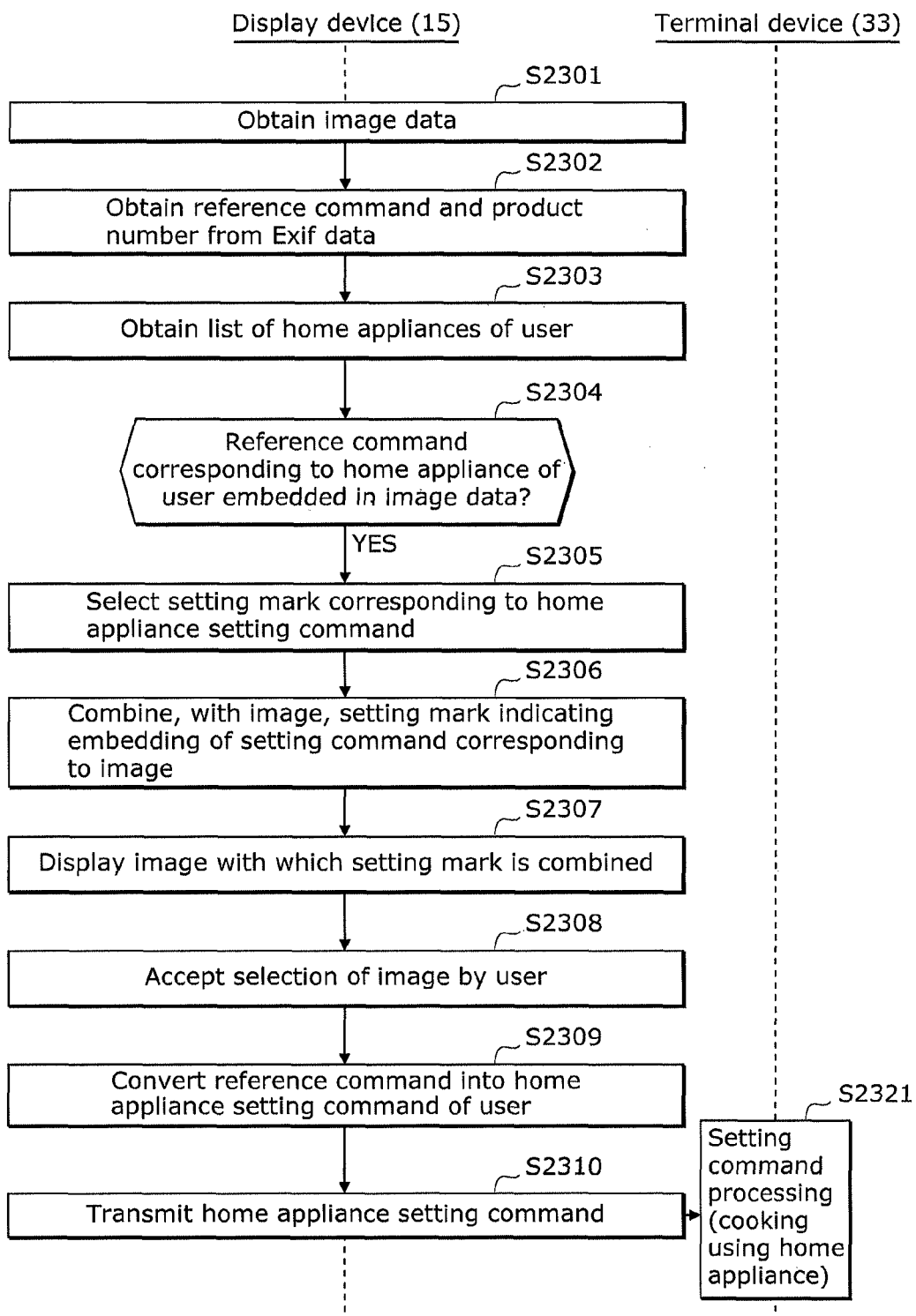

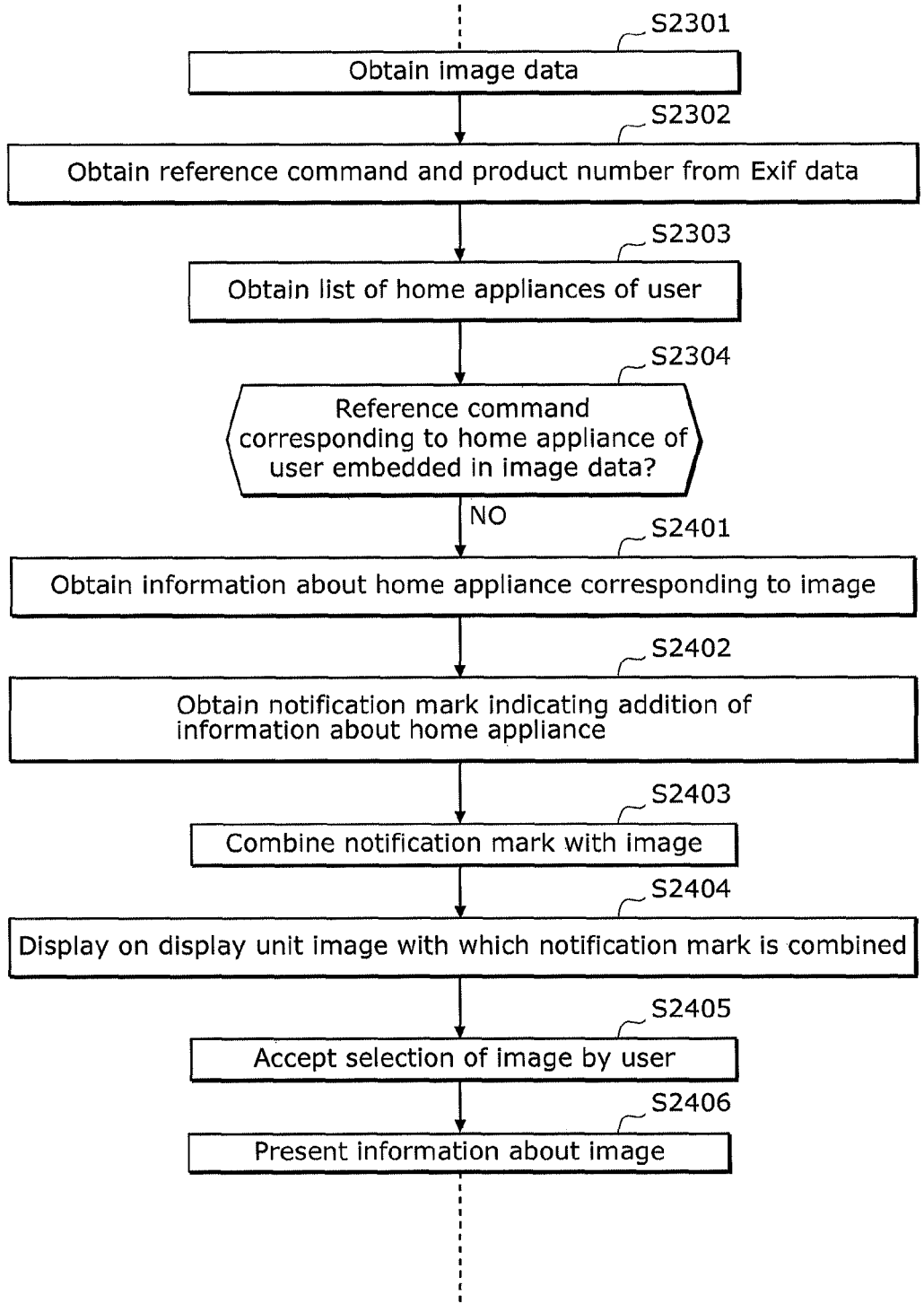

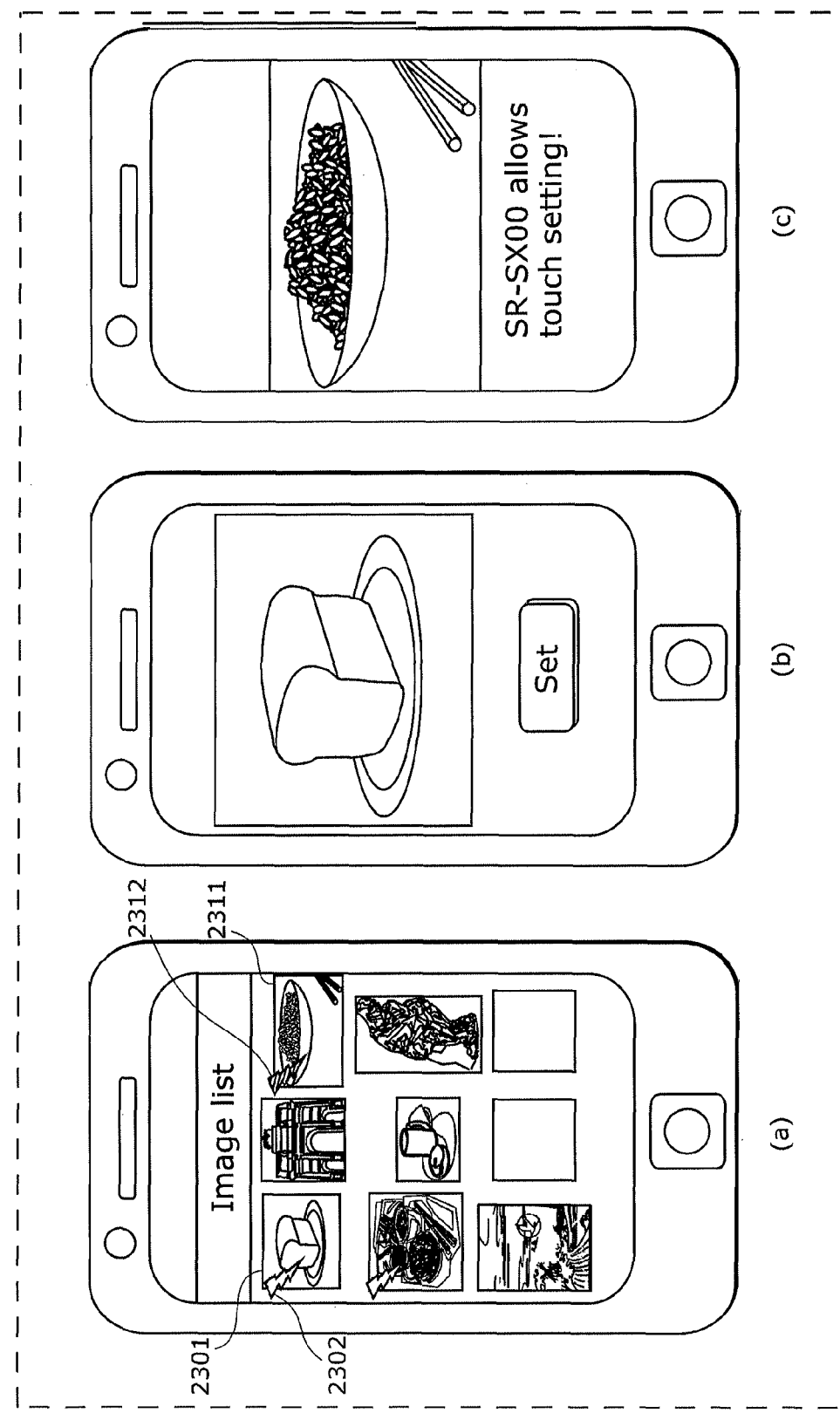

APPLIANCE CONTROL SYSTEM AND METHOD FOR CONTROLLING AN APPLIANCE BASED ON PROCESSING DONE BY ANOTHER APPLIANCE

TECHNICAL FIELD

The present invention relates to an image display method, an image display device, and an image presentation method.

BACKGROUND ART

Conventionally, image data having as a subject an item that an electric appliance performed processing on can be shared among plural users via a server for sharing image data.

Disclosed is a technique for embedding, in an image file, operation information of an electric appliance or environmental information such as sensor information to visualize the environmental information on an image (see Patent Literature (PTL) 1, for instance). According to PTL 1, a user can intuitively obtain the environmental information only by browsing the image file, and control an environment.

CITATION LIST

Patent Literature

[PTL 1]
Japanese Unexamined Patent Application Publication No. 2005-250734

SUMMARY OF INVENTION

Technical Problem

When obtaining the image file via the server, such a user cannot judge whether or not the image file includes the details of the processing performed on the item.

In view of this, an object of the present invention is to provide an image display method or the like for making it easier for a user to visually identify an image including setting information of an electric appliance when an item was processed.

Solution to Problem

In order to solve the above problem, an image display method according to an aspect of the present invention includes: obtaining combined data including (i) image data of an image having an item as a subject and (ii) first setting information indicating processing which a first electric appliance performs on the item; determining whether or not the first setting information is convertible into second setting information, the first setting information being included in the obtained combined data, and the second setting information being information in a format previously designated by a user and executable by a second electric appliance; determining a first mark to be added to the image of the image data, if it is determined that the first setting information is convertible into the second setting information; and displaying the image of the image data to which the determined first mark is added, the image data being included in the combined data.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Advantageous Effects of Invention

An image display method or the like according to an embodiment of the present invention allows a user to visually identify an image including setting information of an electric appliance when an item was processed.

BRIEF DESCRIPTION OF DRAWINGS

FIG. 4 is an explanatory diagram illustrating processing by the communication device according to Embodiment 1.

FIG. 5 is an explanatory diagram illustrating setting processing by the communication device according to Embodiment 1.

FIG. 6A is an explanatory diagram illustrating exemplary embedded data of image data according to Embodiment 1.

FIG. 6B is an explanatory diagram illustrating setting command reference values and reference setting commands according to Embodiment 1.

FIG. 21 is a first sequence diagram illustrating exemplary processing by the display device according to Embodiment 5.

FIG. 22 is a second sequence diagram illustrating exemplary processing by the display device according to Embodiment 5.

FIG. 23A is a first explanatory diagram illustrating processing by the display device according to Embodiment 5.

Figure 1:
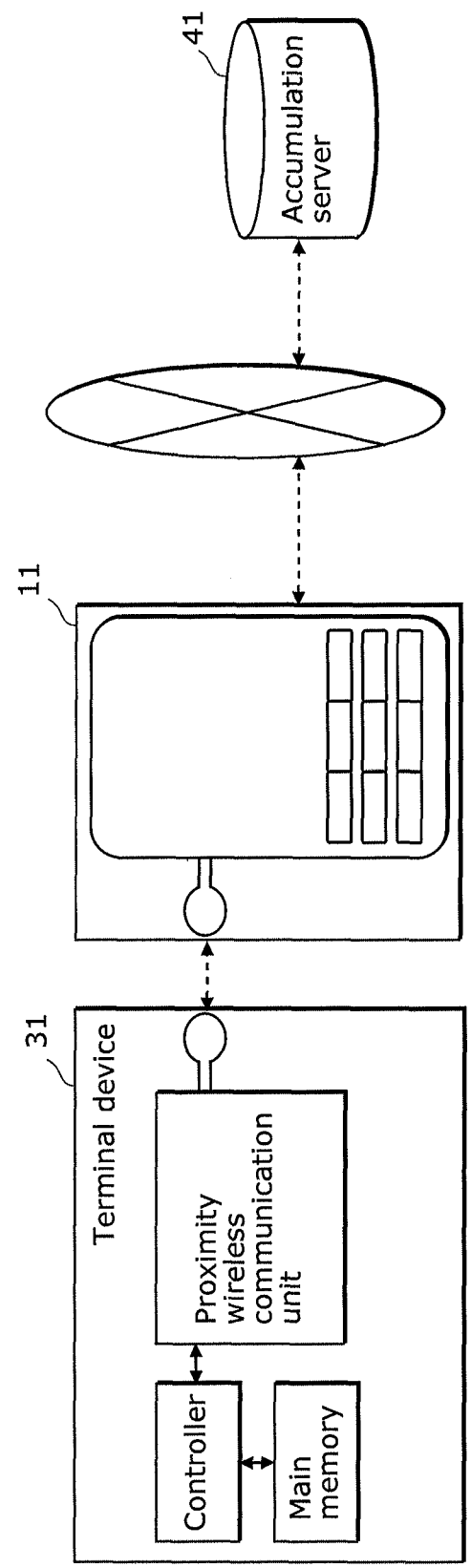
FIG. 1 is a configuration diagram illustrating an appliance control system according to Embodiment 1.

DESCRIPTION OF EMBODIMENTS (Underlying Knowledge Forming Basis of the Present Invention)

In relation to the information obtaining method disclosed in the Background Art section, the inventors have found the following problem.

Conventionally, image data having as a subject an item that an electric appliance performed processing on can be shared among plural users via a server for sharing image data.

There is a case where a user obtains and browses such image data, and wants to perform, using an electric appliance of the user, processing on an item indicated by the image data, to make the item. Unfortunately, the user cannot know a model of the electric appliance performing the processing and setting information of the electric appliance when the processing was performed, and thus cannot perform the same processing.

Disclosed is a technique for embedding in an image file operation information of an electric appliance or environmental information such as sensor information to visualize the environmental information on an image (see Patent Literature (PTL) 1, for instance). According to PTL 1, a user can intuitively obtain the environmental information only by browsing the image file, and control an environment.

When obtaining the image file via the server, such a user cannot judge whether or not the image file includes the details of the processing performed on the item.

In view of this, an object of the present invention is to provide an image display method or the like for making it easier for a user to visually identify an image including setting information of an electric appliance when an item was processed.

In order to solve such a problem, an image display method according to an aspect of the present invention includes: obtaining combined data including (i) image data of an image having an item as a subject and (ii) first setting information indicating processing which a first electric appliance performs on the item; determining whether or not the first setting information is convertible into second setting information, the first setting information being included in the obtained combined data, and the second setting information being information in a format previously designated by a user and executable by a second electric appliance; determining a first mark to be added to the image of the image data, if it is determined that the first setting information is convertible into the second setting information; and displaying the image of the image data to which the determined first mark is added, the image data being included in the combined data.

With this, if the electric appliance (the second electric appliance) previously designated by the user is capable of performing the processing corresponding to the setting information of the electric appliance (the first electric appliance) included in the image data, the mark (the first mark) is displayed with the image data. The user can know that the image for which the first mark is displayed with the image data includes the setting information processable by the electric appliance designated by the user. Here, the first electric appliance and the second appliance may be an electric appliance of the same model or the completely same electric appliance. As a result, the user can easily visually identify the image including the setting information of the electric appliance when the processing was performed on the item.

Moreover, an image display method according to another aspect of the present invention includes: obtaining combined data including (i) image data of an image having an item as a subject and (ii) first setting information indicating processing which a first electric appliance performs on the item; determining whether or not the first setting information is second setting information, the first setting information being included in the obtained combined data, and the second setting information being information in a format previously designated by a user and executable by a second electric appliance; determining a first mark to be added to the image of the image data, if it is determined that the first setting information is the second setting information; and displaying the image of the image data to which the determined first mark is added, the image data being included in the combined data.

With this, the same effect as above is produced.

For instance, the image display method further includes obtaining a conversion table that indicates setting information of an electric appliance of a model different from a predetermined model of the first electric appliance in association with the setting information of the first electric appliance of the predetermined model, wherein in the determining of whether or not the first setting information, it is determined whether or not the first setting information is convertible into the second setting information, by referring to the obtained conversion table.

With this, if the setting information of the electric appliance included in the image data can be converted into the setting information of the electric appliance designated by the user, using the conversion table, the user can know that the image displayed with the first mark includes the setting information processable by the electric appliance designated by the user.

For example, the image display method further includes obtaining a conversion table that associates the setting information of an electric appliance of a predetermined model with the first setting information that is setting information in a general format, wherein in the determining of whether or not the first setting information, it is determined whether or not the first setting information is convertible into the second setting information, by referring to the obtained conversion table.

With this, if the setting information of the electric appliance included in the image data can be converted into the general format, the user can know that the image displayed with the first mark includes the setting information processable by the electric appliance designated by the user.

For instance, the image display method further includes obtaining a home appliance list that is a list corresponding to a user ID of the user and including one or more electric appliances previously designated, wherein in the determining of whether or not the first setting information it is determined that the first setting information is convertible into the second setting information if the first setting information is convertible into the second setting information when at least one of the electric appliances included in the obtained home appliance list is the second electric appliance, and it is determined that the first setting information is inconvertible into the second setting information if the first setting information is inconvertible into the second setting information when any of the electric appliances included in the obtained home appliance list is the second electric appliance.

For example, the image display method further includes obtaining a home appliance list that is a list corresponding to a user ID of the user and including one or more electric appliances previously designated, wherein in the determining of whether or not the first setting information, it is determined that the first setting information is the second setting information if the first setting information is the second setting information when at least one of the electric appliances included in the obtained home appliance list is the second electric appliance, and it is determined that the first setting information is not the second setting information if the first setting information is not the second setting information when any of the electric appliances included in the obtained home appliance list is the second electric appliance.

With this, it is determined whether or not the setting information of the electric appliance included in the image data can be converted into the setting information of the electric appliance corresponding to the user, based on the home appliance list corresponding to the user.

For instance, the image display method further includes determining a second mark to be added to the image of the image data, if it is determined that the first setting information is inconvertible into the second setting information, the second mark being different from the first mark; and displaying the image of the image data to which the determined second mark is added, the image data being included in the combined data.

For example, the image display method further includes determining a second mark to be added to the image of the image data, if it is determined that the first setting information is not the second setting information, the second mark being different from the first mark; and displaying the image of the image data to which the determined second mark is added, the image data being included in the combined data.

With this, if the setting information of the electric appliance is included in the image data, the mark (the second mark) is displayed with the image data. The user can know that the image for which the second mark is displayed with the image data includes the setting information of the electric appliance, but the setting information is unprocessable by the electric appliance designated by the user. As a result, the user can easily visually identify the image including the setting information of the electric appliance when the processing was performed on the item.

For instance, in the determining of a second mark, among one or more marks respectively corresponding to electric appliances, a mark corresponding to the first electric appliance is determined as the second mark.

With this, the second mark has a shape corresponding to the electric appliance. This allows the user to know intuitively which electric appliance performs the processing. As a result, the user can easily visually identify the image including the setting information of the electric appliance when the processing was performed on the item.

For example, in the determining of a first mark, among one or more marks respectively corresponding to electric appliances, a mark corresponding to the second electric appliance is determined as the first mark.

With this, the first mark has a shape corresponding to the electric appliance. This allows the user to know intuitively which electric appliance performs the processing. As a result, the user can easily visually identify the image including the setting information of the electric appliance when the processing was performed on the item.

For instance, the image data is image data including the first setting information embedded in a format compliant with exchangeable image file format (Exif).

With this, the setting information of the electric appliance is embedded in a format compliant with the Exif generally used to embed information in image data. As a result, the image in which the setting information of the electric appliance is embedded is treated in the same manner as general image data in which the setting information of the electric appliance is not embedded.

Furthermore, an image presentation method according to a further aspect of the present invention is an image presentation method for causing a display device to display an image, the method including: obtaining combined data including (i) image data of an image having an item as a subject and (ii) first setting information indicating processing which a first electric appliance performs on the item; determining whether or not the first setting information is convertible into second setting information, the first setting information being included in the obtained combined data, and the second setting information being information in a format previously designated by a user and executable by a second electric appliance; determining a first mark to be added to the image of the image data, if it is determined that the first setting information is convertible into the second setting information; and providing an interface for displaying the image of the image data to which the determined first mark is added, the image data being included in the combined data.

Moreover, an image presentation method according to still another aspect of the present invention is an image presentation method for causing a display device to display an image, the method including: providing an interface that obtains combined data including (i) image data of an image having an item as a subject and (ii) first setting information indicating processing which a first electric appliance performs on the item; determining whether or not the first setting information is second setting information, the first setting information being included in the obtained combined data, and the second setting information being information in a format previously designated by a user and executable by a second electric appliance; determining a first mark to be added to the image of the image data, if it is determined that the first setting information is the second setting information; and presenting the image of the image data to which the determined first mark is added, the image data being included in the combined data.

With this, the same effect as the effect of the image display method is produced.

For example, the image presentation method further includes obtaining a home appliance list that is a list corresponding to a user ID of the user and including one or more electric appliances previously designated, wherein in the determining of whether or not the first setting information, it is determined that the first setting information is convertible into the second setting information if the first setting information is convertible into the second setting information when at least one of the electric appliances included in the obtained home appliance list is the second electric appliance, and it is determined that the first setting information is inconvertible into the second setting information if the first setting information is inconvertible into the second setting information when any of the electric appliances included in the obtained home appliance list is the second electric appliance.

With this, the same effect as the effect of the image display method is produced.

For instance, the image presentation method further includes determining a second mark to be added to the image of the image data, if it is determined that the first setting information is inconvertible into the second setting information, the second mark being different from the first mark; and displaying the image of the image data to which the determined second mark is added, the image data being included in the combined data.

With this, the same effect as the effect of the image display method is produced.

Furthermore, an image display device according to yet another aspect of the present invention includes: an image obtaining unit configured to obtain combined data including (i) image data of an image having an item as a subject and (ii) first setting information indicating processing which a first electric appliance performs on the item; a determining unit configured to determine whether or not the first setting information is convertible into second setting information, the first setting information being included in the obtained combined data, and the second setting information being information in a format previously designated by a user and executable by a second electric appliance; a mark adding unit configured to determine a first mark to be added to the image of the image data, if it is determined that the first setting information is convertible into the second setting information; and a display unit configured to display the image of the image data to which the determined first mark is added, the image data being included in the combined data.

Moreover, an image display device according to still yet another aspect of the present invention includes: an image obtaining unit configured to obtain combined data including (i) image data of an image having an item as a subject and (ii) first setting information indicating processing which a first electric appliance performs on the item; a determining unit configured to determine whether or not the first setting information is second setting information, the first setting information being included in the obtained combined data, and the second setting information being information in a format previously designated by a user and executable by a second electric appliance; a mark adding unit configured to determine a first mark to be added to the image of the image data, if it is determined that the first setting information is the second setting information; and a display unit configured to display the image of the image data to which the determined first mark is added, the image data being included in the combined data.

With this, the same effect as the effect of the image display method is produced.

Furthermore, a program product according to a still further aspect of the present invention causes a computer to execute: obtaining combined data including (i) image data of an image having an item as a subject and (ii) first setting information indicating processing which a first electric appliance performs on the item; determining whether or not the first setting information is convertible into second setting information, the first setting information being included in the obtained combined data, and the second setting information being information in a format previously designated by a user and executable by a second electric appliance; determining a first mark to be added to the image of the image data, if it is determined that the first setting information is convertible into the second setting information; and displaying the image of the image data to which the determined first mark is added, the image data being included in the combined data.

With this, the same effect as the effect of the image display method is produced.

Moreover, a recoding medium according to a yet another aspect of the present invention is a recording medium on which the program product is recorded.

With this, the same effect as the effect of the image display method is produced.

Furthermore, a server device according to a still yet further aspect of the present invention is a server device that transmits, to an image display device connected to the server via a network, a program to be executed by the image display device, the server device including: a storage unit configured to store a program; and a transmitting unit configured to transmit to the image display device the program stored in the storage unit, upon receiving a request to download the program from the image display device, wherein the program causes the image display device to execute: obtaining combined data including (i) image data of an image having an item as a subject and (ii) first setting information indicating processing which a first electric appliance performs on the item; determining whether or not the first setting information is convertible into second setting information, the first setting information being included in the obtained combined data, and the second setting information being information in a format previously designated by a user and executable by a second electric appliance; determining a first mark to be added to the image of the image data, if it is determined that the first setting information is convertible into the second setting information; and displaying the image of the image data to which the determined first mark is added, the image data being included in the combined data.

With this, the same effect as the effect of the image display method is produced.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

The following describes embodiments in detail with reference to the Drawings.

Each of the embodiments described below shows a general or specific example. The numerical values, shapes, materials, structural elements, the arrangement and connection of the structural elements, steps, the processing order of the steps etc. shown in the following embodiments are mere examples, and therefore do not limit the scope of the appended Claims and their equivalents. Therefore, among the structural elements in the following embodiments, structural elements not recited in any one of the independent claims are described as arbitrary structural elements.

Embodiment 1

Embodiment 1 describes an exemplary communication device that (i) adds, to image data of an item on which an electric appliance performed processing, setting information obtained by converting, into a general format, setting information of the electric appliance when the processing was performed, and (ii) transmits the image data to which the setting information is added, to an accumulation server. It is to be noted that hereinafter converting into a general format may be described as "to generalize." It is also to be noted that hereinafter adding of setting information may be described as "to embed setting information." It is also to be noted that "image data of an item on which an electric appliance performed processing" is exemplary image data in this embodiment. In other words, a case where the image data is image data of an item before the processing is performed is also included in the technical scope of the present invention.

FIG. 1 is a configuration diagram illustrating an appliance control system according to this embodiment.

As illustrated in FIG. 1, an appliance control system 1 according to this embodiment includes a communication device 11, a terminal device 31, and an accumulation server 41.

The communication device 11 communicates with the terminal device 31 using proximity wireless communication, and communicates with the accumulation server 41 via a network. The communication device 11 obtains setting information by communicating with the terminal device 31. After performing processing to be described later on the obtained setting information, the communication device 11 transmits the setting information to the accumulation server 41. The communication device 11 is realized by a cellular phone, a smart phone (highly-functional cellular phone), or the like that includes a proximity wireless communication interface and a network communication interface.

The terminal device 31 obtains setting information of an electric appliance or the like from the communication device 11, sets the setting information to the electric appliance, and communicates with the communication device 11 using proximity wireless communication. The terminal device 31 may sometimes be realized as an internal function of an electric appliance, or as a separate device for use when connected to an electric appliance. Examples of the electric appliance include a home appliance, and in particular a microwave oven and an oven. The following describes an example where a home appliance is used as the electric appliance.

The accumulation server 41 is a server that accumulates data, and communicates with the communication device 11 via the network. Examples of the data include image data. The accumulation server 41 is capable of communicating with other communication devices (not shown) via the network. The other communication devices are capable of storing (uploading) image data into the accumulation server 41 by communicating with the accumulation server 41, and of obtaining (downloading) image data from the accumulation server 41. The accumulation server 41 is realized by a social networking service (SNS) site on the Internet, an image sharing site, or a file server accessible via a network.

Figure 2:
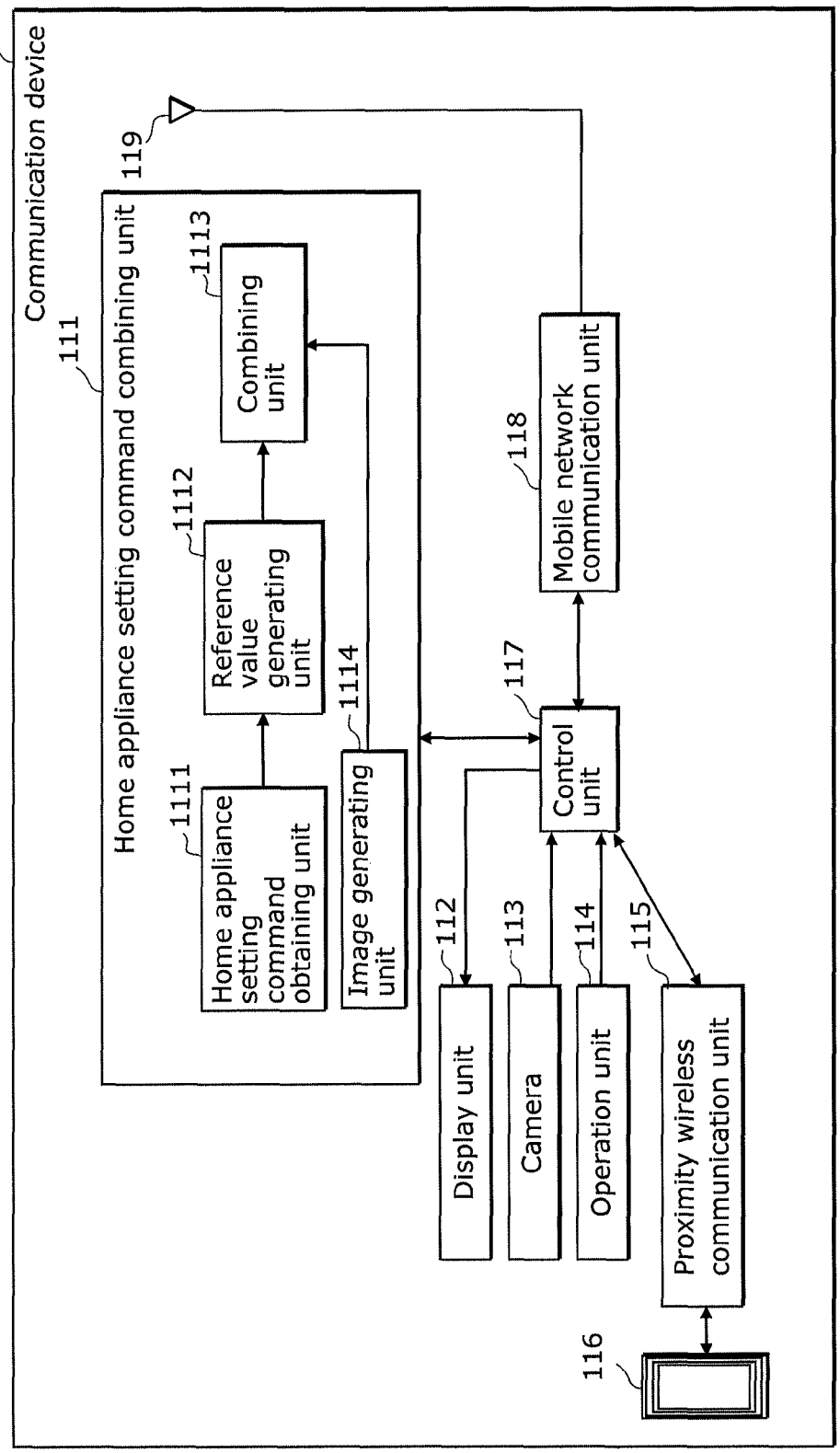
FIG. 2 is an exemplary functional block diagram illustrating a communication device according to Embodiment 1.

FIG. 2 is an exemplary functional block diagram illustrating the communication device 11 according to this embodiment.

As illustrated in FIG. 2, the communication device 11 includes a home appliance setting command combining unit 111, a display unit 112, a camera 113, an operation unit 114, a proximity wireless communication unit 115, a proximity wireless communication antenna 116, a control unit 117, a mobile network communication unit 118, and a mobile network communication antenna 119.

The home appliance setting command combining unit 111 combines a setting command of an electric appliance with image data of an item on which the electric appliance performed processing. The home appliance setting command combining unit 111 includes, as internal functions thereof, a home appliance setting command obtaining unit 1111, a reference value generating unit 1112, a combining unit 1113, and an image generating unit 1114.

The image generating unit 1114 obtains, using the camera 113, a picture having as a subject the item on which the electric appliance performed the processing, to generate image data of the picture. It is to be noted that instead of the picture, an image having as a subject an item on which an electric appliance performed processing can be also used. Specifically, instead of the picture, an illustration of the item on which the electric appliance performed the processing or image data of a text image can be also used.

The home appliance setting command obtaining unit 1111 communicates with the terminal device 31 via the proximity wireless communication unit 115 and the proximity wireless communication antenna 116, to obtain the setting command of the electric appliance. The home appliance setting command obtaining unit 1111 corresponds to a setting information obtaining unit.

The reference value generating unit 1112 converts the home appliance setting command obtained by the home appliance setting command obtaining unit 1111 into reference setting information that is setting information in a general format. Here, the setting information in the general format is setting information of a system independent of a specific model of the electric appliance. The reference value generating unit 1112 corresponds to a reference setting information generating unit. The reference setting information is identified by itself, a location (Uniform Resource Locator (URL)) where the reference setting information is stored, or the like. In other words, information identifying the reference setting information is the reference setting information itself or the location (URL).

It is to be noted that the home appliance setting command obtained by the home appliance setting command obtaining unit 1111 can be obtained by performing the reverse of the above conversion on the reference setting information. To put it another way, the reference setting information can be also said to be information indicating setting information of a first electric appliance.

It is to be noted that the term "convert" includes a case where information before conversion and information resulting from conversion of the information are identical. Stated differently, the term "convert" includes no conversion whatsoever if the conversion is unnecessary.

The combining unit 1113 stores, into the image data generated by the image generating unit 1114, the reference setting information generated by the reference value generating unit 1112, as data embedded in the image data. The image data into which the reference setting information is stored is also referred to as combined data. The combined data is identified by itself, a file name when the combined data is stored, a number assigned to the combined data, a location (URL) where the combined data is stored, or the like. In other words, information identifying the combined data is the combined data itself, the file name, the number, or the location (URL).

The display unit 112 is a display panel that displays display data made by the control unit 117.

The camera 113 captures an item on which an electric appliance performed processing, to generate image data.

The operation unit 114 is an interface that accepts an operation by a user. The operation unit 114 is realized by a touch panel, a keyboard, or the like, for example.

The proximity wireless communication unit 115 performs signal processing for communicating with the terminal device 31 using proximity wireless communication. It is to be noted that proximity wireless communication standards may be any communications standards. Examples of the proximity wireless communication standards include near field communication (NFC). In addition, a wireless local area network (LAN) compliant with IEEE 802.11, Bluetooth (registered trademark), ZigBee, or the like can be used as the proximity wireless communication standards.

The proximity wireless communication antenna 116 is an antenna that transmits and receives radio waves when the proximity wireless communication unit 115 performs communication.

The control unit 117 controls a series of information processing by the communication device 11, and transfers processing between functional blocks in the communication device 11. In addition, the control unit 117 transmits, to the accumulation server 41, the image data combined by the home appliance setting command combining unit 111. It is to be noted that the control unit 117 corresponds to a transmitting unit.

The mobile network communication unit 118 performs signal processing for communicating with the accumulation server 41 via the network. It is to be noted that network communication standards can be any communications standards. Examples of the network communication standards include a cellular phone network, a public wireless LAN network, a public phone line network, and a satellite communication network.

The mobile network communication antenna 119 is an antenna that transmits and receives radio waves when the mobile network communication unit 118 performs communication.

Figure 3:
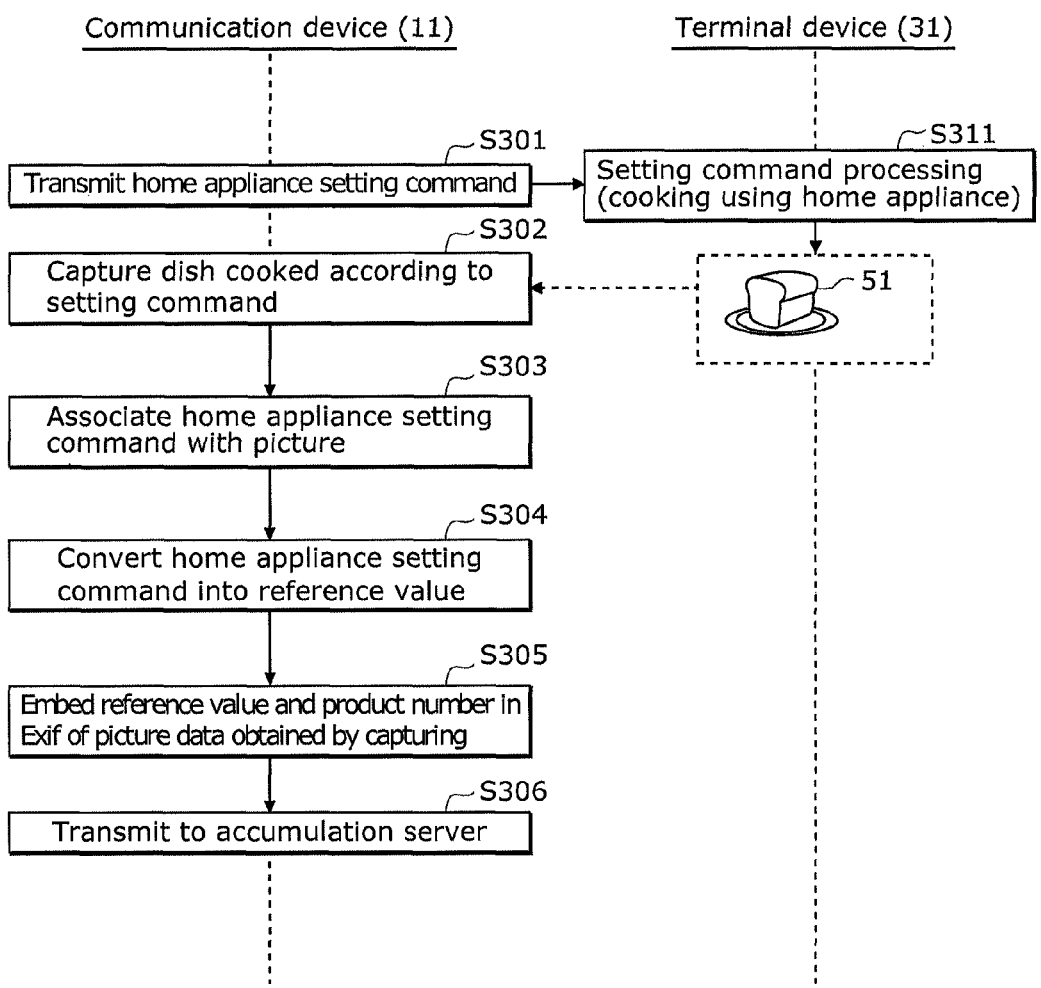
FIG. 3 is a sequence diagram illustrating exemplary processing by the communication device according to Embodiment 1.

FIG. 3 is a sequence diagram illustrating exemplary processing by the communication device 11 according to this embodiment. FIG. 4 is an explanatory diagram illustrating processing by the communication device 11 according to this embodiment. The processing by the communication device 11 according to this embodiment is described with reference to these figures.

First, the communication device 11 transmits a home appliance setting command to the terminal device 31 (step S301). The operation unit 114 of the communication device 11 accepts an operation by a user. The control unit 117 transmits the home appliance setting command generated by the operation of the user, to the terminal device 31 via the proximity wireless communication unit 115 and the proximity wireless communication antenna 116. There are various methods for generating a home appliance setting command. For one, there is a method for generating a home appliance setting command by causing a user to select a setting item, and this method is implemented by software on the communication device 11. For another, there is a method for generating a home appliance setting command in which the communication device 11 connects to a specific web site on the Internet via the mobile network communication unit 118 and the mobile network communication antenna 119 and causes a user to select a setting item according to data received from the web site. Here, the home appliance setting command is setting information when an electric appliance performs processing on an item. As a specific example, if bread is baked in an oven that is an electric appliance, the electric appliance, the item, and the processing correspond to the oven, the bread, and the "baking," respectively. The setting information corresponds to setting information for an oven such as "200° C.," "15 minutes," and their combination "200° C. for 15 minutes." It is to be noted that the present step (step S301) is not essential. In stead of the present step, the user may manually set the electric appliance.

Next, the terminal device 31 transmits the home appliance setting command received from the communication device 11 in step S301, to the electric appliance, and the electric appliance performs processing on an item according to the home appliance setting command (step S311). As a result, the item on which the processing has been performed is made. Specifically, for instance, the oven that is the terminal device performs processing that is baking on bread that is the item. As a result, the baked bread 51 is made.

Next, the communication device 11 obtains an image having as a subject the item on which the terminal device 31 performed the processing in step S311, to generate image data (step S302). The image generating unit 1114 of the communication device 11 captures, using the camera 113, a picture having as the subject the item on which the terminal device 31 performed the processing in step S311, to generate the image data. As a specific example, if the bread is baked in the oven, an image having the baked bread 51 as a subject is obtained to generate image data. It is to be noted that an image may be an image having as a subject an item on which an electric appliance has performed processing, and a picture, an illustration, or image data of a text image can be used. The processing of the present step is described in (a) of FIG. 4.

Next, the communication device 11 associates the home appliance setting command with the image (step S303). The image generating unit 1114 of the communication device 11 associates the home appliance setting command generated by the communication device 11 in step S301 with the image obtained in step S302. Here, the association refers to linking a home appliance setting command with an image. Specifically, the association refers to linking that an item that is a subject in the image is made by an electric appliance performing, on the item, processing according to the home appliance setting command. At this time, an interface for asking the user whether or not to perform the association may be provided to allow the user to decide whether or not to perform the association. The display of image in the present step may be as described in (b) of FIG. 4, for example.

Next, the communication device 11 converts the home appliance setting command into reference setting information (step S304). The reference value generating unit 1112 of the communication device 11 converts the home appliance setting command obtained by the home appliance setting command obtaining unit 1111 into setting information in a general format (reference setting information). Specifically, examples of the reference setting information include: a setting command reference value that expresses the setting information of the oven "220° C. for 11 minutes" as "0xA1233" (where "0x" is a prefix representing a hexadecimal number); and a reference command that directly expresses the setting information of the oven "220° C. for 11 minutes." It is to be noted that the reference value generating unit 1112 may hold a conversion table that stores setting information in a general format independent of a model of an electric appliance in association with setting information in a dedicated format of an electric appliance of a specific model. The above-mentioned conversion can be performed by referring to this conversion table. It is to be noted that the conversion into the reference setting information is not essential. If the conversion into the reference setting information is not performed, the home appliance setting command itself is used as the reference setting information in subsequent processing.

Next, the communication device 11 embeds the reference setting information in the image data (step S305). The combining unit 1113 of the communication device 11 embeds the reference setting information generated by the reference value generating unit 1112 into the image data generated by the image generating unit 1114. As a specific example, the combining unit 1113 stores the reference setting information generated by the reference value generating unit 1112 into exchangeable image file format (Exif) data of the image data obtained by the image generating unit 1114 using the camera 113.

Next, the communication device 11 transmits the image data in which the reference setting information is embedded in step S305, to the accumulation server 41 (step S306). The control unit 117 of the communication device 11 receives, from the home appliance setting command combining unit 111 (the combining unit 1113), the image data in which the reference setting information is embedded, and transmits the image data to the accumulation server 41 via the mobile network communication unit 118 and the mobile network communication antenna 119. It is to be noted that an interface for asking the user whether or not to transmit the image data to the accumulation server may be provided to allow the user to decide whether or not to transmit the image data to the accumulation server. Moreover, an interface for presenting to the user information identifying combined data may be provided. The display of image in the present step may be as described in (c) of FIG. 4, for example.

Since the image in which the reference setting information is embedded is stored in the accumulation server 41, the user who accesses the accumulation server 41 can browse the image data after step S306. An exemplary screen of the communication device 11 at that time is described in (d) of FIG. 4. In (d) of FIG. 4, the image data with a comment of the user is displayed as an image stored in the accumulation server 41 (a site name is "ABC").

As stated above, the image which has as the subject the item on which the electric appliance performed the processing and in which the home appliance setting command at the time of the processing is embedded is stored into the accumulation server 41.

FIG. 5 is an explanatory diagram illustrating setting processing by the communication device according to this embodiment. FIG. 5 is a diagram illustrating a specific method for associating a home appliance setting command with an image (step S303).

(a) of FIG. 5 illustrates an example where the communication device 11 performs proximity wireless communication with the terminal device 31 to obtain a home appliance setting command. For instance, if bread is baked in an oven, the proximity wireless communication antenna 116 of the communication device 11 is brought close to a proximity wireless communication antenna (not shown) of the terminal device 31 after the bread is baked, which allows the communication device 11 to obtain setting information of the oven when the bread was baked. In doing so, the user can cause the communication device 11 to obtain the setting information of the oven with no regard to a setting value. It is to be noted that if the setting information is obtained in such a manner, the communication device 11 may receive newest setting information of the terminal device 31 or receive past setting information items and allow the user to designate, among the past setting information items, suitable setting information. In this regard, the communication device 11 provides to the user an interface for allowing the user to designate, among the setting information items, the suitable setting information, and the user designates the suitable setting information using the interface.

(b) of FIG. 5 illustrates an example where the user oneself inputs setting information to the communication device 11. For instance, if bread is baked in an oven, the user inputs a setting value of the oven when the bread was baked, to the communication device 11 after the bread is baked. In doing so, the user can input the setting value while checking it by oneself.

(c) of FIG. 5 illustrates an example where the communication device 11 obtains a setting value of an oven by analyzing a captured image. Specifically, the setting value can be obtained by the image analysis based on a level of rise, color, or an amount of burning of bread. In doing so, the user can cause the communication device 11 to obtain the setting information of the oven with no regard to the setting value of the electric appliance.

FIG. 6A is an explanatory diagram illustrating exemplary embedded data of image data according to this embodiment. FIG. 6A is specifically a diagram illustrating a structure of data in Exif.

As illustrated in FIG. 6A, embedded data 601 of image data includes three parts of "file information," "camera information," and "manufacturer unique information." The file information includes items such as a file name (abc.jpg) of the image in which the embedded data is embedded, an image format (JPEG), and a file size (1.4 MB). The camera information includes items such as a manufacturer name (Xyz) of a camera capturing the image in which the embedded data is embedded, and a model (Opq 1). Arbitrary data is embedded in the manufacturer unique information.

The embedded data of the image data according to this embodiment is stored into the manufacturer unique information. As illustrated in FIG. 6A, examples of data written into the manufacturer unique information include a version (1.1), a setting command product number (NE-Q10), and a setting command reference value (0xA1233). The setting command reference value is generated in step S304. Instead of the setting command reference value, the reference setting command similarly generated in step S304 may be used. The version is a number assigned to a data format. The setting command product number indicates a model of the terminal device 31 that generates the setting command reference value. It is to be noted that the items other than the setting command reference value and the reference setting command are not essential.

FIG. 6B is an explanatory diagram illustrating setting command reference values and reference setting commands. (a) of FIG. 6B illustrates an exemplary setting command reference value that is the same as the setting command reference value written into the manufacturer unique information of FIG. 6A.

(b) of FIG. 6B illustrates other exemplary setting command reference values. When the terminal device 31 performs processing on an item, there is a case where the terminal device 31 sequentially performs the processing twice. In this case, as illustrated in (b) of FIG. 6B, two setting command reference values are described as setting command reference values 1 and 2. For instance, if bread is baked in an oven, there is a case where a procedure that the bread is baked at 240° C. for 7 minutes and subsequently baked at 220° C. for 20 minutes is followed. In such a case, a setting command reference value 0xA1244 corresponding to the process "baked at 240° C. for 7 minutes" and a setting command reference value 0xA1222 corresponding to the process "baked at 220° C. for 20 minutes" are both described.

(c) of FIG. 6B illustrates an exemplary reference setting command that corresponds to (a) of FIG. 6B. In other words, in the case of the oven, the reference setting command is information such as "200° C. for 10 minutes."

(d) of FIG. 6B illustrates other exemplary reference commands that correspond to (b) of FIG. 6B. As with the case in (b) of FIG. 6B, described is an example where when the terminal device 31 performs processing on an item, the terminal device 31 sequentially performs the processing twice. To put it another way, the two reference setting commands "240° C. for 7 minutes" and "220° C. for 10 minutes" are illustrated.

(e) of FIG. 6B illustrates an example showing a uniform resource locator (URL) (reference command URL) in which reference commands are stored. The above setting command reference values or reference commands may be previously stored in a predetermined site on the Internet, and a URL for accessing the setting command reference values or reference commands may be described in a portion of embedded data. In the example in (e) of FIG. 6B, reference commands are stored in http://aaa.com/aaa.html that is a URL.

Figure 7:
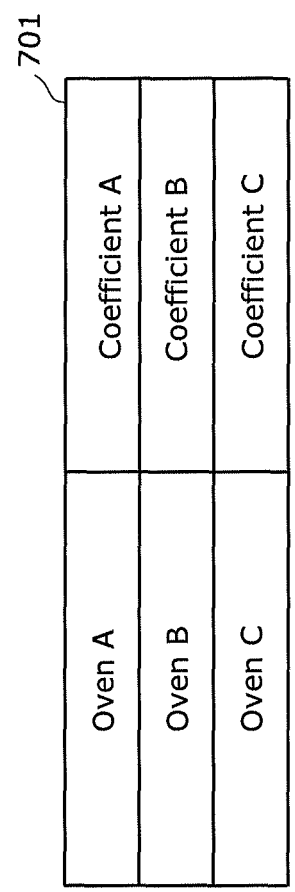
FIG. 7 is an exemplary conversion table for setting command according to Embodiment 1.

FIG. 7 is an exemplary conversion table 701 for setting command according to this embodiment. The conversion table 701 is a table showing a conversion number when a setting value of each of models (A, B, and C) of ovens is converted for each model into a setting command reference value. The conversion table 701 is used when the communication device 11 converts the home appliance setting command into the reference setting information in step S304. Specifically, when a setting value s of the oven A is converted into a setting command reference value, a coefficient A in a cell of the conversion table 701 corresponding to the oven A is referred to, and a setting command reference value t is calculated by multiplying the setting value s by the coefficient A. Moreover, when a setting value x for the oven B different in model from the oven A is converted into a setting command reference value, a coefficient B in a cell of the conversion table 701 corresponding to the oven B is referred to, and a setting command reference value y is calculated by multiplying the setting value x by the coefficient B. It is to be noted that although the conversion table 701 shows only the three models of the ovens, more than three models may be registered with the conversion table 701, and coefficients corresponding to models of other home appliances (e.g., bakers, induction cooktops, and washing machines) may be registered with the conversion table 701.

Although the example where the setting values of the home appliances are simply multiplied by the coefficients in the conversion table 701 is described above, a setting command including a combination of values can be also converted. For instance, the setting command "baking at 220° C. for 20 minutes" can be also converted into the setting command "baking at 210° C. for 22 minutes" that produces the same effect for an item to be processed.

The method for a general user to provide setting information of an electric appliance is described above as the communication device usage method. The general user provides the setting information, and other general users obtain the setting information, thereby enabling the general users to share the setting information of the electric appliance. Other examples of the usage method include a usage method for an oven provider or a bread material provider to embed recommended setting information of an oven in an image of bread and for an oven user or a bread material buyer to use the oven or bake bread using the setting information.

Although the oven is used for description as the specific example of the electric appliance, the method can be also applied to other electric appliances. For instance, the method can be also applied to a washing machine that is an electric appliance. Specifically, setting information of the washing machine when the washing machine washes clothes can be also embedded in image data of the clothes. This allows users to share the setting information of the washing machine that is capable of washing predetermined clothes with few wrinkles. Moreover, a clothing manufacturer can distribute setting information of a washing machine when the washing machine washes manufactured clothes, to buyers of the clothes.

As another example, the method can be also applied to a rice cooker that is an electric appliance. Specifically, setting information of the rice cooker when the rice cooker cooks rice can be also embedded in image data of the rice. This allows users to share the setting information of the rice cooker that cooks a predetermined type of rice well. Moreover, a rice provider can distribute setting information of a rice cooker when the rice cooker cooks rice sold by the rice provider, to buyers of the rice.

As a further example, the method can be also applied to an induction cooktop. Specifically, cooking setting when cooking is performed with the induction cooktop can be also embedded in image data.

As still another example, the method can be also applied to a video device such as a television. Specifically, timer recording information or keyword recording information to which users having the same likes and tastes set recording information can be also embedded in image data.

As still yet another example, a coping method according to a displayed error can be also embedded as setting information in an image in which an electric appliance displays error information.

As described above, in the communication method according to this embodiment, the image data in which the setting information in the general format corresponding to the setting information of the electric appliance when the processing was performed on the item is embedded is stored into the accumulation server. This image data is browsed and obtained by the user who accesses the accumulation server. The user who has obtained the image data can obtain the setting information of the electric appliance embedded in the image data along with the image data. As a result, it is possible to share the setting information of the electric appliance when the processing was performed on the item.

Moreover, the setting information is transmitted from the electric appliance to the communication device without the user of the communication device recognizing the details of the setting information of the electric appliance. In comparison to a case where the setting information is input manually by the user, the communication device is capable of obtaining the setting information more accurately. As a result, it is possible to share the setting information of the electric appliance when the processing was performed on the item.

Furthermore, the setting information of the electric appliance of the specific model is converted into the setting information in the general format independent of the model of the electric appliance, and the setting information in the general format is embedded in the image data. Using the setting information in the general format reduces a setting information conversion processing load in a device that has obtained the image.

Moreover, the setting information of the electric appliance when the processing was performed on the item is embedded in the image data which is generated by the camera included in the communication device and which has the item as the subject. As a result, the image data of the item is generated more easily.

Furthermore, the setting information of the electric appliance is embedded in format compliant with the Exif generally used to embed information in image data. As a result, the image in which the setting information of the electric appliance is treated in the same manner as general image data in which setting information of an electric appliance is not embedded.

Moreover, the setting information of the electric appliance is obtained by the input of the user. As a result, when a communication interface is absent between the communication device and the electric appliance, the setting information of the electric appliance is obtained.

Furthermore, the image data in which the setting information of the electric appliance when the processing was performed on the item is embedded is stored into the accumulation server. This image is browsed and obtained by the user who accesses the accumulation server. The user who has obtained the image data can obtain the setting information of the electric appliance embedded in the image data along with the image data. As a result, it is possible to share the setting information of the electric appliance when the processing was performed on the item.

Embodiment 2

Embodiment 2 describes an example where the generalization of setting information in Embodiment 1 is performed by a processing server instead of the communication device. It is to be noted that descriptions of the same configurations and processes as those in Embodiment 1 may be omitted.

Figure 8:
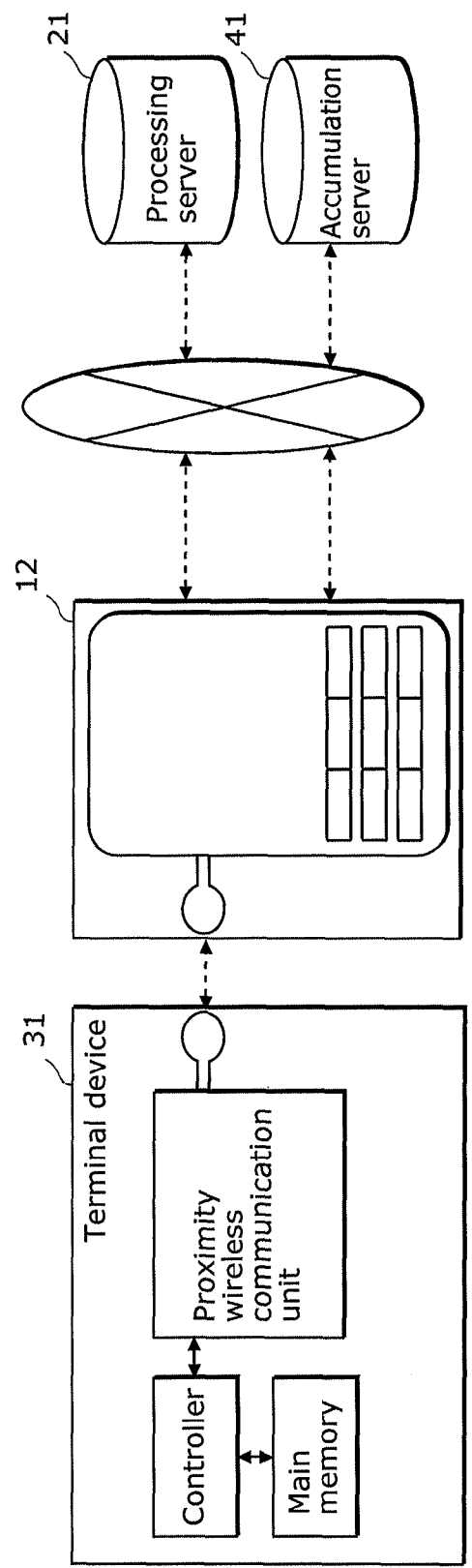
FIG. 8 is a configuration diagram illustrating an appliance control system according to Embodiment 2.

FIG. 8 is a configuration diagram illustrating an appliance control system according to this embodiment.

As illustrated in FIG. 8, an appliance control system 2 according to this embodiment includes a communication device 12, a processing server 21, a terminal device 31, and an accumulation server 41. Here, the appliance control system 2 differs from the appliance control system 1 according to Embodiment 1 in the communication device 12 and the processing server 21. The following describes these structural elements.

The communication device 12 communicates with the terminal device 31 using proximity wireless communication, and communicates with the processing server 21 and the accumulation server 41 via a network. The communication device 12 transmits, to the processing server 21, part of setting information obtained through the communication with the terminal device 31, and receives data processed by the processing server 21. Moreover, the communication device 12 transmits the processed data of the processing server 21 to the accumulation server 41. The communication device 12 is realized by a cellular phone, a smart phone (highly-functional cellular phone), or the like that includes a proximity wireless communication interface and a network communication interface.

The processing server 21 receives the data transmitted by the communication device 12, and transmits, as the processed data, the data on which processing to be described later was performed, to the communication device 12. The processing server is realized by a general server device or the like.

Figure 9A:
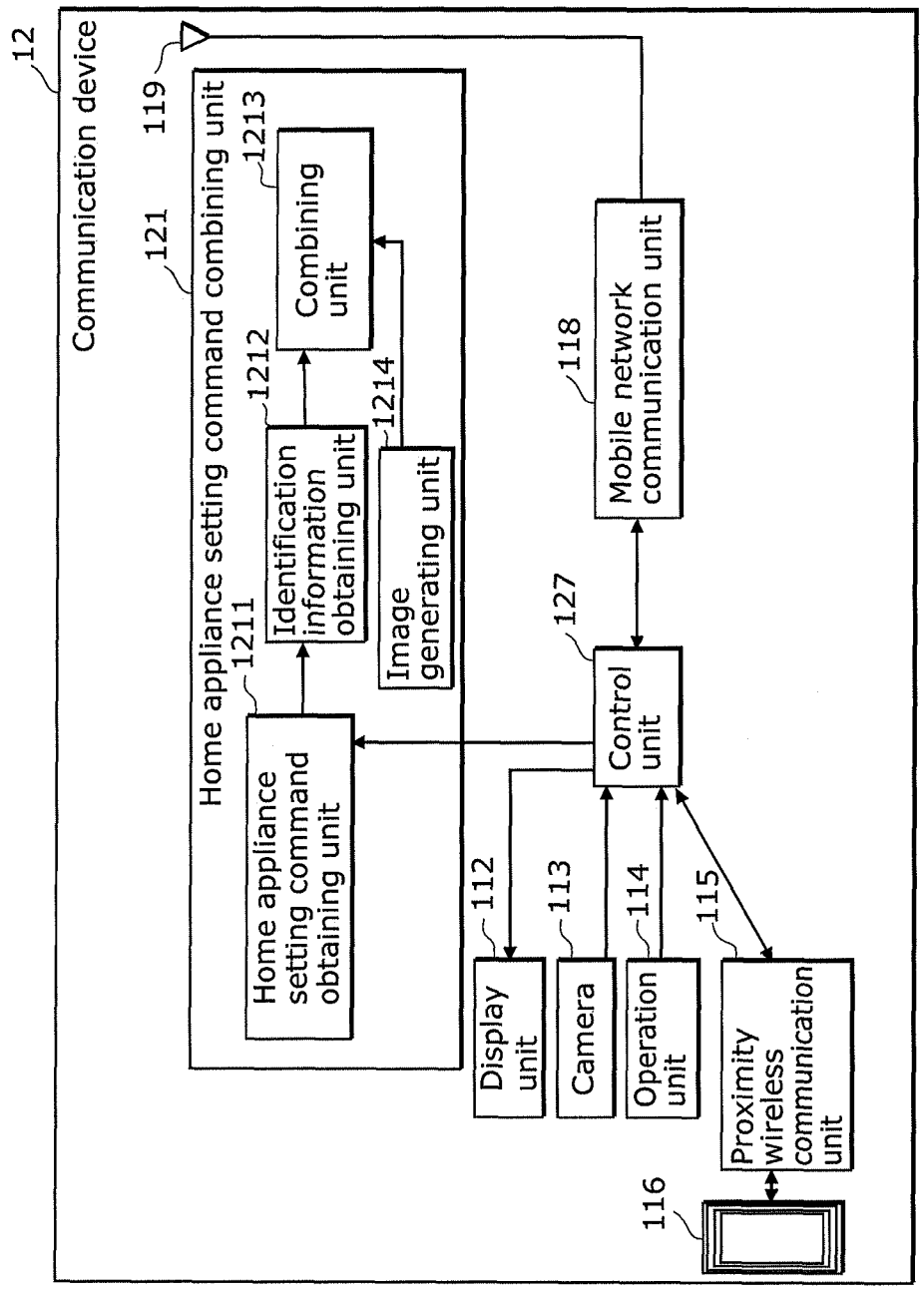
FIG. 9A is an exemplary functional block diagram illustrating a communication device according to Embodiment 2.

FIG. 9A is an exemplary functional block diagram illustrating the communication device 12 according to this embodiment. As illustrated in FIG. 9A, the communication device 12 includes a home appliance setting command combining unit 121, a display unit 112, a camera 113, an operation unit 114, a proximity wireless communication unit 115, a proximity wireless communication antenna 116, a control unit 127, a mobile network communication unit 118, and a mobile network communication antenna 119. Here, the communication device 12 differs from the communication device 11 according to Embodiment 1 in the home appliance setting command combining unit 121 and the control unit 127.

The home appliance setting command combining unit 121 combines a setting command of an electric appliance with image data of an item on which the electric appliance performed processing. The processing server 21 performs part of this processing. The home appliance setting command combining unit 121 includes, as internal functions thereof, a home appliance setting command obtaining unit 1211, an identification information obtaining unit 1212, a combining unit 1213, and an image generating unit 1214.

The image generating unit 1214 obtains, using the camera 113, a picture having as a subject the item on which the electric appliance performed the processing.

The home appliance setting command obtaining unit 1211 communicates with the electric appliance via the proximity wireless communication unit 115 and the proximity wireless communication antenna 116, to obtain the setting command of the electric appliance.

The identification information obtaining unit 1212 transmits, to the processing server 21, the home appliance setting command obtained by the home appliance setting command obtaining unit 1211. Then, the identification information obtaining unit 1212 obtains identification information into which the home appliance setting command is converted, from the processing server 21. Here, the identification information is information corresponding one-on-one to setting information (reference setting information) in a general format and for identifying the setting information in the general format. In other words, the identification information can be information for identifying reference setting information. It is to be noted that the identification information may be the setting information in the general format itself.

The combining unit 1213 embeds the identification information obtained by the identification information obtaining unit 1212 in the image data obtained by the image generating unit 1214.

The control unit 127 controls a series of information processing by the communication device 12, and transfers processing between functional blocks in the communication device 12. In addition, the control unit 127 transmits, to the accumulation server 41, the image data combined by the home appliance setting command combining unit 121.

Figure 9B:
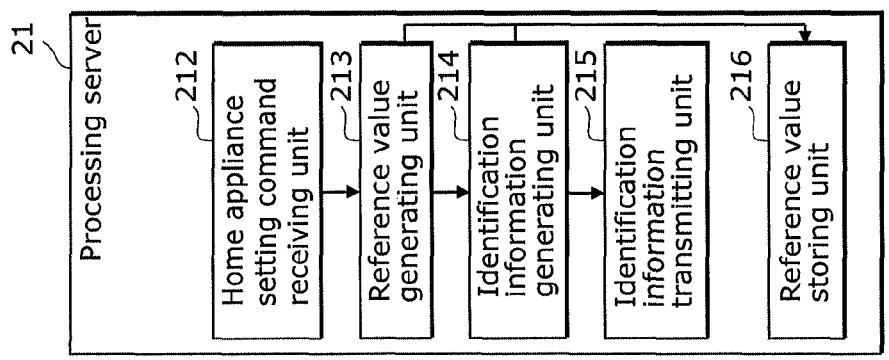
FIG. 9B is an exemplary functional block diagram illustrating processing server according to Embodiment 2.

FIG. 9B is an exemplary functional block diagram illustrating the processing server 21 according to this embodiment. As illustrated in FIG. 9B, the processing server 21 includes a home appliance setting command receiving unit 212, a reference value generating unit 213, an identification information generating unit 214, an identification information transmitting unit 215, and a reference value storing unit 216.

The home appliance setting command receiving unit 212 receives the home appliance setting command transmitted by the identification information obtaining unit 1212 of the communication device 12.

The reference value generating unit 212 converts the home appliance setting command obtained by the home appliance setting command receiving unit 212 into reference setting information that is generalized setting information.

The identification information generating unit 214 generates identification information corresponding to the reference setting information generated by the reference value generating unit 213.

The identification information transmitting unit 215 transmits, to the communication device 12, the identification information generated by the identification information generating unit 214.

The reference value storing unit 216 holds a reference value generated by the reference value generating unit 213 and the identification information generated by the identification information generating unit 214 in association with each other.

Figure 10:
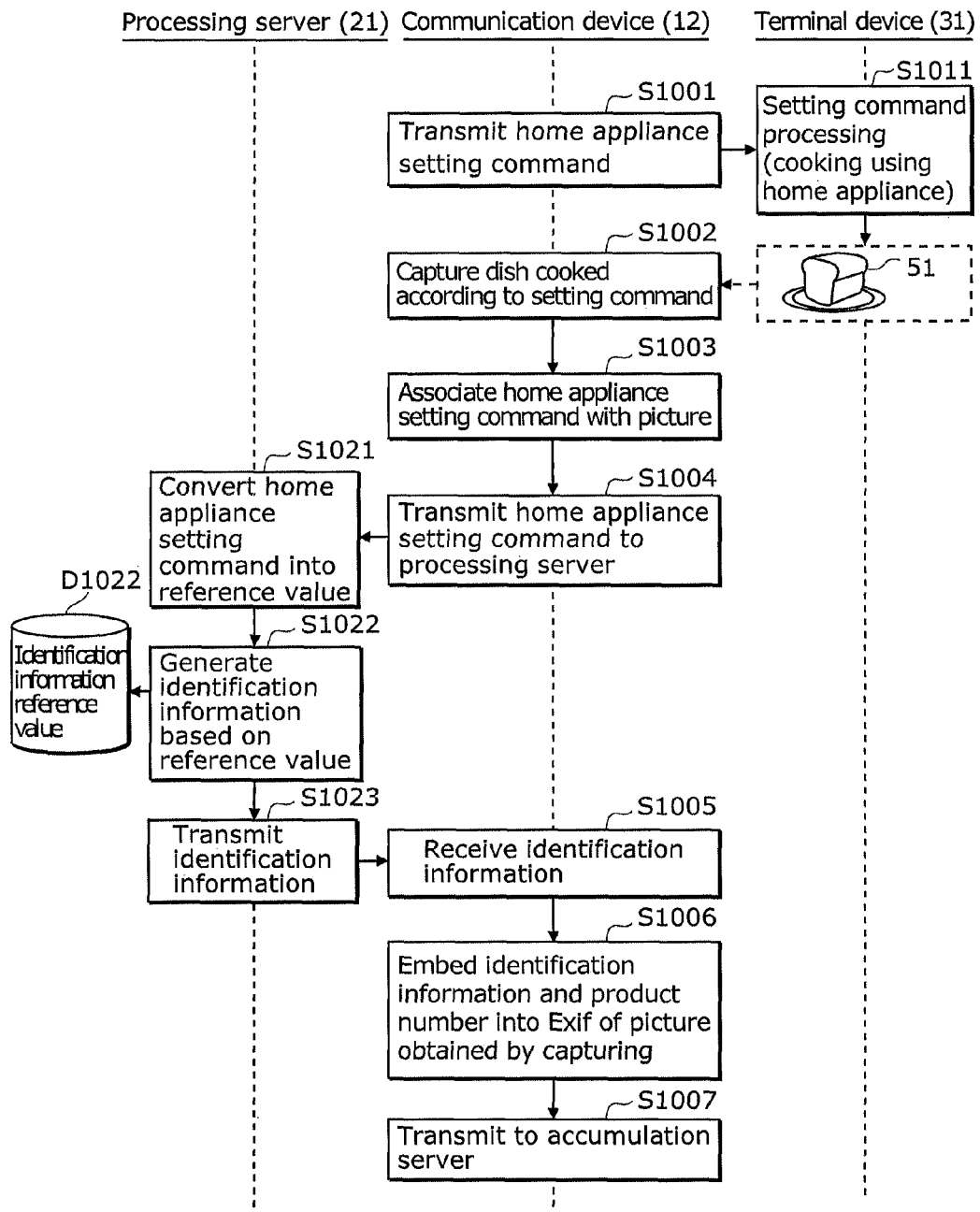
FIG. 10 is a sequence diagram illustrating exemplary processing by the communication device and the processing server according to Embodiment 2.

FIG. 10 is a sequence diagram illustrating exemplary processing by the communication device and the processing server according to this embodiment.

Processes in step S1001, step S1011, step S1002, and step S1003 in FIG. 10 are the same as those in step S301, step S311, step S302, and step S303 in Embodiment 1, and thus descriptions thereof are omitted.

The communication device 12 transmits a home appliance setting command to the processing server to convert the home appliance setting command into reference setting information (step S1004). The identification information obtaining unit 1212 of the communication device 12 transmits a home appliance setting command obtained by the home appliance setting command obtaining unit 1211, to the processing server 21 via the mobile network communication unit 118 and the mobile network communication antenna 119.

Next, the processing server 21 converts the home appliance setting command transmitted by the communication device 12 into the reference setting information (step S1021). The processing server 21 converts the home appliance setting command transmitted by the communication device 12 (the identification information obtaining unit 1212) in step S1004, into the reference setting information.

The process for converting the home appliance setting command into the reference setting information is the same as the process in step S304.

Next, the processing server 21 generates identification information corresponding to the reference setting information generated in step S1021 (step S1022). The processing server 21 generates the identification information that corresponds one-on-one to the reference setting information generated in step S1021 and makes it possible to uniquely identify the reference setting information, and stores an identification information reference value D1022 that is a correspondence relationship between the reference setting information and the identification information, into a storage device in the processing server 21. The identification information may be a value that is incremented every time identification information is generated, for instance. Moreover, the identification information may be a value that can be obtained by a hash function or the like using reference setting information as a key. Furthermore, the identification information may be generalized setting information itself. It is to be noted that although the storage device is in the processing server 21, the storage device may be at a place that is outside of the processing server 21 and allows communication with the processing server 21.

Next, the processing server 21 transmits the identification information generated in step S1022 to the communication device 12 (step S1023).

Next, the communication device 12 receives the identification information transmitted by the processing server 21 in step S1023 (step S1005). The identification information obtaining unit 1212 of the communication device 12 receives the identification information transmitted by the processing server 21 in step S1023, via the mobile network communication unit 118 and the mobile network communication antenna 119.

Next, the communication device 12 embeds the identification information in the image data (step S1006). The combining unit 1213 of the communication device 12 embeds, as embedded data of the image data obtained by the image generating unit 1214, the identification information obtained by the identification information obtaining unit 1212 in the image data. As a specific example, the combining unit 1213 stores the identification information obtained by the identification information obtaining unit 1212 into Exif data of the image data obtained by the image generating unit 1214 using the camera 113.

Next, the communication device 12 transmits the image data in which the identification information is embedded in step S1006, to the accumulation server 41 (step S1007). This process is the same as the process in step S306 in Embodiment 1.

Since the image in which the identification information is embedded is stored in the accumulation server 41, the user who accesses the accumulation server can browse the image data after step S1007.

As stated above, the image which has as the subject the item on which the electric appliance performed the processing and in which the identification information of the home appliance setting command at the time of the processing is embedded is stored into the accumulation server 41. It is to be noted that if the generalized setting information itself is used as the identification information in step S1022, the image in which the setting information of the home appliance setting command at the time of the processing is embedded is stored into the accumulation server 41.

As described above, in the communication method according to this embodiment, the processing server performs the process for converting the setting information of the electric appliance of the specific model into the setting information in the general format independent of the model of the electric appliance. This conversion process may require a conversion table, resulting in making the conversion process complex. The processing server is capable of preventing a processing load of the communication device from increasing, by performing the process.

Embodiment 3

Embodiment 3 describes an exemplary appliance control device that receives, from an accumulation server, image data of an item on which an electric appliance performed processing, in which setting information in a general format is embedded, and controls the electric appliance by setting the image data to the electric appliance.

Figure 11:
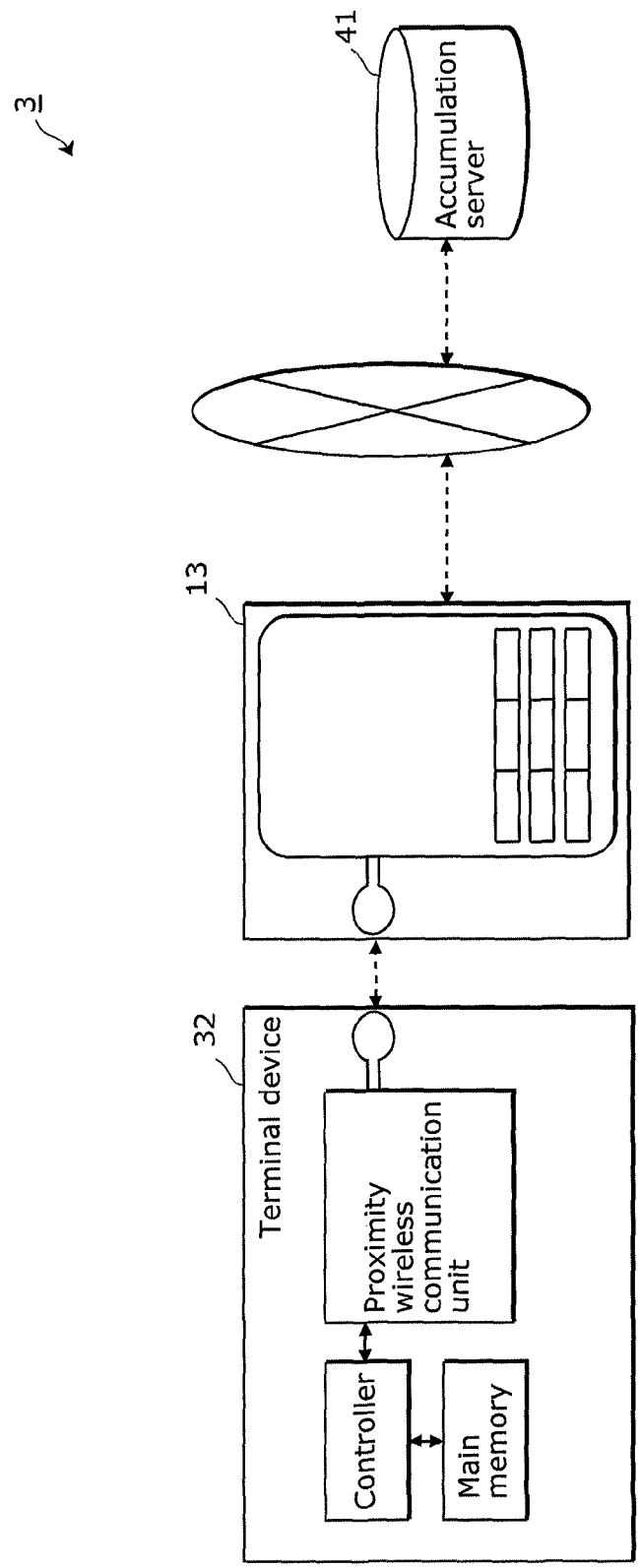
FIG. 11 is a configuration diagram illustrating an appliance control system according to Embodiment 3.

FIG. 11 is a configuration diagram illustrating an appliance control system according to this embodiment.

As illustrated in FIG. 11, an appliance control system 3 according to this embodiment includes an appliance control device 13, a terminal device 32, and an accumulation server 41.

The appliance control device 13 communicates with the terminal device 32 using proximity wireless communication, and communicates with the accumulation server 41 via a network. Moreover, the appliance control device 13 performs processing to be described later on image data which is received from the accumulation server 41 and in which control information of an electric appliance is embedded, and then transmits setting information to the terminal device 32 to control the terminal device 32. The appliance control device 13 is realized by a cellular phone, a smart phone (highly-functional cellular phone), or the like that includes a proximity wireless communication interface and a network communication interface.

The terminal device 32 obtains setting information of an electric appliance or the like, sets the setting information to the electric appliance, and communicates with the appliance control device 13 using proximity wireless communication. The terminal device 32 may sometimes be realized as an internal function of an electric appliance, or as a separate device for use when connected to an electric appliance. Examples of the electric appliance include a home appliance, and in particular a microwave oven and an oven. The following describes an example where a home appliance is used as the electric appliance.

The accumulation server 41 is a server that accumulates data, and communicates with the appliance control device 13 via the network. Examples of the data include image data. The accumulation server 41 is capable of communicating with other communication devices (not shown) via the network. The other communication devices are capable of storing (uploading) image data into the accumulation server 41 by communicating with the accumulation server 41, and of obtaining (downloading) image data from the accumulation server 41. The accumulation server 41 is realized by a social networking service (SNS) site on the Internet, an image sharing site, or a file server accessible via a network.

Figure 12:
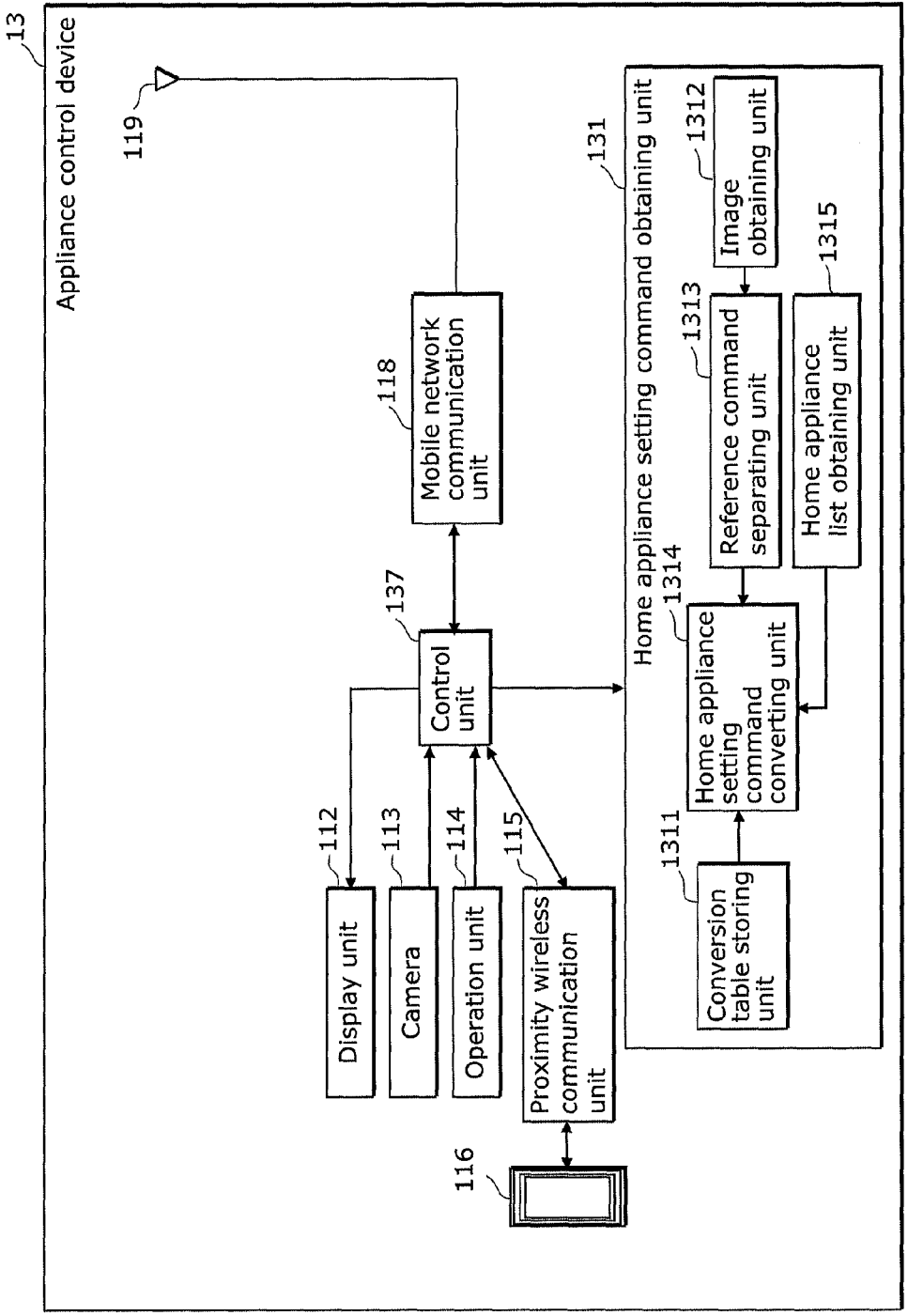
FIG. 12 is an exemplary functional block diagram illustrating an appliance control device according to Embodiment 3.

FIG. 12 is an exemplary functional block diagram illustrating the appliance control device 13 according to this embodiment. As illustrated in FIG. 12, the appliance control device 13 includes a home appliance setting command obtaining unit 131, a display unit 112, a camera 113, an operation unit 114, a proximity wireless communication unit 115, a proximity wireless communication antenna 116, a control unit 137, a mobile network communication unit 118, and a mobile network communication antenna 119. Here, the appliance control device 13 differs from the communication device 11 according to Embodiment 1 in the home appliance setting command obtaining unit 131 and the control unit 137. The following describes these structural elements. It is to be noted that the camera 113 is not an essential structural element. In other words, the appliance control device 13 may not need to include the camera 113.

The home appliance setting command obtaining unit 131 obtains image data from the accumulation server 41, and obtains or creates a list of home appliances of a user (a home appliance list). Then, the home appliance setting command obtaining unit 131 converts, by referring to the home appliance list, reference setting information embedded in the image data into setting information of an electric appliance of the user. The home appliance setting command obtaining unit 131 includes, as internal functions thereof, a conversion table storing unit 1311, an image obtaining unit 1312, a reference command separating unit 1313, a home appliance setting command converting unit 1314, and a home appliance list obtaining unit 1315. It is to be noted that the home appliance list may be obtained from a server or the like that stores the home appliance list, or created by the home appliance setting command obtaining unit 131. If there is a server that stores the home appliance list for other use, the home appliance list may be obtained from the server. This has the advantage that there is no need to place a server that stores a home appliance list exclusively for the appliance control device 13.

It is to be noted that although the home appliance list is described as the list of the home appliances of the user, the home appliance list may be alternatively a list of home appliances previously designated by the user. To put it another way, the home appliances indicated by the home appliance list are not limited to those of the user, and the home appliance list may be the list of the home appliances previously designated by the user.

The conversion table storing unit 1311 stores a conversion table that stores setting information in a general format independent of a model of an electric appliance in association with setting information in a dedicated format of an electric appliance of a specific model.

The image obtaining unit 1312 obtains image data of an item on which an electric appliance performed processing, in which reference setting information is embedded, from the accumulation server 41 via the mobile network communication unit 118 and the mobile network communication antenna 119.

The reference command separating unit 1313 separates (extracts) the setting information of the electric appliance from the image data obtained by the image obtaining unit 1312.

The home appliance list obtaining unit 1315 obtains or creates the list of the home appliances of the user (the home appliance list). There are various methods for creating a home appliance list. For instance, the user can receive identification information or the like of electric appliances of the user after performing polling in proximity wireless communication by bringing the appliance control device 13 close to the electric appliances, and establishing a communication link for the proximity wireless communication. The home appliance list obtaining unit 1315 makes it possible to create the home appliance list by causing the electric appliances of the user to sequentially perform the above receiving. It is to be noted that instead of creating the home appliance list with the above method, the home appliance list obtaining unit 1315 may obtain the home appliance list of the user from a device that has previously created and held the home appliance list.

The home appliance setting command converting unit 1314 converts the setting information of the electric appliance separated (extracted) by the reference command separating unit 1313, into the setting information of the electric appliance of the user.

The control unit 137 controls a series of information processing by the appliance control device 13, and transfers processing between functional blocks in the appliance control device 13. Moreover, the control unit 137 transmits a home appliance setting command generated by the home appliance setting command obtaining unit 131, to the terminal device 32 via the proximity wireless communication unit 115 and the proximity wireless communication antenna 116.

Figure 13:
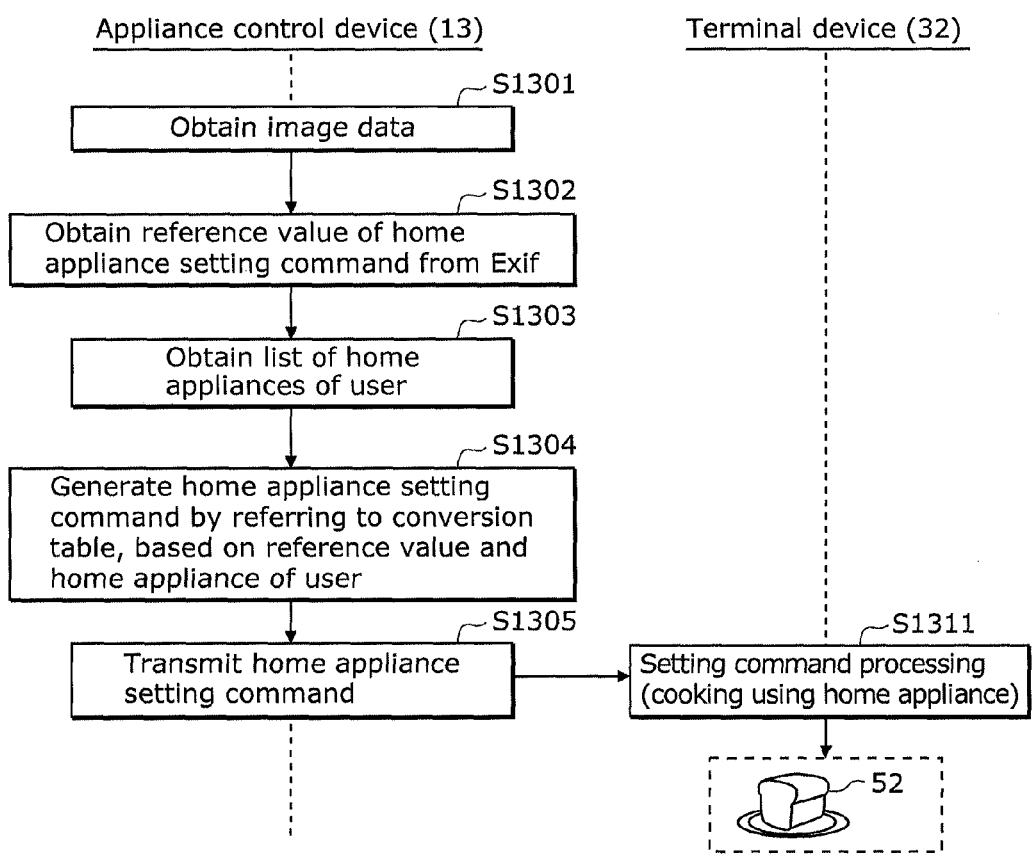
FIG. 13 is a sequence diagram illustrating exemplary processing by the appliance control device according to Embodiment 3.
Figure 14:
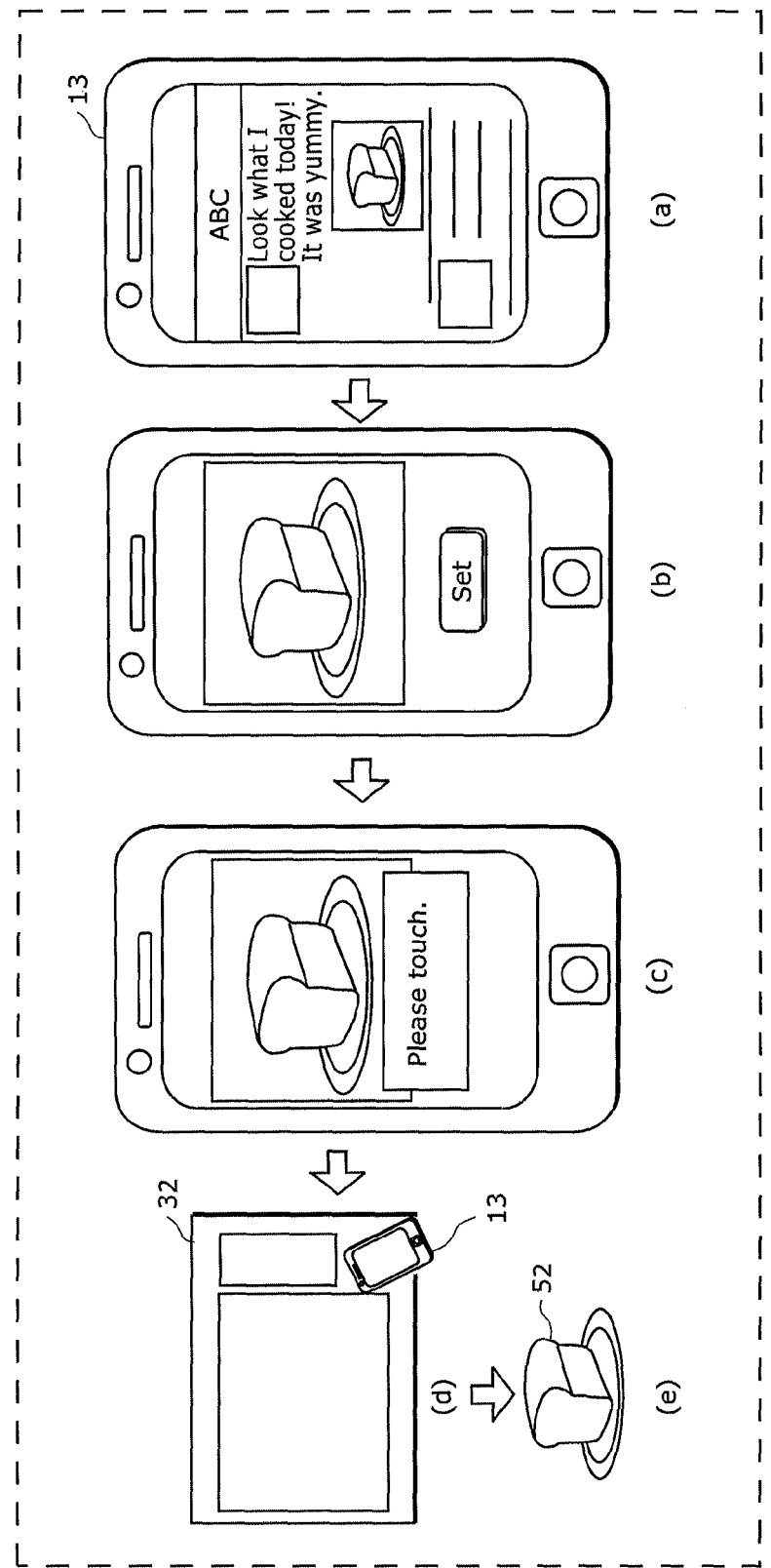
FIG. 14 is an explanatory diagram illustrating processing by the appliance control device according to Embodiment 3.

FIG. 13 is a sequence diagram illustrating exemplary processing by the appliance control device 13 according to this embodiment. FIG. 14 is an explanatory diagram illustrating processing by a communication device according to this embodiment. The processing by the communication device according to this embodiment is described with reference to these figures.

First, the appliance control device 13 obtains image data from the accumulation server 41 (step S1301). The user of the appliance control device 13 refers to an image stored in the accumulation server 41. Then, the user selects an image of an item on which processing desired by the user was performed. The image obtaining unit 1312 of the appliance control device 13 obtains image data of an item on which an electric appliance performed processing, in which reference setting information is embedded, via the mobile network communication unit 118 and the mobile network communication antenna 119. (a) of FIG. 14 illustrates an exemplary screen of the appliance control device 13 when the user browses an image stored in the accumulation server 41. (a) of FIG. 14 illustrates, as a specific example, a screen in which, if bread is baked in an oven, the user selects an image of the bread baked in the oven.

Next, the appliance control device 13 obtains the reference setting information from embedded data of the image data (step S1302). The reference command separating unit 1313 of the appliance control device 13 separates (extracts) the reference setting information stored in Exif data of the image data obtained by the image obtaining unit 1312. A data structure of the Exif data of the image data is the same as the one illustrated in FIG. 6A.

Next, the appliance control device 13 obtains a list of home appliances of the user (a home appliance list) (step S1303).

Next, the appliance control device 13 generates a home appliance setting command based on the reference setting information and the home appliance list (step S1304). The home appliance setting command converting unit 1314 of the appliance control device 13 obtains the setting information of the electric appliance separated (extracted) by the reference command separating unit 1313. Moreover, the home appliance setting command converting unit 1314 obtains the home appliance list obtained by the home appliance list obtaining unit 1315. Then, the home appliance setting command converting unit 1314 converts, by referring to a conversion table stored in the conversion table storing unit 1311, the setting information of the electric appliance into the home appliance setting command that is the setting information of the electric appliance of the user. It is to be noted that if the user has electric appliances or the like, the operation unit 114 may accept designation of an electric appliance by the user. The electric appliance designated here is an electric appliance for which the setting information is converted. Moreover, the electric appliance for which the setting information is converted may be designated by the user bringing the proximity wireless communication antenna 116 close to the electric appliance.

Next, the appliance control device 13 transmits, to the terminal device 32, the home appliance setting command generated in step S1304 (step S1305). The control unit 137 of the appliance control device 13 transmits the home appliance setting command generated by the home appliance setting command obtaining unit 131, to the terminal device 32 via the proximity wireless communication unit 115 and the proximity wireless communication antenna 116. In such case, the appliance control device 13 may provide to the user an interface that urges the user to bring the appliance control device 13 close to the terminal device 32. This step corresponds to (b) and (c) of FIG. 14.

Next, the terminal device 32 receives the home appliance setting command transmitted in step S1305, and performs processing on an item (step S1311). For example, if bread is baked in an oven, bread-baking control is performed based on setting of the oven (e.g., "200° C. for 15 minutes") received in step S1311. This makes the baked bread 52. This step corresponds to (d) and (e) of FIG. 14. The step allows the electric appliance of the user to perform, on the item, the same (or almost the same) processing as the setting information of the electric appliance of the user who has provided the image.

It is to be noted that the example is described above where the appliance control device 13 generates the home appliance setting command from the image data obtained from the accumulation server 41, and controls the terminal device 32 according to the generated home appliance setting command. To perform the same control, for example, the appliance control device 13 may transmit an ID of an electric appliance to the accumulation server 41, and the accumulation server 41 may transmit combined data to which a home appliance setting command is added, to the appliance control device 13. Moreover, for instance, the appliance control device 13 may transmit an ID of a user to the accumulation server 41, and the accumulation server 41 may transmit combined data to which a home appliance setting command for a corresponding model of an electric appliance in a home appliance list of the user, to the appliance control device 13.

As described above, in the appliance control method according to this embodiment, the setting information of the electric appliance is separated from the image data in which the setting information of the electric appliance is embedded, and the processing corresponding to the setting information is performed on the item using the electric appliance designated by the user. Here, even if the electric appliance (the first electric appliance) corresponding to the setting information embedded in the image data is different in model from the electric appliance (the second electric appliance) of the user, the second electric appliance is capable of performing the processing. This is because the appliance control device converts the setting information of the first electric appliance into a format suitable for the second electric appliance. As a result, it is possible to share the setting information of the electric appliance when the processing was performed on the item.

Moreover, it is possible to convert the setting information embedded in the image data into a format for an electrical appliance clearly designated by the user among electric appliances designated by the user. As a result, even if the user has the electric appliances of the different models, it is possible to appropriately convert setting information of the electric appliances and perform the processing on the item.

Moreover, the setting information is converted according to the conversion table.

Furthermore, the setting information embedded in the image data is converted into a format suitable for an electric appliance to which the user brings the appliance control device close among electric appliances designated by the user. As a result, even if the user has the electric appliances of the different models, it is possible to appropriately convert the setting information of the electric appliances and perform the processing on the item.

Embodiment 4

Embodiment 4 describes an example where instead of an appliance control device, a processing server performs the conversion into a home appliance setting command in Embodiment 3. It is to be noted that descriptions of the same configurations and processes as those in Embodiment 3 may be omitted.

Figure 15:
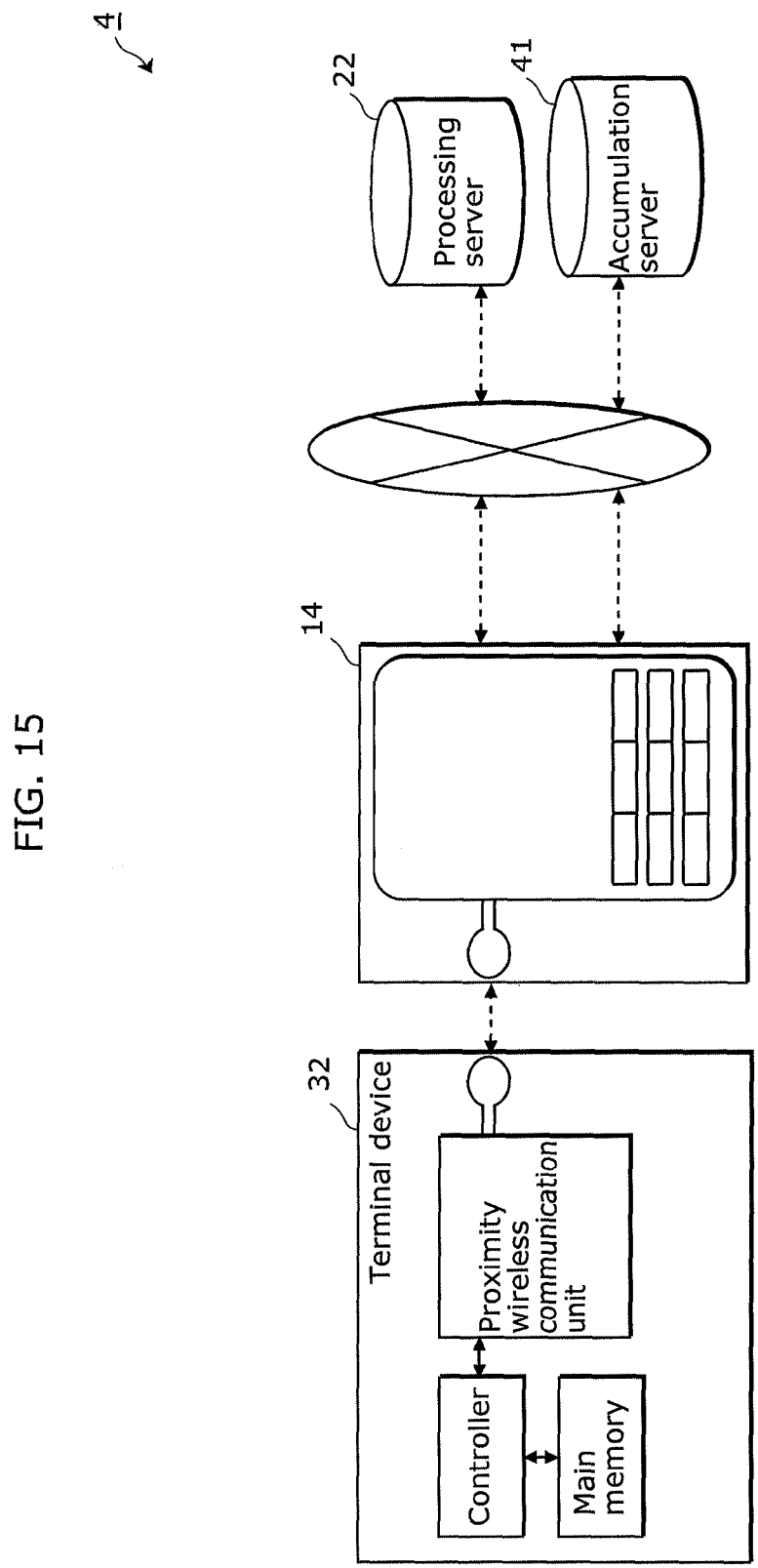
FIG. 15 is a configuration diagram illustrating an appliance control system according to Embodiment 4.

FIG. 15 is a configuration diagram illustrating an appliance control system according to this embodiment.

As illustrated in FIG. 15, an appliance control system 4 according to this embodiment includes an appliance control device 14, a processing server 22, a terminal device 32, and an accumulation server 41. Here, the appliance control system 4 differs from the appliance control system 3 according to Embodiment 3 in the appliance control device 14 and the processing server 22. The following describes these structural elements.

The appliance control device 14 communicates with the terminal device 32 using proximity wireless communication, and communicates with the accumulation server 41 via a network. Moreover, the appliance control device 14 transmits, to the processing server 22, embedded data of image data which is received from the accumulation server 41 and in which control information of an electric appliance is embedded, and receives processed data of the processing server 22 corresponding to the embedded data. Furthermore, the appliance control device 14 transmits setting information to the terminal device 32 to control the terminal device 32. The appliance control device 14 is realized by a cellular phone, a smart phone (highly-functional cellular phone), or the like that includes a proximity wireless communication interface and a network communication interface.

The processing server 22 receives the data transmitted by the appliance control device 14, and transmits, as the processed data, data obtained by the processing server 22 performing processing to be described later, to the appliance control device 14. The processing server is realized by a general server device or the like.

Figure 16A:
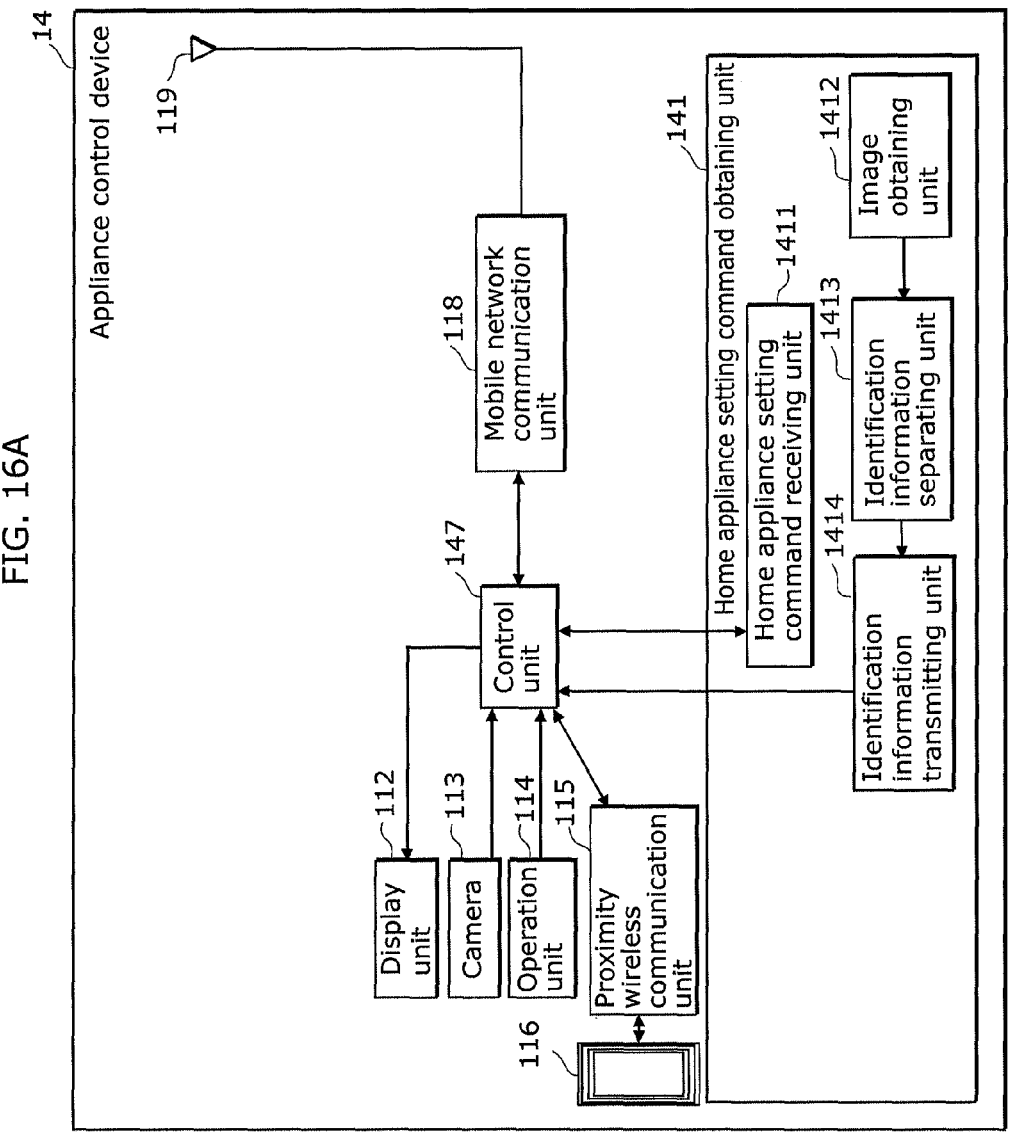
FIG. 16A is an exemplary functional block diagram illustrating an appliance control device according to Embodiment 4.

FIG. 16A is an exemplary functional block diagram illustrating the appliance control device according to this embodiment. As illustrated in FIG. 16A, the appliance control device 14 includes a home appliance setting command obtaining unit 141, a display unit 112, a camera 113, an operation unit 114, a proximity wireless communication unit 115, a proximity wireless communication antenna 116, a control unit 147, a mobile network communication unit 118, and a mobile network communication antenna 119. Here, the appliance control device 14 differs from the appliance control device 13 according to Embodiment 3 in the home appliance setting command obtaining unit 141 and the control unit 147. It is to be noted that the camera 113 is not an essential structural element. In other words, the appliance control device 14 may not need to include the camera 113.

The home appliance setting command obtaining unit 141 obtains image data from the accumulation server 41, and separates identification information from embedded data of the image data. Then, the home appliance setting command obtaining unit 141 converts the identification information into setting information of an electric appliance of a user. The processing server 22 performs part of this processing. The home appliance setting command obtaining unit 141 includes, as internal functions thereof, a home appliance setting command receiving unit 1411, an image obtaining unit 1412, an identification information separating unit 1413, and an identification information transmitting unit 1414.

The image obtaining unit 1412 obtains the image data from the accumulation server 41 via the mobile network communication unit 118 and the mobile network communication antenna 119. This image data is an image having as a subject an item on which an electric appliance performed processing, and embedded data of the image data includes identification information corresponding to setting information of the electric appliance when the processing was performed on the item.

The identification information separating unit 1413 separates (extracts) the identification information from the embedded data of the image data obtained by the image obtaining unit 1412.

The identification information transmitting unit 1414 transmits the identification information separated (extracted) by the identification information separating unit 1413 to the processing server 22 via the mobile network communication unit 118 and the mobile network communication antenna 119.

The home appliance setting command receiving unit 1411 receives a reference setting command into which the processing server 22 converts the identification information transmitted by the identification information transmitting unit 1414.

The control unit 147 controls a series of information processing by the appliance control device 14, and transfers processing between functional blocks in the appliance control device 14. Moreover, the control unit 147 transmits a home appliance setting command generated by the home appliance setting command obtaining unit 141, to the terminal device 32 via the proximity wireless communication unit 115 and the proximity wireless communication antenna 116.

Figure 16B:
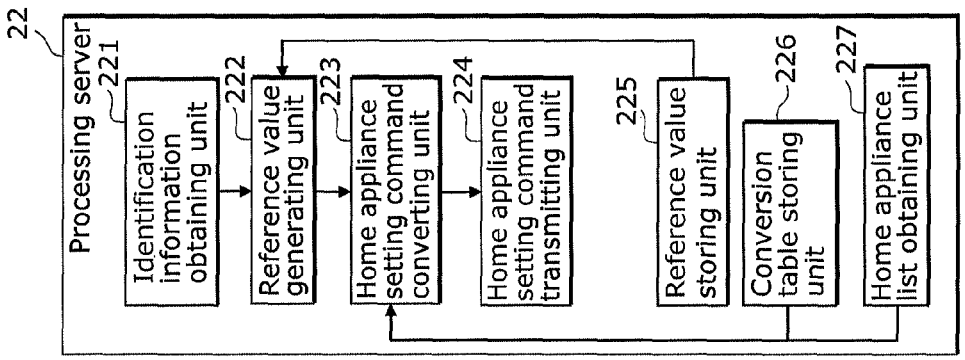
FIG. 16B is an exemplary functional block diagram illustrating a processing server according to Embodiment 4.

FIG. 16B is an exemplary functional block diagram illustrating the processing server according to this embodiment. As illustrated in FIG. 16B, the processing server 22 includes an identification information obtaining unit 221, a reference value generating unit 222, a home appliance setting command converting unit 223, a home appliance setting command transmitting unit 224, a reference value storing unit 225, a conversion table storing unit 226, and a home appliance list obtaining unit 227.

The identification information obtaining unit 221 receives the identification information transmitted by the appliance control device 14.

The reference value generating unit 222 converts, by referring to a conversion table for identification information and reference setting command, identification information obtained by the identification information obtaining unit 221 into a reference setting command.

The home appliance setting command converting unit 223 converts, by referring to a list of home appliances of the user of the appliance control device 14 (a home appliance list), the reference setting command converted by the reference value generating unit 222, into a home appliance setting command of an electric appliance of the user.

The home appliance setting command transmitting unit 224 transmits the home appliance setting command converted by the home appliance setting command converting unit 223, to the appliance control device.

The reference value storing unit 225 holds a reference value and identification information in association with each other. This correspondence relationship is created when the identification information is generated by converting the home appliance setting command into the reference value. It is to be noted that the reference value storing unit 225 corresponds to the reference value storing unit 216 in Embodiment 2.

The conversion table storing unit 226 stores the conversion table for identification information and reference setting command referred to by the reference value generating unit 222.

The home appliance list obtaining unit 227 obtains or creates the list of the home appliances of the user (the home appliance list).

Figure 17:
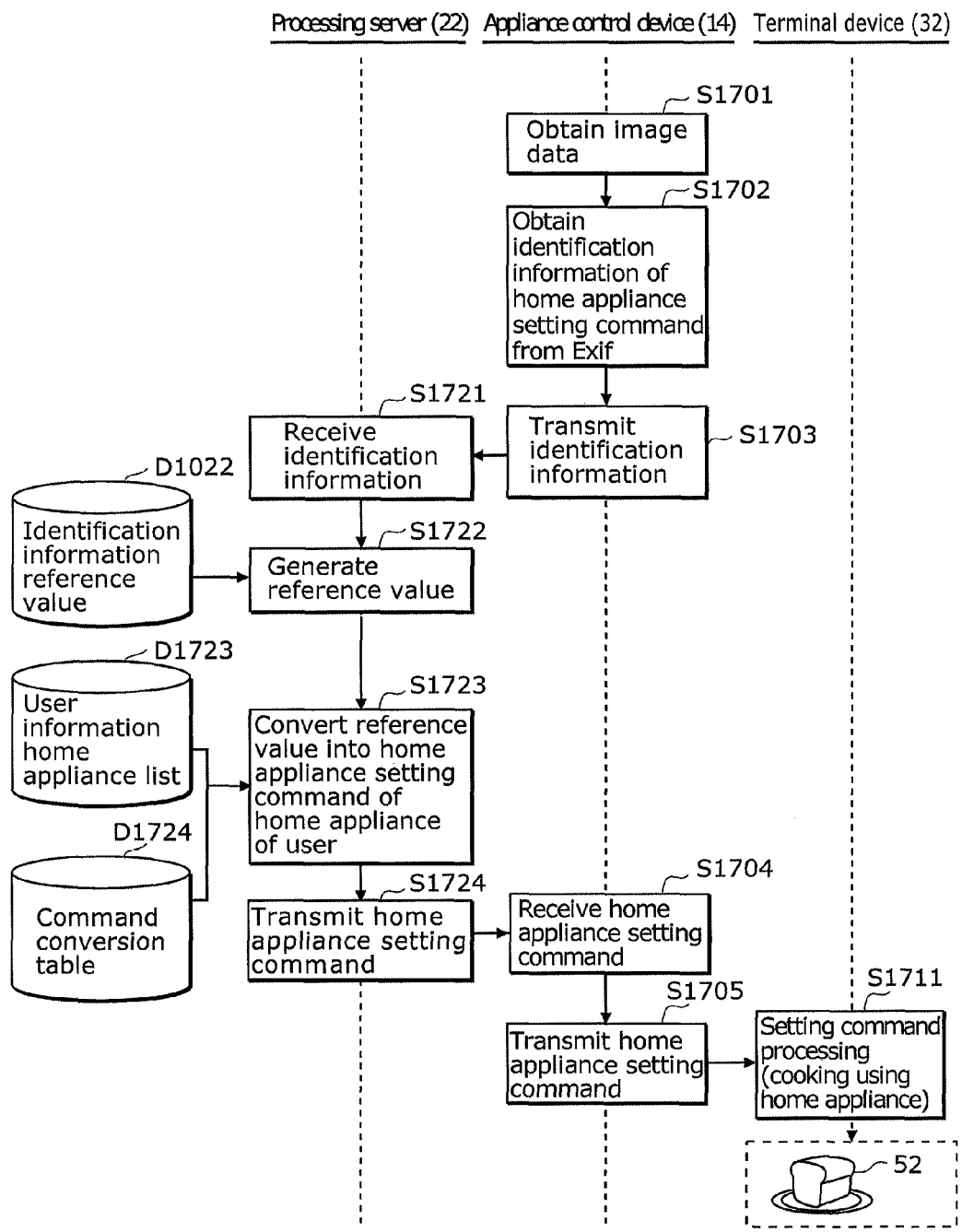
FIG. 17 is a sequence diagram illustrating exemplary processing by a communication device and the processing server according to Embodiment 4.

FIG. 17 is a sequence diagram illustrating exemplary processing by the communication device and the processing server according to this embodiment.

First, the appliance control device 14 obtains image data from the accumulation server 41 (step S1701). The user of the appliance control device 14 refers to an image stored in the accumulation server 41. Then, the user selects an image of an item on which processing desired by the user was performed. The image obtaining unit 1412 of the appliance control device 14 obtains image data of an item on which an electric appliance performed processing, in which identification information converted from reference setting information is embedded, via the mobile network communication unit 118 and the mobile network communication antenna 119.

Next, the appliance control device 14 obtains the identification information from embedded data of the image data obtained in step S1701 (step S1702). The identification information separating unit 1413 of the appliance control device 14 separates (extracts) the identification information stored in Exif data of the image data obtained by the image obtaining unit 1412. A data structure of the Exif data of the image data is illustrated in FIG. 6A.

Next, the appliance control device 14 transmits the identification information obtained in step S1702 to the processing server 22 (step S1703). The identification information transmitting unit 1414 of the appliance control device 14 transmits the identification information separated (extracted) by the identification information separating unit 1413 to the processing server 22 via the mobile network communication unit 118 and the mobile network communication antenna 119.

Next, the processing server 22 receives the identification information transmitted by the appliance control device 14 in step S1703 (step S1721). The identification information obtaining unit 221 of the processing server 22 receives the identification information transmitted by the identification information transmitting unit 1414 of the appliance control device 14.

Next, the processing server 22 generates a reference value based on the identification information received in step S1721 (step S1722). The reference value generating unit 22 of the processing server 22 converts, by referring to a conversion table for the identification information received in step S1702 and a reference setting command, the identification information obtained by the identification information obtaining unit 221 into a reference setting command. Here, the conversion table is an identification information reference value D1022 that is created when the identification information is generated in Embodiment 2 and is a correspondence relationship between the reference setting information and the identification information.

Next, the processing server 22 converts the reference value generated in step S1722 into the home appliance setting command of the electric appliance of the user (step S1723). The home appliance setting command converting unit 223 of the processing server 22 searches, by referring to the list of the home appliances of the user (the home appliance list), for an electric appliance capable of performing processing corresponding to the reference value generated in step S1722. When the electric appliance capable of performing the processing corresponding to the reference value is found, the home appliance setting command converting unit 223 converts, by referring to the conversion table stored in the conversion table storing unit 226, the reference value generated in step S1722 into the home appliance setting command of the electric appliance of the user.

Next, the processing server 22 transmits the home appliance setting command converted in step S1723 to the appliance control device 14 (step S1724).

Next, the appliance control device 14 receives the home appliance setting command transmitted by the processing server 22 in step S1724 (step S1704). The home appliance setting command receiving unit 1411 of the appliance control device 14 receives the home appliance setting command transmitted by the processing server 22 in step S1723, via the mobile network communication unit 118 and the mobile network communication antenna 119.

Next, the appliance control device 14 transmits the home appliance setting command to the terminal device 31 (step S1705). The control unit 147 of the appliance control device 14 transmits the home appliance setting command received by the home appliance setting command receiving unit 1411 in step S1704, to the terminal device 32 via the proximity wireless communication unit 115 and the proximity wireless communication antenna 116.

Next, the terminal device 32 receives the home appliance setting command transmitted in step S1705, and performs processing on an item (step S1711).

As described above, in the appliance control method according to this embodiment, the processing server is capable of converting setting information of a first electric appliance into a format suitable for a second electric appliance. This conversion process may require a conversion table, resulting in making the conversion process complex. The processing server is capable of preventing a processing load of the communication device from increasing, by performing the process.

Embodiment 5

Embodiment 5 describes an exemplary display device that allows a user to visually identify an image that is obtained from an accumulation server and includes setting information of an electric appliance when processing was performed on an item, in a mode different from a mode for a general image.

Figure 18:
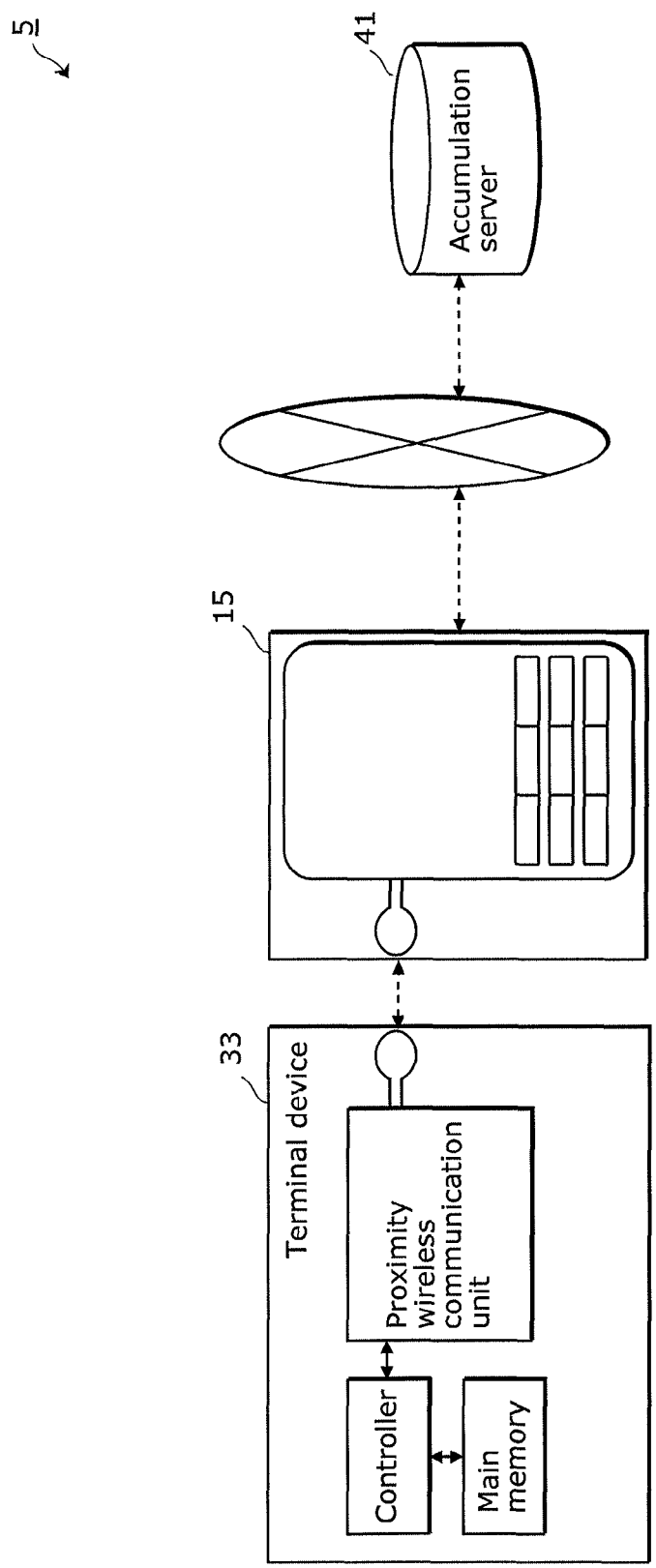
FIG. 18 is a configuration diagram illustrating an appliance control system according to Embodiment 5.

FIG. 18 is a configuration diagram illustrating an appliance control system 5 according to this embodiment. As illustrated in FIG. 18, the appliance control system 5 includes a display device 15, a terminal device 33, and an accumulation server 41.

The display device 15 communicates with the terminal device 33 using proximity wireless communication, and communicates with the accumulation server 41 via a network. Moreover, the display device 15 receives, from the accumulation server 41, image data in which control information of an electric appliance is embedded, or general image data.

An appliance control device 13 is realized by a cellular phone, a smart phone (highly-functional cellular phone), or the like that includes a proximity wireless communication interface and a network communication interface.

The terminal device 33 obtains and sets setting information of an electric appliance or the like, and communicates with the display device 15 using proximity wireless communication. The terminal device 33 may sometimes be realized as an internal function of an electric appliance, or as a separate device for use when connected to an electric appliance. Examples of the electric appliance include a home appliance, and in particular a microwave oven and an oven. The following describes an example where a home appliance is used as the electric appliance.

The accumulation server 41 is a server that accumulates data, and communicates with the display device 15 via the network. Examples of the data include image data. The accumulation server 41 is capable of communicating with other communication devices (not shown) via the network. The other communication devices are capable of storing (uploading) image data into the accumulation server 41 by communicating with the accumulation server 41, and of obtaining (downloading) image data from the accumulation server 41. The accumulation server 41 is realized by a social networking service (SNS) site on the Internet, an image sharing site, or a file server accessible via a network.

Figure 19:
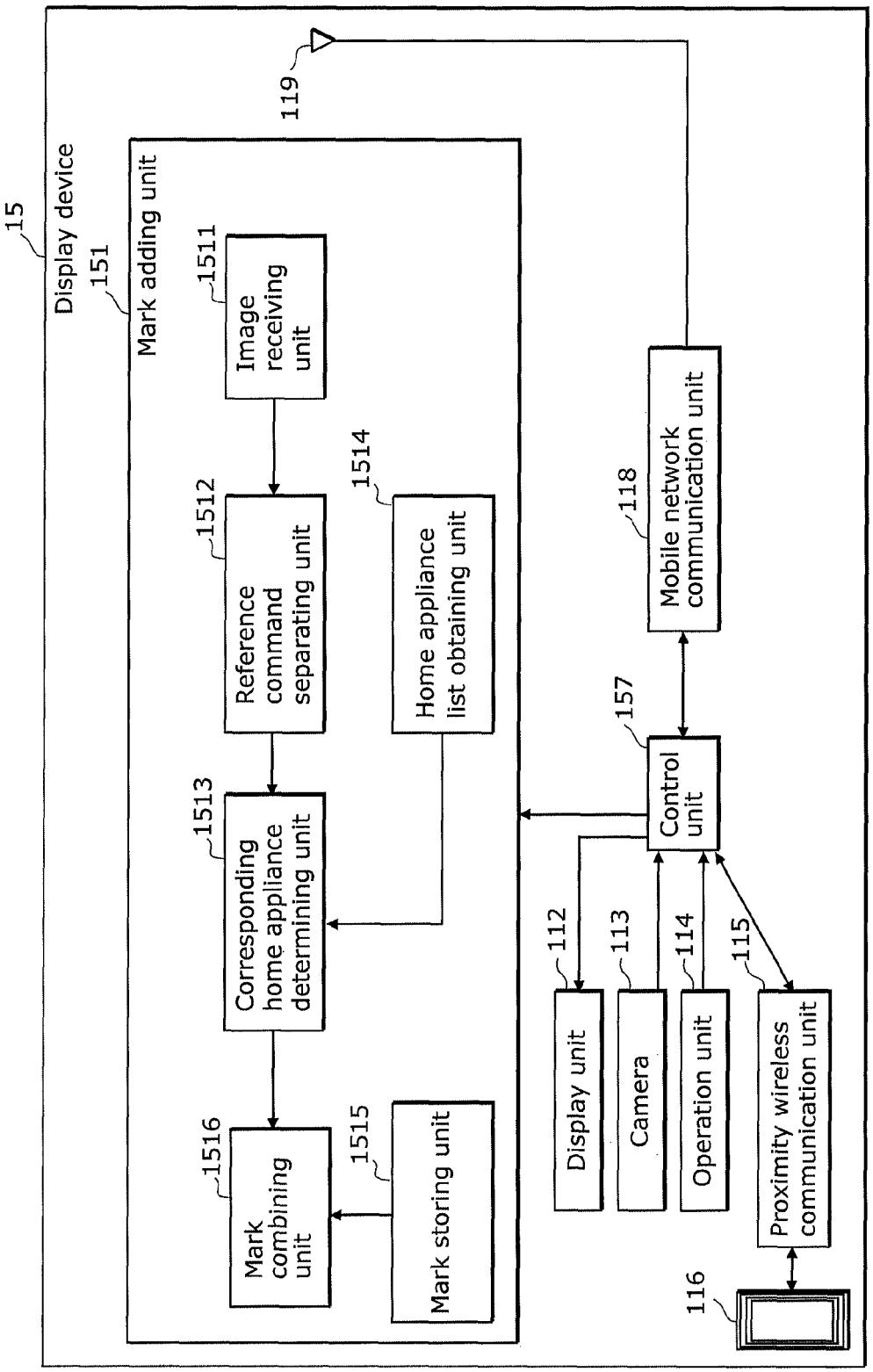
FIG. 19 is an exemplary functional block diagram illustrating a display device according to Embodiment 5.

FIG. 19 is an exemplary functional block diagram illustrating the display device 15 according to this embodiment.

As illustrated in FIG. 19, the display device 15 includes a mark adding unit 151, a display unit 112, a camera 113, an operation unit 114, a proximity wireless communication unit 115, a proximity wireless communication antenna 116, a control unit 157, a mobile network communication unit 118, and a mobile network communication antenna 119. Here, the display device 15 differs from the appliance control device 13 according to Embodiment 3 in the mark adding unit 151 and the control unit 157. The following describes these structural elements. It is to be noted that the camera 113 is not an essential structural element. In other words, the display device 15 may not need to include the camera 113.

The mark adding unit 151 distinguishes between an image including setting information of an electric appliance when processing was performed on an item (hereinafter referred to as a "setting image") and an image not including such (hereinafter referred to as a "general image"), and adds a predetermined mark to a setting image. Here, the phrase "add a, predetermined mark to a setting image" is also expressed as "generate a combined image."

The mark adding unit 151 may change a mark to be added, depending on when setting information included in a setting image can be processed by an electric appliance of the user of the display device or when the setting information included in the setting image cannot be processed by the electric appliance of the user of the display device. Moreover, the mark adding unit 151 may only determine (select) the mark to be added. In this case, another functional block may be caused to display that the determined (selected) mark is added to an image. It is to be noted that examples of a mark typically include an icon (e.g., a figure and a pattern), a character, and a symbol. In this regard, however, instead of adding a mark to a setting image, a method for presenting to a user a setting image in a mode different from a mode for another image can be also used. Specifically, such a method includes a method for presenting to a user a setting image in a mode different from a mode for another image, by displaying the setting image surrounded with a frame of a predetermined color, by displaying the setting image of which a hue, brightness, or transparency is changed, by displaying the setting image increased in size, or the like. Moreover, the phrase "display that a mark is added to an image" includes not only displaying an image on which a mark is overlaid (superimposed) but also displaying a mark adjacent to an image.

The mark adding unit 151 includes, as internal functions thereof, an image receiving unit 1511, a reference command separating unit 1512, a corresponding home appliance determining unit 1513, a home appliance list obtaining unit 1514, a mark storing unit 1515, and a mark combining unit 1516.

The image receiving unit 1511 obtains the image data of the setting image and the general image from the accumulation server 41 via the mobile network communication unit 118 and the mobile network communication antenna 119, and holds the image data. In the setting image, setting information is stored in the exchangeable image file format (Exif) data of the image data illustrated in FIG. 6A, for instance.

The reference command separating unit 1512 separates (extracts) the setting information of the electric appliance from the image held by the image obtaining unit 1511. The setting information thus separated (extracted) is also referred to as first setting information. It is to be noted that the first setting information may be setting information in a general format of an electric appliance or setting information in a dedicated format of an electric appliance of a specific model.

The home appliance list obtaining unit 1514 obtains or creates a list of home appliances of the user (the home appliance list).

The corresponding home appliance determining unit 1513 searches the home appliance list obtained by the home appliance list obtaining unit 1514 for an electric appliance capable of performing processing indicated by the setting information separated by the reference command separating unit 1512. The following describes this process in detail.

Figure 24A:
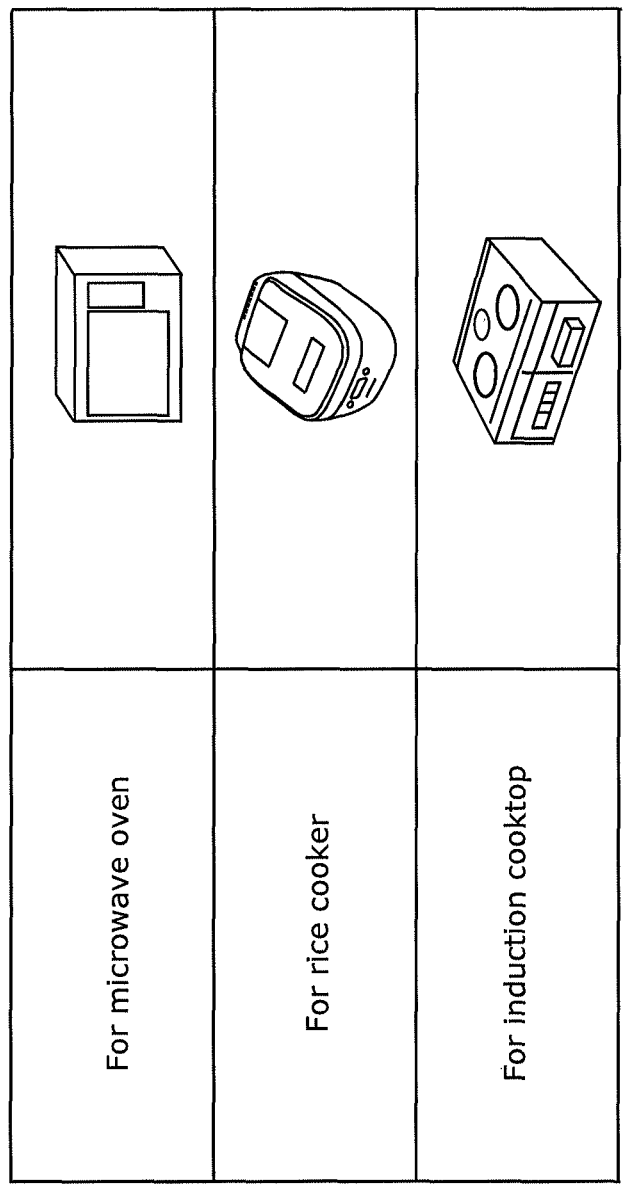
FIG. 24A illustrates exemplary marks according to Embodiment 5.

The mark storing unit 1515 holds a mark to be added to a setting image. It is to be noted that the mark storing unit 1515 may hold information indicating a mode when a setting image is displayed. Specifically, the mark storing unit 1515 may hold information such as "displaying in a reddish hue," "displaying brightly," or "displaying on a large scale." Moreover, the mark storing unit 1515 may hold one or more marks each corresponding to a different one of electric appliances. For example, as illustrated in FIG. 24A, the mark storing unit 1515 may hold a mark in the shape of an microwave oven that is an electric appliance ("For microwave oven" cell), a mark in the shape of a rice cooker that is an electric appliance ("For rice cooker" cell), and a mark in the shape of an induction cooktop that is an electric appliance ("For induction cooktop" cell). In this case, adding the mark in the shape of the microwave oven to a setting image including setting information of a microwave oven allows the user to intuitively find which electric appliance is capable of performing processing of the setting image.

The mark combining unit 1516 combines a mark with the setting image based on a determination result of the corresponding home appliance determining unit 1513 so that the mark is superimposed on the setting image. Specifically, the corresponding home appliance determining unit 1513 determines whether or not the home appliance list includes the electric appliance capable of performing the processing indicated by the setting information of the setting image, and if the corresponding home appliance determining unit 1513 determines that the home appliance list includes the electric appliance, the mark combining unit 1516 combines a first mark with the setting image so that the first mark is superimposed on the setting image. In such case, if the setting information (the first setting information) included in the image data of the setting image can be also converted into the setting information (the second setting information) of the electric appliance in the home appliance list, the corresponding home appliance determining unit 1513 determines that the home appliance list includes the electric appliance capable of performing the processing indicated by the setting information of the setting image. A conversion table that stores setting information in association with models of electric appliances may be used for this conversion. This conversion table may be a conversion table for setting information in a general format of electric appliances and setting information of the electric appliances. Moreover, if the corresponding home appliance determining unit 1513 determines that the home appliance list does not include the electric appliance capable of performing the processing indicated by the setting information of the setting image, the mark combining unit 1516 may combine a second mark with the setting image so that the second mark is superimposed on the setting image.

Figure 24B:
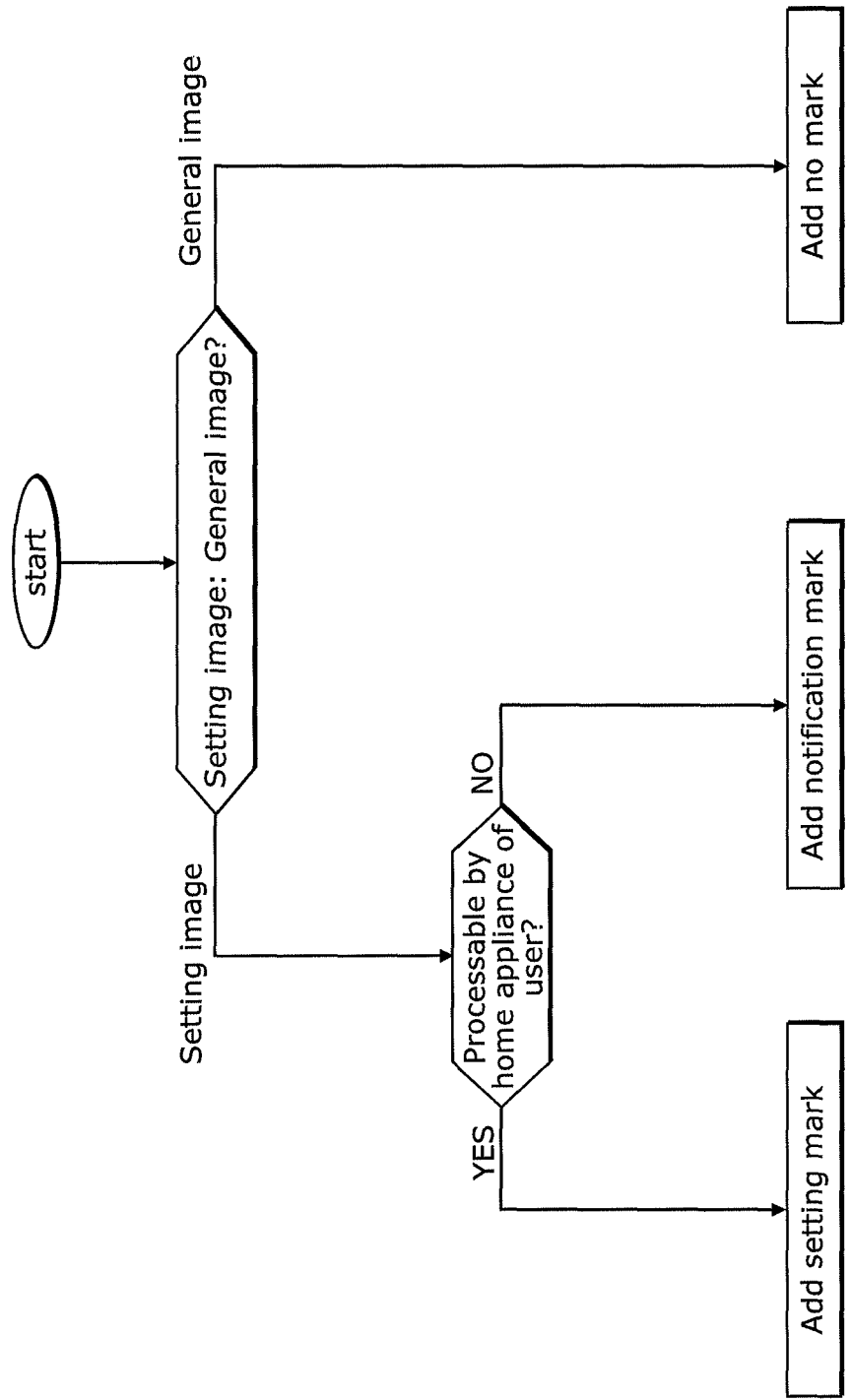
FIG. 24B is an explanatory diagram illustrating a mark to be added according to Embodiment 5.

FIG. 24B is an explanatory diagram illustrating a method for selecting a first mark or a second mark. If image data includes setting information of an electric appliance, and the user has the electric appliance, the first mark is added. When seeing an image to which the first mark is added, the user can know that the image includes the setting information of the electric appliance of the user, and an item that is a subject in the image can be created by the electric appliance performing processing. The first mark is also referred to as a "setting mark." If an image includes setting information of an electric appliance, and the user does not have the electric appliance, the second mark is added. When seeing the image to which the second mark is added, the user can know that although the image includes the setting information of the electric appliance, the user does not have the electric appliance. The second mark is also referred to as a "notification mark." Moreover, the mark adding unit 1516 may only determine (select) a mark to be added. In this case, another functional block may be caused to display that the determined (selected) mark is added to an image.

The control unit 157 controls a series of information processing by the display device 15, and transfers processing between functional blocks in the display device 15. Moreover, the control unit 157 presents, by causing the display unit 112 to display the setting image to which the mark was added by the mark adding unit 151, the setting image to the user. Furthermore, the control unit 157 presents, by causing the display unit 112 to display the general image, the general image to the user in addition to the setting image. In other words, the setting image to which the mark was added is presented to the user.

Figure 20:
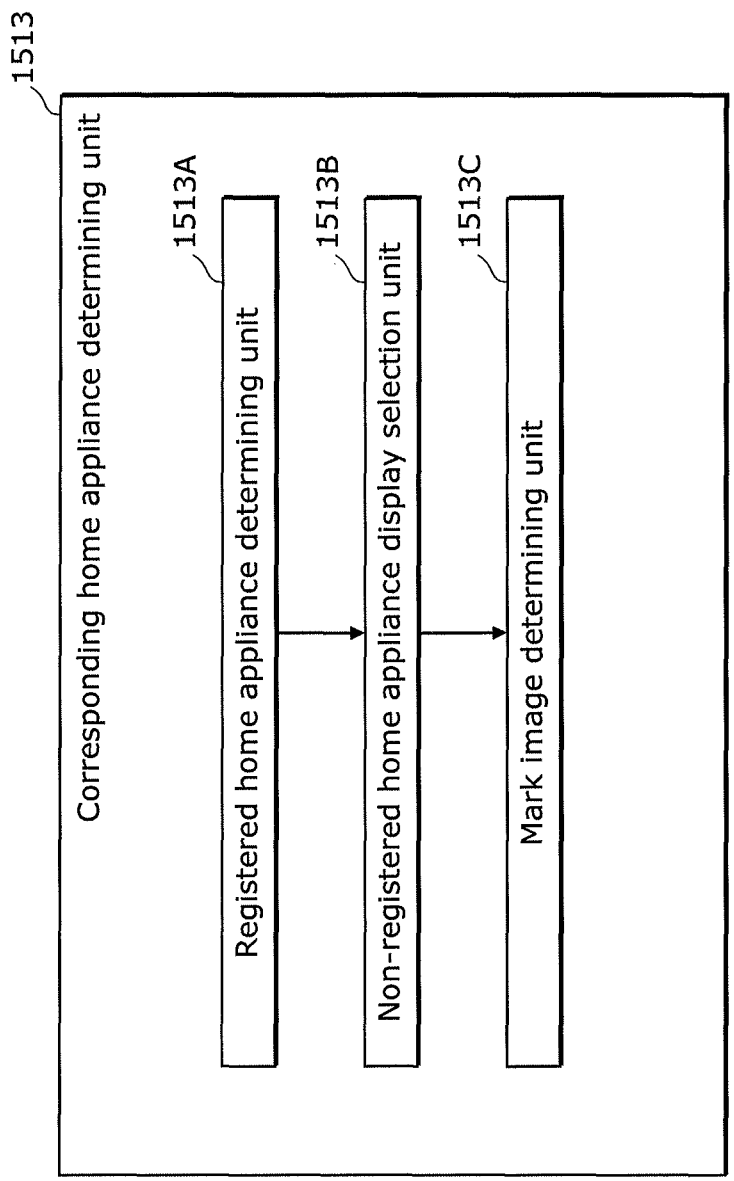
FIG. 20 is an exemplary functional block diagram illustrating a corresponding home appliance determining unit according to Embodiment 5.

FIG. 20 is an exemplary functional block diagram illustrating the corresponding home appliance determining unit 1513 according to this embodiment.

As illustrated in FIG. 20, the corresponding home appliance determining unit 1513 includes a registered home appliance determining unit 1513A, a non-registered home appliance display selection unit 1513B, and a mark image determining unit 1513C.

The registered home appliance determining unit 1513A determines whether or not the electric appliance capable of performing the processing indicated by the setting information separated by the reference command separating unit 1512 is included in electric appliances registered by the user. This determination may be made based on whether or not the electric appliance is included in the home appliance list obtained by the home appliance list obtaining unit 1514.

The non-registered home appliance display selection unit 1513B selects whether or not to display the electric appliance that the registered home appliance determining unit 1513A determined as not being included in the home appliance list.

The mark image determining unit 1513C determines a mark image of a mark to be added to a setting image. There are various methods for determining a mark image. For instance, it is possible to determine that a mark in a shape corresponding to an electric appliance capable of performing processing indicated by setting information separated from a setting image is to be added to the setting image.

FIG. 21 is a first sequence diagram illustrating exemplary processing by the display device 15 according to this embodiment. FIG. 22 is a second sequence diagram illustrating exemplary processing by the display device according to this embodiment. FIG. 23A is a first explanatory diagram illustrating processing by the display device according to this embodiment. The processing by the display device according to this embodiment is described with reference to these figures. It is to be noted that the same processes are described from step S2301 to step S2304 in FIG. 21 and FIG. 22. If a determination result in step S2304 is YES, processes subsequent to step S2305 in FIG. 21 are performed. In contrast, if a determination result in step S2304 is NO, processes subsequent to step S2401 in FIG. 22 are performed.

First, the display device 15 obtains image data from the accumulation server 41 (step S2301). The image receiving unit 1511 of the display device 15 obtains the image data from the accumulation server 41 via the mobile network communication unit 118 and the mobile network communication antenna 119, and holds the image data. The image data obtained from the accumulation server 41 includes image data of a setting image in which setting information of an electric appliance is stored as embedded data. In addition, the image data may include image data of a general image. It is to be noted that the image data obtained from the accumulation server 41 may be part or all of image data items stored in the accumulation server 41. If the image data obtained from the accumulation server 41 is part of the image data items stored in the accumulation server 41, the image data may be a predetermined number of image data items having recent save date and time among the image data items. Moreover, the image data may be image data corresponding to a search word designated by the user among the image data items stored in the accumulation server 41. The term "obtain" above may refer to a case where the user of the display device 15 obtains image data to store it into the display device 15 or a case where the user of the display device 15 temporarily stores image data into the display device 15 to browse on the display device 15 an image in the accumulation server 41.

Next, the display device 15 obtains a reference command and a product number from embedded data of the image data of the setting image (step S2302). The reference command separating unit 1512 of the display device 15 separates (extracts) the reference command stored as the embedded data of the setting image.

Next, the display device 15 obtains a home appliance list that is a list of home appliances of the user (step S2303).

Next, the display device 15 determines whether or not the reference command corresponding to an electric appliance of the user is embedded in the image data of the setting image (step S2304). The corresponding home appliance determining unit 1513 of the display device 15 searches the home appliance list obtained by the home appliance list obtaining unit for an electric appliance capable of performing processing indicated by the reference command separated (extracted) by the reference command separating unit 1512. Consequently, if the electric appliance is included in the home appliance list, it is determined that the reference command is embedded, and the processing proceeds to a process in step S2305. In contrast, if the electric appliance is not included in the home appliance list, it is determined that the reference command is not embedded, and the processing proceeds to a process in step S2401 in FIG. 22.

To put it another way, if the separated reference command can be converted into information in a format executable by any electric appliance in the home appliance list, it is determined that the reference command is embedded. If the separated reference command is the information in the format executable by any electric appliance in the home appliance list, it may be determined that the reference command is embedded.

Next, the display device 15 selects a mark corresponding to a home appliance setting command (step S2305). The mark combining unit 1516 of the display device 15 selects, as a setting mark, a mark corresponding to the electric appliance found by searching the home appliance list in step S2304, from among marks stored in the mark storing unit 1515.

Next, the display device 15 combines the setting mark with the setting image (step S2306). The mark combining unit 1516 of the display device 15 combines the setting mark selected in step S2305 with the setting image so that the setting mark is superimposed on the setting image.

Next, the display device 15 displays the image with which the setting mark is combined (step S2307). The display unit 112 of the display device 15 displays the image with which the setting mark is combined in step S2305, to present it to the user. Stated differently, the image with which the setting mark is combined is presented to the user.

Next, the display device 15 accepts selection of the image by the user (step S2308). The operation unit 114 of the display device 15 accepts the selection of the image operated by the user. The display of image in the present step is as described in (a) of FIG. 23A, for example. In (a) of FIG. 23A, a setting mark 2302 is added to an image 2301 including setting information processable by the electric appliance of the user. Moreover, a notification mark 2312 is added to an image 2311 including setting information unprocessable by the electric appliance of the user.

Next, the display device 15 converts the reference command stored as the embedded data in the setting image, into a setting command of the electric appliance of the user (step S2309).

Next, the display device 15 transmits the home appliance setting command to the terminal device 33 (step S2310). Here, an interface for asking the user whether or not to transmit the home appliance setting command may be provided. The display of image in the present step is as described in (b) of FIG. 23A, for instance.

Next, the terminal device 33 receives the home appliance setting command transmitted by the display device in step S2310, and performs processing on an item (step S2321).

Through the above processes, it is possible to receive the image data including the setting information of the electric appliance stored in the accumulation server 41, and perform the processing indicated by the setting information on the item with the electric appliance of the user.

The following describes a case where the electric appliance is not included in the home appliance list, and it is determined that the reference command is not embedded in step S2304, with reference to FIG. 22.

The display device 15 obtains information about the electric appliance capable of performing the processing indicated by the setting information of the setting image (step S2401). The corresponding home appliance determining unit 1513 of the display device 15 obtains the information about the electric appliance capable of performing the processing indicated by the setting information stored as the embedded data in the setting image.

Next, the display device 15 obtains, as a notification mark, a mark indicating the image having the setting information stored in the image data (step S2402). The mark storing unit 1515 of the display device 15 obtains, from outside of the display device 15, the notification mark indicating the image having the setting information stored in the image data. It is to be noted that if the notification mark is previously stored in the mark storing unit 1515, the process in the present step does not need to be performed.

Next, the display device 15 combines the notification mark obtained in step S2402 with the image (step S2403). The mark combining unit 1516 of the display device 15 combines the notification mark obtained in step S2402 with the image so that the notification mark is superimposed on the image.

Next, the display device 15 displays the image with which the notification mark is combined (step S2404). The display unit 112 of the display device 15 displays the image with which the notification mark is combined in step S2403, to present it to the user. Stated differently, the image with which the notification mark is combined is presented to the user. Here, an interface for accepting user's selection of images including the image with which the notification mark is combined may be provided. The display of image in the present step is as described in (a) of FIG. 23A, for example.

Next, the display device 15 accepts selection of the image by the user (step S2405). The operation unit 114 of the display device 15 accepts the selection of the image operated by the user.

Next, the display device 15 displays information related to the image selected by the user (step S2406). The display unit 112 of the display device 15 displays the information about the electric appliance capable of performing the processing indicated by the setting information stored as the embedded data in the image. The display of image in the present step is as described in (c) of FIG. 23A, for instance.

Figure 23B:
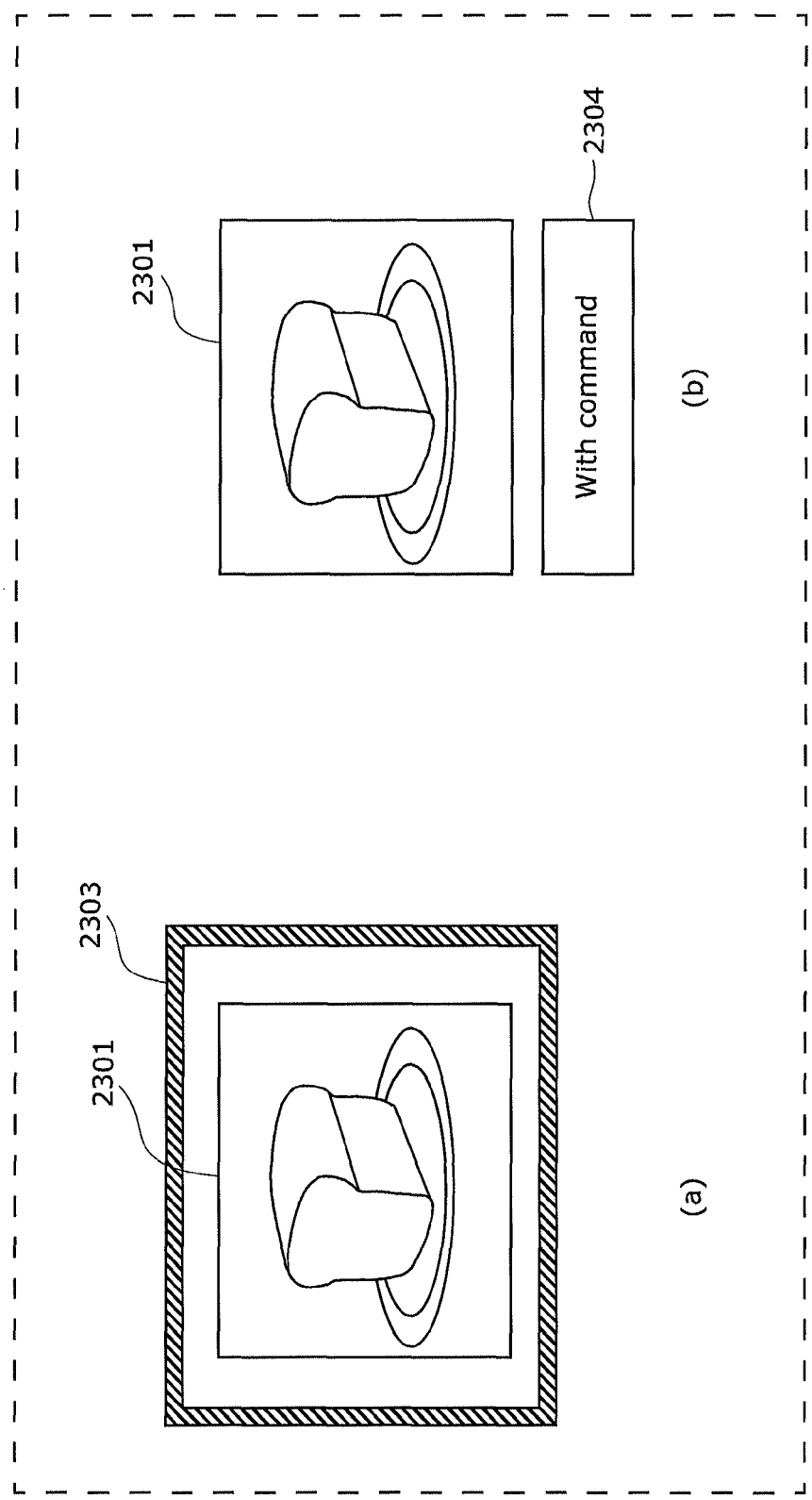
FIG. 23B is a second explanatory diagram illustrating processing by the display device according to Embodiment 5.

FIG. 23B is a second explanatory diagram illustrating processing by the display device according to this embodiment. (a) of FIG. 23B is an exemplary display when the setting image 2301 is surrounded with a frame 2303 of a predetermined color and displayed. (b) of FIG. 23B is an exemplary display when the mark 2304 including characters is displayed next to the setting image 2301. Such a mark is capable of displaying that an image is a setting image.

Figure 23C:
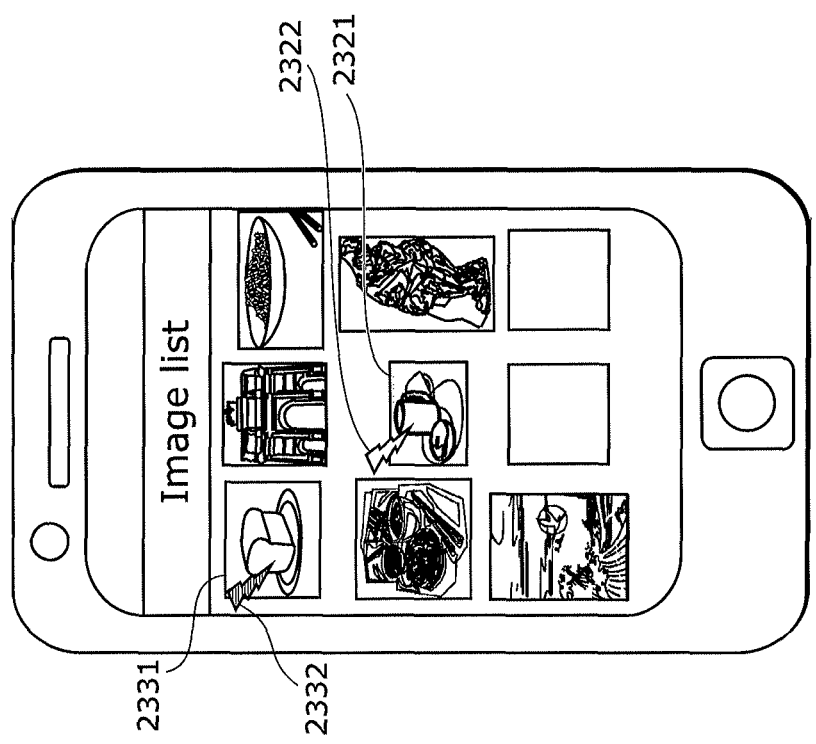
FIG. 23C is a third explanatory diagram illustrating processing by the display device according to Embodiment 5.

FIG. 23C is a third explanatory diagram illustrating processing by the display device according to this embodiment. FIG. 23C is an exemplary display by a display device 15 of a user having a different home appliance list from that of the user of the display device 15 illustrated in FIG. 23A. The display device 15 of the user having the different home appliance list displays a mark on a different setting image. In other words, a setting mark 2322 is added to an image 2321 including setting information processable by an electric appliance of the user. Moreover, a notification mark 2332 is added to an image 2331 including setting information unprocessable by the electric appliance of the user. As above, the display device 15 is capable of adding the mark to the setting image according to the home appliance list of the user. It is to be noted that a login ID entered by a user can be used to identify a user, for instance.

Through the above processes, it is possible to receive the image data including the setting information of the electric appliance stored in the accumulation server 41, and notify the user of the electric appliance of a model capable of performing the processing indicated by the setting information.

As described above, in the communication method according to this embodiment, if the electric appliance (the second electric appliance) previously designated by the user is capable of performing the processing corresponding to the setting information of the electric appliance (the first electric appliance) included in the image data, the mark (the first mark) is displayed with the image data. The user can know that the image for which the first mark is displayed with the image data includes the setting information processable by the electric appliance designated by the user. Here, the first electric appliance and the second appliance may be an electric appliance of the same model or the completely same electric appliance. As a result, the user can easily visually identify the image including the setting information of the electric appliance when the processing was performed on the item.

Moreover, if the setting information of the electric appliance included in the image data can be converted into the setting information of the electric appliance designated by the user, using the conversion table, the user can know that the image displayed with the first mark includes the setting information processable by the electric appliance designated by the user.

Furthermore, if the setting information of the electric appliance included in the image data can be converted into a general format, the user can know that the image displayed with the first mark includes the setting information processable by the electric appliance designated by the user.

Moreover, it is determined whether or not the setting information of the electric appliance included in the image data can be converted into the setting information of the electric appliance corresponding to the user, based on the home appliance list corresponding to the user.

Furthermore, if the setting information of the electric appliance is included in the image data, the mark (the second mark) is displayed with the image data. The user can know that the image for which the second mark is displayed with the image data includes the setting information of the electric appliance, but the setting information is unprocessable by the electric appliance designated by the user. As a result, the user can easily visually identify the image including the setting information of the electric appliance when the processing was performed on the item.

Moreover, the second mark has the shape corresponding to the electric appliance. This allows the user to know intuitively which electric appliance performs the processing. As a result, the user can easily visually identify the image including the setting information of the electric appliance when the processing was performed on the item.

Furthermore, the first mark has the shape corresponding to the electric appliance. This allows the user to know intuitively which electric appliance performs the processing. As a result, the user can easily visually identify the image including the setting information of the electric appliance when the processing was performed on the item.

Moreover, the setting information of the electric appliance is embedded in a format compliant with the Exif generally used to embed information in image data. As a result, the image in which the setting information of the electric appliance is embedded is treated in the same manner as general image data in which the setting information of the electric appliance is not embedded.

Embodiment 6

Embodiment 6 describes an example where instead of a display device, a processing server performs the mark combining processing in Embodiment 5. It is to be noted that descriptions of the same configurations and processes as those in Embodiment 5 may be omitted.

Figure 25:
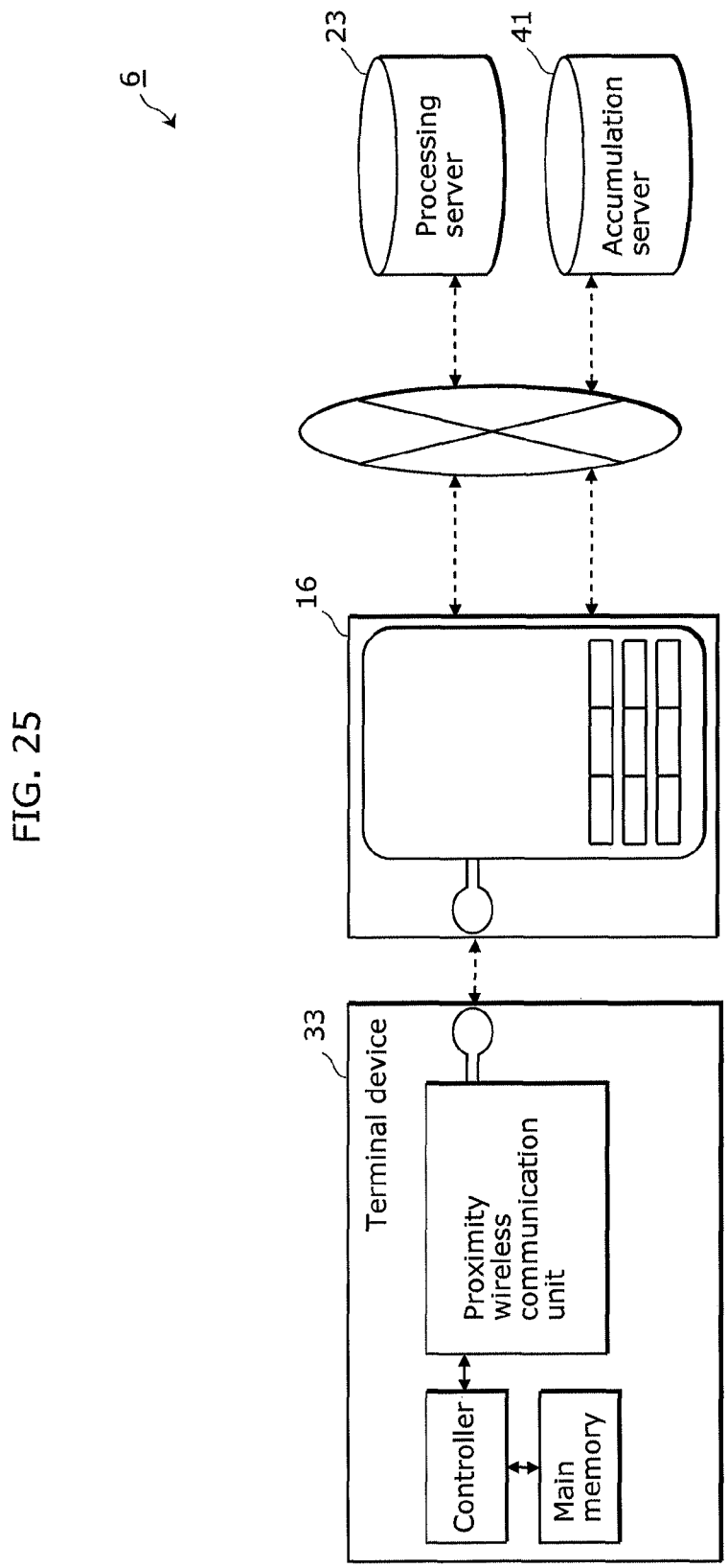
FIG. 25 is a configuration diagram illustrating an appliance control system according to Embodiment 6.

FIG. 25 is a configuration diagram illustrating an appliance control system 6 according to this embodiment.

As illustrated in FIG. 25, the appliance control system 6 includes a display device 16, a processing server 23, a terminal device 33, and an accumulation server 41. Here, the appliance control system 6 differs from the appliance control system 5 according to Embodiment 5 in the display device 16 and the processing server 23. The following describes these structural elements.

The display device 16 communicates with the terminal device 33 using proximity wireless communication, and communicates with the processing server 23 via a network. In addition, the display device 16 receives from the processing server 23 image data of a setting image or image data of a general image. A mark to be described later is added to the image data received from the processing server 23. An appliance control device 13 is realized by a cellular phone, a smart phone (highly-functional cellular phone), or the like that includes a proximity wireless communication interface and a network communication interface.

The processing server 23 receives image data in which setting information of an electric appliance is embedded or image data of a general image, from the accumulation server 41 via a network. Moreover, the processing server 23 obtains a list of home appliances of a user of the display 16 (a home appliance list), and combines a mark with, among image data items in which setting information items of electric appliances are embedded, image data of an electric appliance of the user which is capable of performing processing indicated by the setting information of the electric appliance. Then, the processing server 23 transmits the image data to the display device 16. It is to be noted that the processing server 23 may be realized as one of functions of the accumulation server 41. In this case, it can be said that the accumulation server 41 performs the above processing and transmits the image data to the display device 16. The above phrase "combines a mark . . . with . . . image data" not only means that the processing server 23 combines the mark with the image data to generate new image data, but also includes an operation that the processing server 23 transmits the image data to the display device 16 so that the image data and data of the mark to be added to the image data are displayed later by the display device 16 together. In other words, the processing server 23 may transmit the mark and the image data to the display device 16 instead of generating a combined image that is the image data with which the mark is combined.

Figure 26A:
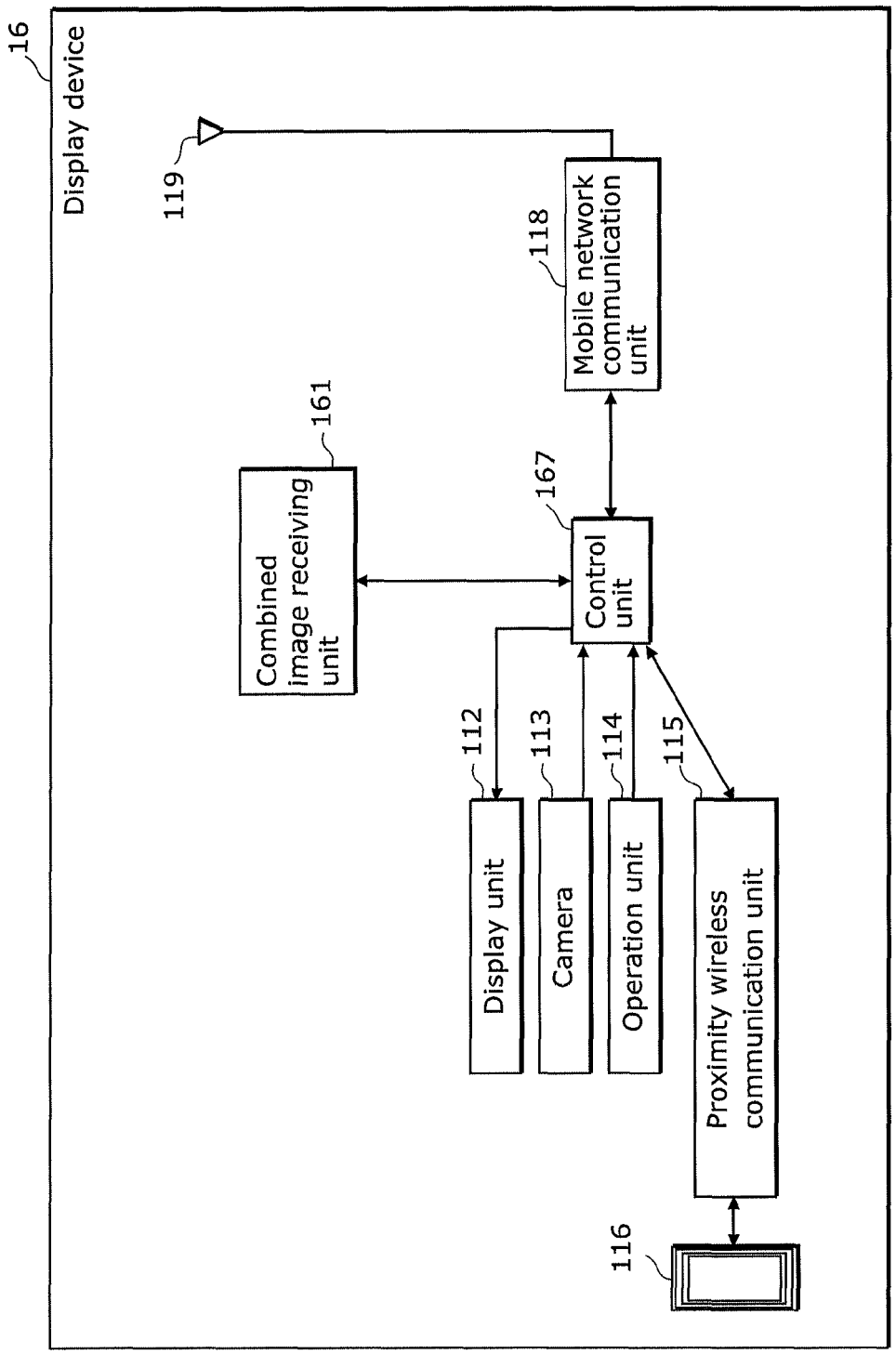
FIG. 26A is an exemplary functional block diagram illustrating a display device according to Embodiment 6.

FIG. 26A is an exemplary functional block diagram illustrating the display device 16 according to this embodiment.

As illustrated in FIG. 26A, the display device 16 includes a combined image receiving unit 161, a display unit 112, a camera 113, an operation unit 114, a proximity wireless communication unit 115, a proximity wireless communication antenna 116, a control unit 167, a mobile network communication unit 118, and a mobile network communication antenna 119. Here, the display device 16 differs from the display device 15 according to Embodiment 5 in the combined image receiving unit 161 and the control unit 167. It is to be noted that the camera 113 is not an essential structural element. In other words, the display device 16 may not need to include the camera 113.

The combined image receiving unit 161 receives from the processing server 23 image data in which control information of an electric appliance is embedded or the image data of the general image. To put it another way, the image data in which the control information of the electric appliance or the general image is provided to the display device 16 used by the user.

The control unit 167 controls a series of information processing by the display device 16, and transfers processing between functional blocks in the display device 16. In addition, the control unit 167 presents, by causing the display unit 112 to display a setting image or the general image received by the combined image receiving unit 161, it to the user. Stated differently, the received setting image or general image is presented to the user.

Figure 26B:
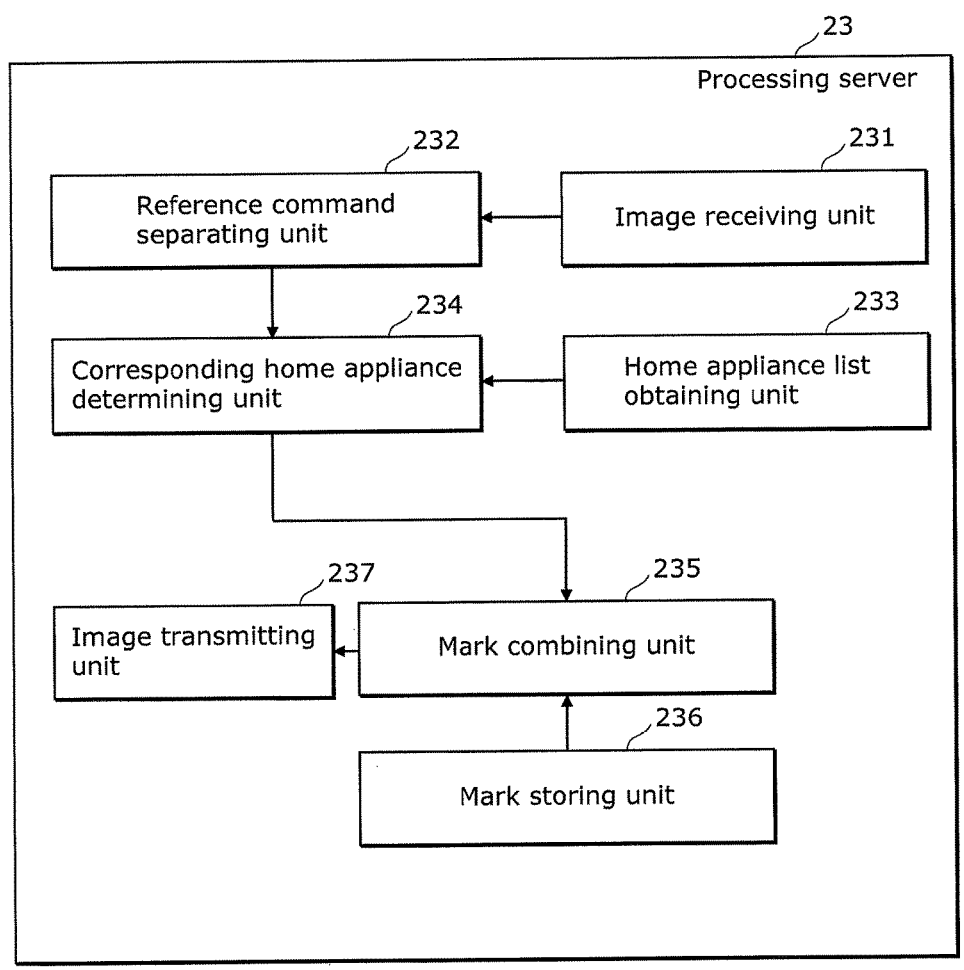
FIG. 26B is an exemplary functional block diagram illustrating a processing server according to Embodiment 6.

FIG. 26B is an exemplary functional block diagram illustrating the processing server 23 according to this embodiment.

As illustrated in FIG. 26B, the processing server 23 includes an image receiving unit 231, a reference command separating unit 232, a home appliance list obtaining unit 233, a corresponding home appliance determining unit 234, a mark combining unit 235, a mark storing unit 236, and an image transmitting unit 237.

The image receiving unit 231 receives from the accumulation server 41 image data in which setting information of an electric appliance is embedded or image data of a general image.

The reference command separating unit 232 separates (extracts) the setting information of the electric appliance from the image data in which the setting information of the electric appliance is embedded, among image data items received by the image receiving unit 231.

The home appliance list obtaining unit 233 obtains or creates a list of home appliances of the user (a home appliance list).

The corresponding home appliance determining unit 234 searches the home appliance list obtained by the home appliance list obtaining unit 233 for an electric appliance capable of performing processing indicated by the setting information separated by the reference command separating unit 232. The corresponding home appliance determining unit 234 performs the same processing as the corresponding home appliance determining unit 1513 of the display device 15 in Embodiment 5.

The mark combining unit 235 combines a mark with a setting image based on a determination result of the corresponding home appliance determining unit 234 so that the mark is superimposed on the setting image. The mark combining unit 235 performs the same processing as the mark combining unit 1516 of the display device 15 in Embodiment 5.

The mark storing unit 236 holds a mark to be added to a setting image. The mark combining unit 236 performs the same processing as the mark storing unit 1515 of the display device 15 in Embodiment 5.

The image transmitting unit 237 transmits to the display device 16 the setting image with which the mark combining unit 235 combines the mark, or the general image.

Figure 27:
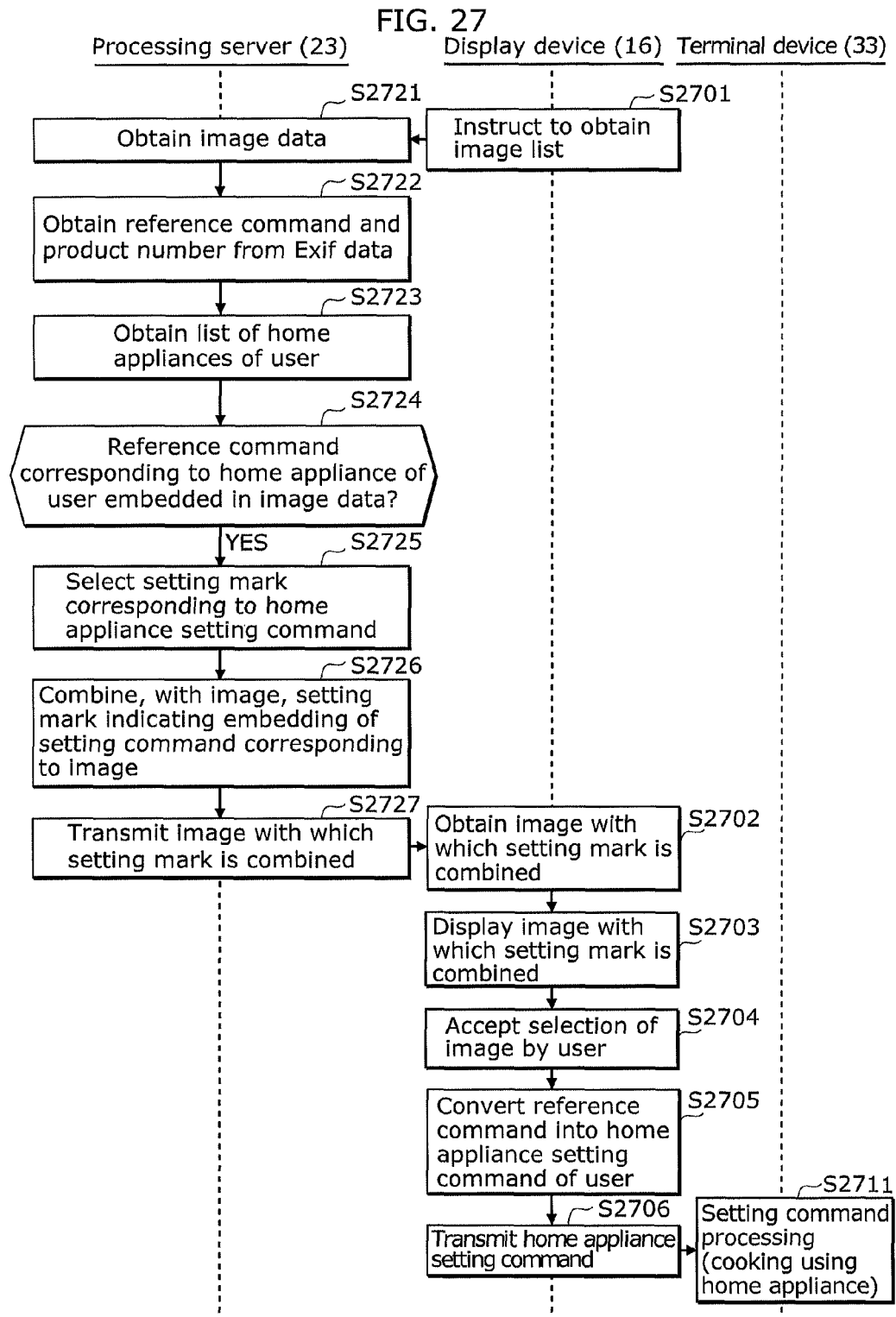
FIG. 27 is a first sequence diagram illustrating exemplary processing by the display device and the processing server according to Embodiment 6.
Figure 28:
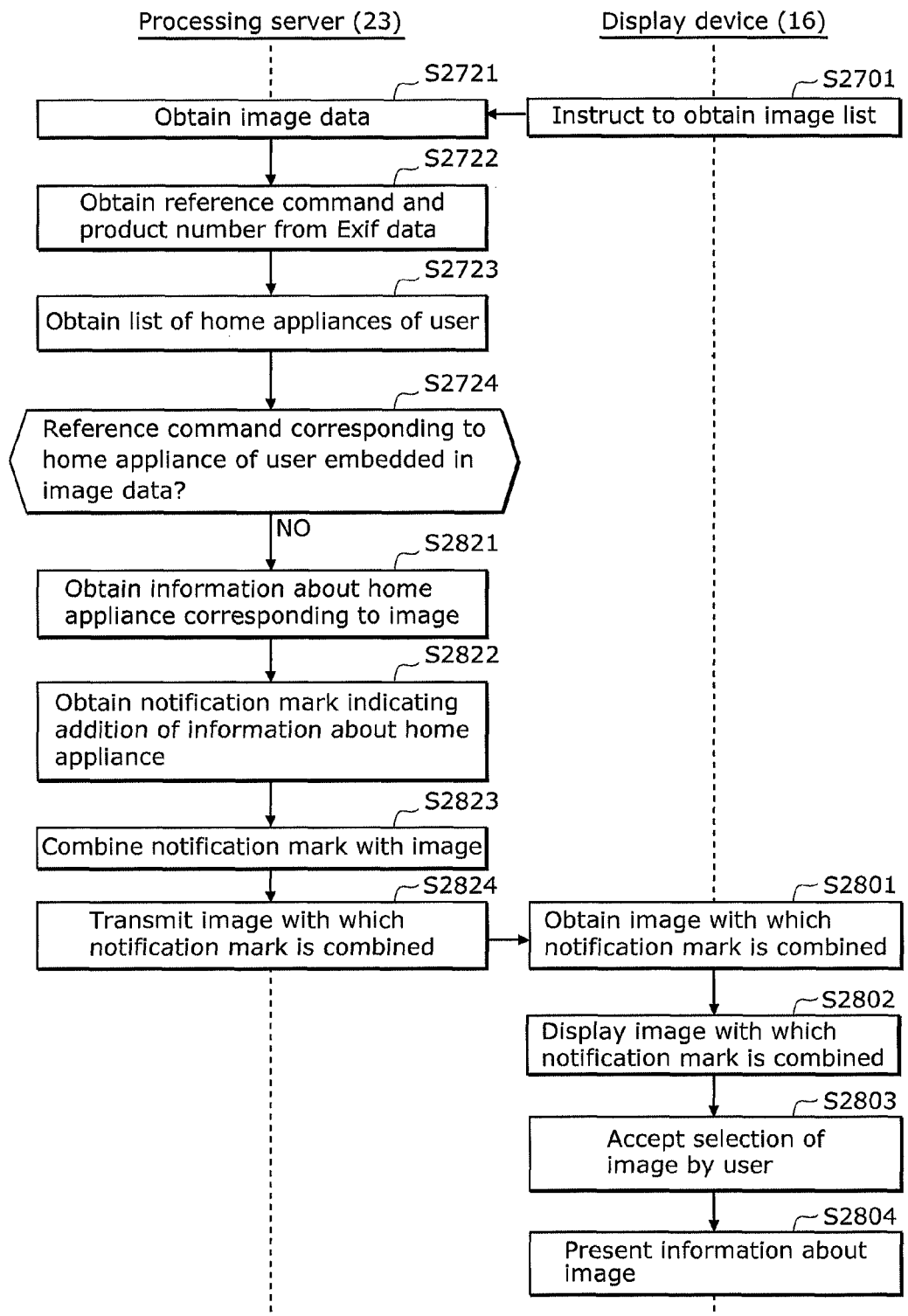
FIG. 28 is a second sequence diagram illustrating exemplary processing by the display device and the processing server according to Embodiment 6.

FIG. 27 is a first sequence diagram illustrating exemplary processing by the display device and the processing server according to this embodiment. FIG. 28 is a second sequence diagram illustrating exemplary processing by the display device and the processing server according to this embodiment. The processing by the display device according to this embodiment is described with reference to these figures. It is to be noted that the same processes are described from step S2701 and step S2721 to step S2304 in FIG. 27 and FIG. 28. If a determination result in step S2724 is YES, processes subsequent to step S2725 in FIG. 27 are performed. In contrast, if a determination result in step S2724 is NO, processes subsequent to step S2821 in FIG. 28 are performed.

Next, the display device 16 accepts obtainment of an image list by the user (step S2701). Upon receiving from the user an instruction to obtain the image list, the operation unit 114 of the display device 16 transmits the instruction to the processing server 23 via the mobile network communication unit 118 and the mobile network communication antenna 119.

Next, the processing server 23 obtains image data from the accumulation server 41 (step S2721). The image receiving unit 231 of the processing server 23 obtains the image data from the accumulation server 41 via the mobile network communication unit 118 and the mobile network communication antenna 119.

Next, the processing server 23 obtains a reference command and a product number from embedded data of image data of a setting image (step S2722). The reference command separating unit 232 of the processing server 23 separates (extracts) the reference command stored as the embedded data of the setting image.

Next, the processing server 23 obtains a home appliance list which is a list of home appliances of the user of the display device (step S2723).

Next, the processing server 23 determines whether or not the reference command corresponding to an electric appliance of the user is embedded in the image data of the setting image (step S2724). The corresponding home appliance determining unit 234 of the processing server 23 searches the home appliance list obtained by the home appliance list obtaining unit 233 for the electric appliance capable of performing processing indicated by the reference command separated (extracted) by the reference command separating unit 232. Consequently, if the electric appliance is included in the home appliance list, it is determined that the reference command is embedded, and the processing proceeds to a process in step S2725. In contrast, if the electric appliance is not included in the home appliance list, it is determined that the reference command is not embedded, and the processing proceeds to a process in step S2821 in FIG. 28.

To put it another way, if the separated reference command can be converted into information in a format executable by any electric appliance in the home appliance list, it is determined that the reference command is embedded. If the separated reference command is the information in the format executable by any electric appliance in the home appliance list, it may be also determined that the reference command is embedded.

Next, the processing server 23 selects a mark corresponding to a home appliance setting command (step S2725). The mark combining unit 235 of the processing server 23 selects, as a setting mark, a mark corresponding to the electric appliance found by searching the home appliance list in step S2724, from among marks stored in the mark storing unit 236.

Next, the processing server 23 combines the setting mark with the setting image (step S2726). The mark combining unit 235 of the processing server 23 combines the setting mark selected in step S2725 with the setting image so that the setting mark is superimposed on the setting image.

Next, the processing server 23 transmits to the display device the setting image with which the setting mark is combined (step S2727).

Next, the display device 16 receives from the processing server 23 the setting image with which the setting mark is combined (step S2702). Stated differently, the image with which the setting mark is combined is provided to the display device 16 used by the user.

Next, the display device 16 displays the image with which the setting mark is combined (step S2703). The display unit 112 of the display device 16 displays the image with which the setting mark is combined in step S2726, to present it to the user. In other words, the image with which the setting mark is combined is presented to the user.

Next, the display device 16 accepts selection of the image by the user (step S2704). The operation unit 114 of the display device 16 accepts the selection of the image operated by the user. The display of image in the present step is as described in (a) of FIG. 23A, for example.

Next, the display device 16 converts the reference command stored as the embedded data in the setting image, into a setting command of the electric appliance of the user (step S2705).

Next, the display device 16 transmits the home appliance setting command to the terminal device 33 (step S2706). Here, an interface for asking the user whether or not to transmit the home appliance setting command may be provided. The display of image in the present step is as described in (b) of FIG. 23A, for instance.

Next, the terminal device 33 receives the home appliance setting command transmitted by the display device in step S2706, and performs processing on an item (step S2711).

Through the above processes, it is possible to receive the image data including the setting information of the electric appliance stored in the accumulation server 41, and perform the processing indicated by the setting information on the item with the electric appliance of the user.

The following describes a case where the electric appliance is not included in the home appliance list, and it is determined that the reference command is not embedded in step S2724, with reference to FIG. 28.

The processing server 23 obtains information about the electric appliance capable of performing the processing indicated by the setting information of the setting image (step S2821). The corresponding home appliance determining unit 234 of the processing server 23 obtains the information about the electric appliance capable of performing the processing indicated by the setting information stored as the embedded data in the setting image.

Next, the processing server 23 obtains, as a notification mark, a mark indicating the image having the setting information stored in the image data (step S2822). The mark storing unit 236 of the processing server 23 obtains, from outside of the processing server 23, the notification mark indicating the image having the setting information stored in the image data. It is to be noted that if the notification mark is previously stored in the mark storing unit 236, the process in the present step does not need to be performed.

Next, the processing server 23 combines the notification mark obtained in step S2822 with the image (step S2823). The mark combining unit 235 of the processing server 23 combines the notification mark obtained in step S2822 with the image so that the notification mark is superimposed on the image.

Next, the processing server 23 transmits to the display device 16 the image with which the notification mark is combined (step S2824).

Next, the display device 16 obtains from the processing server 23 the image with which the notification mark is combined (step S2801). In other words, the image with which the notification mark is combined is provided to the display device 16 used by the user.

Next, the display device 16 displays the image with which the notification mark is combined (step S2802). The display unit 112 of the display device 16 displays the image with which the notification mark is combined in step S2823, to present it to the user. To put it another way, the image with which the notification mark is combined is presented to the user. Here, an interface for accepting user's selection of images including the image with which the notification mark is combined may be provided. The display of image in the present step is as described in (a) of FIG. 23A, for example.

Next, the display device 16 accepts selection of the image by the user (step S2803). The operation unit 114 of the display device 16 accepts the selection of the image operated by the user.

Next, the display device 16 displays information related to the image selected by the user (step S2804). The display unit 112 of the display device 16 displays the information about the electric appliance capable of performing the processing indicated by the setting information stored as the embedded data in the image. The display of image in the present step is as described in (c) of FIG. 23A, for instance.

Through the above processes, it is possible to receive the image data including the setting information of the electric appliance stored in the accumulation server 41, and notify the user of the electric appliance of a model capable of performing the processing indicated by the setting information.

As described above, in the communication method according to this embodiment, the processing server is capable of adding, to the image, the mark to be displayed with the image. This process may require the home appliance list and the conversion table, resulting in making the process complex. The processing server is capable of preventing a processing load of the display device from increasing, by performing the process.

It is to be noted that the scope of the present invention includes the step of providing a user interface for processing in each of devices (the communication device in Embodiments 1 and 2, the appliance control device in Embodiments 3 and 4, and the display device in Embodiments 5 and 6) in the above respective embodiments. Stated differently, there is an interface terminal that is an interface between each device and the user and includes functions equivalent to the display unit and the operation unit of the device, and a communication interface that communicates with the device. The device transmits, to the interface terminal, display data to be displayed on a display unit of the interface terminal. Moreover, the interface terminal transmits to the device an operation of the user accepted by an operation unit of the interface terminal. The scope of the present invention includes a step of providing, by the device, an interface with the user to such an interface terminal.

Figure 29:
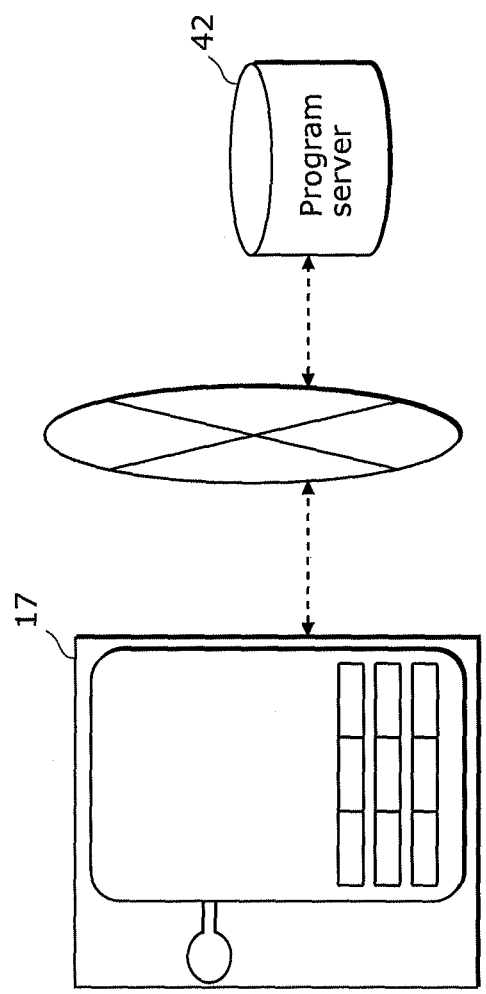
FIG. 29 is a system configuration diagram including a device and a program server in each of the embodiments.

It is to be noted that a program executed by the communication device or the like (the communication device, the appliance control device, or the display device) in each embodiment may be stored in a program server, and an information terminal may download and execute the program to function as the communication device or the like. In other words, as illustrated in FIG. 29, in a configuration where an information terminal 17 is connected to a program server 42 via a network, the information terminal 17 may download a program from the program server 42 and executes the program to function as the communication device or the like. Moreover, the program server may be realized as being included in a recording medium.

It is to be noted that the processing described as being performed by each of the devices (the communication device in Embodiments 1 and 2, the appliance control device in Embodiments 3 and 4, and the display device in Embodiments 5 and 6) in the respective embodiments may be performed by another device instead of each device, or the processing performed by the device and processing performed by the other device may be combined and performed. To put it another way, the processing may be performed by any of the devices in the respective embodiments.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing the image decoding apparatus according to each of the embodiments is a program described below.

The program causes a computer to execute: receiving image data that is image data of an image having as a subject an item on which a first electric appliance performed processing, and includes, as embedded data of the image data, first setting information when the first electric appliance performed the processing on the item; adding a first mark to the image data if it is determined that the first setting information included in the image data received in the receiving is convertible into second setting information in a format suitable for a second electric appliance of a user; and displaying the image of the image data to which the first mark is added in the adding.

Although the display device according to one or more aspects has been described based on the embodiments, the present invention is not limited to the embodiments. Those skilled in the art will readily appreciate that various modifications may be made in the embodiments and that other embodiments may be obtained by combining the structural elements in the different embodiments, without departing from the spirit of the present invention. Accordingly, all such modifications and embodiments may be included in the scope of the one or more aspects.

INDUSTRIAL APPLICABILITY

An image display method or the like according to an embodiment of the present invention allows a user to visually identify an image including setting information of an electric appliance when an item was processed.

REFERENCE SIGNS LIST 1, 2, 3, 4, 5, 6 Appliance control system
11, 12 Communication device
13, 14 Appliance control device
15, 16 Display device
17 Information terminal
21, 22, 23 Processing server
31, 32, 33 Terminal device
41 Accumulation server
42 Program server
51, 52 Bread (item)
111 Home appliance setting command combining unit
112 Display unit
113 Camera
114 Operation unit
115 Proximity wireless communication unit
116 Proximity wireless communication antenna
117, 127, 137, 147, 157, 167 Control unit
118 Mobile network communication unit
119 Mobile network communication antenna
121 Home appliance setting command combining unit
131, 141 Home appliance setting command obtaining unit
151 Mark adding unit
161 Combined image receiving unit
212 Home appliance setting command receiving unit
213, 222 Reference value generating unit
214 Identification information generating unit
215, 1414 Identification information transmitting unit
216 Reference value storing unit
221 Identification information obtaining unit
223, 1314 Home appliance setting command converting unit
224 Home appliance setting command transmitting unit
225 Reference value storing unit
226 Conversion table storing unit
227, 233, 1315, 1514 Home appliance list obtaining unit
231, 1511 Image receiving unit
232, 1313, 1512 Reference command separating unit
234, 1513 Corresponding home appliance determining unit
235, 1516 Mark combining unit
236, 1515 Mark storing unit
237 Image transmitting unit
1111, 1211 Home appliance setting command obtaining unit
1112 Reference value generating unit
1113, 1213 Combining unit
1114, 1214 Image generating unit
1212 Identification information obtaining unit
1311 Conversion table storing unit
1312, 1412 Image obtaining unit
1411 Home appliance setting command receiving unit
1413 Identification information separating unit
1513A Registered home appliance determining unit
1513B Non-registered home appliance display selection unit
1513C Mark image determining unit

The invention claimed is:
1. An appliance control method comprising:
obtaining combined data including (i) image data of an image having a first item as a subject and (ii) first setting information indicating processing that a first electric appliance has performed on the first item;

determining whether or not the first setting information is convertible into second setting information, the first setting information being included in the obtained combined data, and the second setting information being information in a previously designated format executable by a second electric appliance;

determining a first mark to be added to the image of the image data, in response to a determination that the first setting information is convertible into the second setting information;

displaying the image of the image data to which the determined first mark is added;

obtaining a user item selection of the displayed image of the first item;

converting the first setting information into second setting information having the previously designated format;

transmitting the second setting information to a terminal device;

automatically controlling, by the terminal device, the second electric appliance to perform processing on the second item according to the second setting information.

2. The image display method according to claim 1, further comprising obtaining a conversion table that indicates setting information of an electric appliance of a model different from a predetermined model of the first electric appliance in association with the setting information of the first electric appliance of the predetermined model, wherein the determining of whether or not the first setting information is convertible into the second setting includes referring to the obtained conversion table.

3. The image display method according to claim 1, further comprising obtaining a conversion table that associates the setting information of an electric appliance of a predetermined model with the first setting information that is setting information in a general format, wherein the determining of whether or not the first setting information is convertible into the second setting information includes referring to the obtained conversion table.

4. The image display method according to claim 1, further comprising obtaining a home appliance list that is a list corresponding to a user ID of the user and including one or more electric appliances previously designated, wherein in the determining of whether or not the first setting information is convertible into second setting information, it is determined that the first setting information is convertible into the second setting information if the first setting information is convertible into the second setting information when at least one of the electric appliances included in the obtained home appliance list is the second electric appliance, and it is determined that the first setting information is not convertible into the second setting information if the first setting information is not convertible into the second setting information when any of the electric appliances included in the obtained home appliance list is the second electric appliance.

5. The image display method according to claim 1, further comprising:

determining a second mark to be added to the image of the image data, in response to a determination that the first setting information is not convertible into the second setting information, the second mark being different from the first mark; and displaying the image of the image data to which the determined second mark is added, the image data being included in the combined data.

6. The image display method according to claim 5, wherein in the determining of a second mark, among one or more marks respectively corresponding to electric appliances, a mark corresponding to the first electric appliance is determined as the second mark.

7. The image display method according to claim 1, wherein in the determining of a first mark, among one or more marks respectively corresponding to electric appliances, a mark corresponding to the second electric appliance is determined as the first mark.

8. The image display method according to claim 1, wherein the image data is image data including the first setting information embedded in a format compliant with exchangeable image file format Exif.

9. An appliance control method comprising:

obtaining combined data including (i) image data of an image having a first item as a subject and (ii) first setting information indicating processing that a first electric appliance has performed on the first item;

determining whether or not the first setting information is second setting information, the first setting information being included in the obtained combined data, and the second setting information being information in a previously designated format executable by a second electric appliance;

determining a first mark to be added to the image of the image data, in response to a determination that the first setting information is the second setting information; and displaying the image of the image data to which the determined first mark is added;

obtaining a user item selection of the displayed image of the first item;

transmitting the first setting information to a terminal device;

automatically controlling, by the terminal device, the second electric appliance to perform processing on the second item according to the first setting information.

10. The image display method according to claim 9, further comprising obtaining a home appliance list that is a list corresponding to a user ID of the user and including one or more electric appliances previously designated, wherein in the determining of whether or not the first setting information is the second setting information, it is determined that the first setting information is the second setting information if the first setting information is the second setting information when at least one of the electric appliances included in the obtained home appliance list is the second electric appliance, and it is determined that the first setting information is not the second setting information if the first setting information is not the second setting information when any of the electric appliances included in the obtained home appliance list is the second electric appliance.

11. The image display method according to claim 9, further comprising:

determining a second mark to be added to the image of the image data, in response to a determination that the first setting information is not the second setting information, the second mark being different from the first mark; and displaying the image of the image data to which the determined second mark is added, the image data being included in the combined data.

12. An appliance control system comprising:
a control device, and a terminal device,
the control device including:
   a first communication circuit;
   a display configured to display images; and
   a first processor configured to:
      obtain combined data including (i) image data of an image having a first item as a subject and (ii) first setting information indicating processing that a first electric appliance has performed on the first item,
      determine whether or not the first setting information is convertible into second setting information, the first setting information being included in the obtained combined data, and the second setting information being information in a previously designated format executable by a second electric appliance,
      determine a first mark to be added to the image of the image data, in response to a determination by the first processor that the first setting information is convertible into the second setting information,
      display, via the display, the image of the image data to which the determined first mark is added,
      obtain a user item selection of the image of the first item displayed on the display,
      convert the first setting information into second setting information having the previously designated format, and
      transmit the second setting information via the first communication circuit; and
   the terminal including:
      a second communication circuit configured to receive the second setting information; and
      a second processor configured to control the second electric appliance to perform processing on the second item according to the second setting information.

13. An appliance control system comprising:
a control device, and a terminal device,
the control device including:
   a first communication circuit;
   a display configured to display images; and
   a first processor configured to:
      obtain combined data including (i) image data of an image having a first item as a subject and (ii) first setting information indicating processing that a first electric appliance has performed on the first item,
      determine whether or not the first setting information is second setting information, the first setting information being included in the obtained combined data, and the second setting information being information in a previously designated format executable by a second electric appliance,
      determine a first mark to be added to the image of the image data, in response to a determination by the first processor that the first setting information is the second setting information,
      display, via the display, the image of the image data to which the determined first mark added,
      obtain a user item selection of the image of the first item displayed on the display, and
      transmit the first setting information via the first communication circuit; and
   the terminal including:
      a second communication circuit configured to receive the first setting information; and
      a second processor configured to control the second electric appliance to perform processing on the second item according to the first setting information.

14. A server device that transmits, to an appliance control device connected to the server via a network, a program to be executed by the appliance control device, the server device comprising:
   a non-transitory memory configured to store the program; and
   a transmitting circuit configured to transmit to the appliance control device the program stored in the storage unit, upon receiving a request to download the program from the appliance control device,
wherein the program causes the appliance control device to execute:
obtaining combined data including (i) image data of an image having a first item as a subject and (ii) first setting information indicating processing that a first electric appliance has performed on the first item;
determining whether or not the first setting information is convertible into second setting information, the first setting information being included in the obtained combined data, and the second setting information being information in a previously designated format executable by a second electric appliance;
determining a first mark to be added to the image of the image data, in response to a determination that the first setting information is convertible into the second setting information;
displaying the image of the image data to which the determined first mark is added;
obtaining a user item selection of the displayed image of the first item;
converting the first setting information into second setting information having the previously designated format;
automatically controlling, via a terminal device, the second electric appliance to perform processing on the second item according to the second setting information.

* * * * *